(12) United States Patent
Ghanavi et al.

(10) Patent No.: US 9,487,399 B2
(45) Date of Patent: Nov. 8, 2016

(54) METHOD FOR THE SYNTHESIS OF METALLIC NANO PRODUCTS

(76) Inventors: Jalaledin Ghanavi, Tehran (IR); Mehrnaz Mostafavi, Tehran (IR); Zohre Ghanavi, Tehran (IR)

(*) Notice: Subject to any disclaimer, the term of this patent is extended or adjusted under 35 U.S.C. 154(b) by 454 days.

(21) Appl. No.: 12/857,590

(22) Filed: Aug. 17, 2010

(65) Prior Publication Data
US 2011/0167962 A1 Jul. 14, 2011

(51) Int. Cl.
*B22F 9/24* (2006.01)
*B82Y 40/00* (2011.01)
*B22F 1/00* (2006.01)
*B82Y 30/00* (2011.01)

(52) U.S. Cl.
CPC .............. *B82Y 40/00* (2013.01); *B22F 1/0018* (2013.01); *B22F 9/24* (2013.01); *B82Y 30/00* (2013.01); *B22F 1/0025* (2013.01); *B22F 2001/0037* (2013.01); *B22F 2999/00* (2013.01)

(58) Field of Classification Search
None
See application file for complete search history.

(56) References Cited

U.S. PATENT DOCUMENTS

| 7,108,927 B2* | 9/2006 | Hattori et al. .............. 428/832.4 |
| 2005/0056118 A1* | 3/2005 | Xia et al. ........................ 75/330 |
| 2006/0207388 A1* | 9/2006 | Mirkin et al. ................... 75/371 |
| 2007/0034052 A1* | 2/2007 | Vanheusden et al. ........... 75/362 |
| 2007/0275259 A1* | 11/2007 | Lee et al. ........................ 428/546 |
| 2008/0041270 A1* | 2/2008 | Lee ......................... B22F 1/0018 106/31.92 |
| 2008/0245186 A1* | 10/2008 | Yang et al. ....................... 75/362 |
| 2010/0046072 A1* | 2/2010 | Matsunami .................... 359/492 |
| 2010/0069229 A1* | 3/2010 | Yang et al. .............. B01J 21/06 502/200 |
| 2010/0243020 A1* | 9/2010 | Norton et al. .......... B82Y 20/00 136/244 |
| 2011/0251055 A1* | 10/2011 | Fu et al. ........................ 502/339 |

* cited by examiner

*Primary Examiner* — George Wyszomierski
(74) *Attorney, Agent, or Firm* — Barry Choobin; Patent 360

(57) ABSTRACT

The embodiments herein provide a method of synthesis for metallic nano-products such as metallic nano-antennas, metallic nano-rods, metallic nano-wires, metallic nano-prolate spheroids and metallic nano-oblate spheroids using saturated and unsaturated carboxylic acids. The method involves preparing a reaction mixture by mixing a polar protic solvent, a polar aprotic solvent or a non-polar solvent, a saturated fatty acid or an unsaturated fatty acid and a metallic salt. Then a mixture of reducing agents is prepared by mixing a polar protic solvent, a polar aprotic solvent or a non-polar solvent and a saturated fatty acid or an unsaturated fatty acid. The reaction mixture and the mixture of reducing agents are combined and heated solvo-thermally for a pre-determined period of time at a pre-determined temperature.

10 Claims, 98 Drawing Sheets

METHOD FOR THE SYNTHESIS OF METALLIC NANO PRODUCTS

BACKGROUND

1. Technical Field

The embodiments herein generally relate to metallic nano-products such as metallic nano-antennas, metallic nano-rods, metallic nano-wires, metallic nano-prolate spheroids and metallic nano-oblate spheroids used in bio medical applications like sensing, imaging and photo thermal therapy. The embodiments herein more particularly relates to a method of producing the metallic nano-products using fatty acids and without using a shape regulating surfactants.

2. Description of the Related Art

Up-conversion of infrared (IR) light has been realized in a number of ways ranging from multi-photon processes, pair energy transfer and through phase matched nonlinear processes in rare earth and phosphor materials. All of these approaches have been improved over several years and in particular in fiber-based geometries where long interaction lengths and high intensities resulting from mode confinement provide obvious advantages. An obstacle to an efficient up-conversion of infrared light is the overall interaction cross section for the up-conversion process. Regardless of the specific mechanism, two or more particles, photons with photons, or photons with phonons must be combined to generate a visible photon in emission. At its basic level, a sensitization problem exists, which requires the cross sections or likelihood of absorption and emission to be greatly enhanced. This is of particular importance in a light bulb or other standard illumination source, when low power fluxes and thin interaction lengths are an additional constraint.

A molecule which absorbs energy near the particle surface at which the plasmon resonance of a nanoscale metallic particle occurs, experiences the enhanced field and absorb energy at a higher rate. Similarly, a radiating molecule can emit energy at the particle surface where plasmon resonance occur faster than it could into free space. The enhanced absorption behavior has been measured using dyes relevant to dye sensitized solar cells. The nanoscale metallic structures can act as high-gain antennae for light sensitive molecules similar to a metal rod acting as a gain antenna for a television set. When this nanoscale structure is much smaller than the wavelength of light, the structure concentrates, absorbs and transfers energy. For example, an antenna used to collect approximately one meter wavelength radio waves is sized to a similar one meter length to detect the radio waves in the air.

Gold nano-particles in a shape of a rod such as gold nanorods with uniform configuration have a strong absorption band in a region extending from visible light to near infrared rays and it is possible to change its absorption peak positions easily by controlling the configuration thereof. Gold nanorods have high aptitude as near-infrared probes because the modification of their surface enables change in their physical properties. The tuneable NIR absorbance of gold in conjunction with its low cytotoxicity has fueled research in the synthesis of rod-like gold nanocrystals for a wide range of biomedical applications such as sensing, imaging and photo-thermal therapy.

There are various conventionally known methods of manufacturing gold nanorods. They are electrolytic method, chemical reduction method and photo-reduction method.

In the electrolytic method, a solution containing a cationic surfactant is electrolyzed by a constant current and gold clusters are leached from a gold plate at the anode thereby generating gold nanorods. The surfactant used is a quaternary ammonium salt having a structure with four hydrophobic substituents bonded to a nitrogen atom. In addition tetradodecylammonium bromide (TDAB) is added to avoid formation of autonomous molecular assembly. Here the source of the gold supply is the gold clusters that are leached from a gold plate at the anode. In this method, the gold salt such as chlorauric acid is not used. Ultrasonic waves are radiated during electrolysis and a silver plate is immersed in the solution to accelerate the growth of the gold nanorods. The electrolytic method is characterized by the fact that the change of the area of the silver plate to be immersed separately from an electrode enables to control the length of the rod to be generated. The adjustment of the rod length enables setting of the absorption band in the near-infrared region from the vicinity of 700 nm to the vicinity of 1200 nm. If the reaction condition is uniformly maintained, gold nanorods with a uniform configuration can be manufactured to an extent. However, since the surfactant solution used for the electrolysis is a complex system containing excessive quaternary ammonium salt, cyclohexane and acetone and indefinite elements such as ultrasound wave radiation, it is difficult to theoretically analyze a cause-effect relationship between the configuration of the gold nanorods to be generated and various manufacturing conditions and to optimize the manufacturing conditions for the gold nanorods. Furthermore, it is not easy to scale up the manufacture of gold nano rods in electrolytic process due to the nature of the electrolysis thereby making it unsuitable for the large-scale manufacture of gold nanorods.

In the chemical reduction method, sodium borohydride ($NaBH_4$) reduces chlorauric acid to generate gold nanoparticles. These particles are considered as "seed particles" and growing them in a solution results in the production of the gold nanorods. The length of the gold nanorods to be generated is determined according to the quantitative ratio of the "seed particles" to the amount of chlorauric acid added to the growth solution. The chemical reduction method helps to generate longer gold nanorods in comparison with the electrolytic method. A gold nanorod produced by using chemical reduction method has an absorption peak of over 1200 nm in the near-infrared region. But the disadvantage of chemical reduction method is that it requires two reaction baths. One for preparation of seed particles and another for reaction to grow the "seed particles". Furthermore, it is difficult to increase the concentration of the gold nanorods generated and the generation concentration of the gold nanorods is very less as compared to the electrolytic method.

In the photo-reduction method, the chlorauric acid is added to substantially the same solution as that in the electrolytic method and exposed to ultraviolet irradiations. The ultraviolet irradiation results in the reduction of the chlorauric acid. A low-pressure mercury lamp is used for ultraviolet irradiation. In the photo-reduction method, gold nanorods can be directly generated without producing seed particles. The length of the gold nanorods can be controlled by the irradiation time. By this method, an excellent uniform configuration of the gold nanorods can be generated. As the large quantity of spherical particles coexist after reaction, it is necessary to separate the spherical particles by centrifuging. However, by this method, the ratio of the spherical particles is small so the separation is unnecessary. Furthermore, the reproducibility is excellent. The gold nanorods obtained after using a standard operation are of same size. But, the photo-reduction method is time consuming as it requires 10 hours or more for the completion of a reaction. The particles obtained do not have an absorption peak over 800 nm. Also, the light used from the low-pressure mercury lamp is harmful to the human body.

Moreover, a fundamental problem with all of these technologies is the need for surfactants, such as cetyltrimethylammonium bromide (CTAB), in order to induce the anisotropic particle growth in aqueous solution. Also, these surfactants are cytotoxic in nature.

Hence, there is a need to provide an alternate synthetic method which alleviates the need for shape-regulating surfactants.

The above mentioned shortcomings, disadvantages and problems are addressed herein and which will be understood by reading and studying the following specification.

OBJECTIVES

A primary object of the embodiments herein is to provide a method for the synthesis of metallic nano-products such as metallic nano-antennas, metallic nano-rods, metallic nano-wires, metallic nano-prolate spheroids and metallic nano-oblate spheroids by using saturated and unsaturated carboxylic acids thereby eliminating the need for shape-regulating surfactants.

Another object of the embodiments herein is to provide a simple method of manufacturing nanorods made of metals such as of gold, silver, copper and more particularly of gold in less time.

Yet another object of the embodiments herein is to provide a method for synthesizing the metallic nano particles without requiring a purification process after the reaction, since the generation ratio of spherical metallic nano-particles intermixed with by-products is less.

Yet another object of the embodiments herein is to provide a method for synthesizing the metallic nano-particles using fatty acid to adjust the size of metallic nano-particles.

Yet another object of the embodiments herein is to provide a method of manufacturing metallic nano-products to control the configuration of the metallic nano-products to control the spectral characteristic in a wide range extending from visible light region to near infrared rays region.

Yet another object of the embodiments herein is to provide a method to enable the formation of metallic nano-products in a range of tunable diameters and aspect ratios in the nanometer size scales.

Yet another object of the embodiments herein is to provide metallic nano-products having a dimension (of about 40 nm) much less than the wavelength of visible light (i.e., about 500 nm) to enable a significant and measurable up-conversion of infrared light.

Yet another object of the embodiments herein is to provide gold nano-particles in the shape of a rod to exhibit an absorption in both the infrared and visible light regions.

Yet another object of the embodiments herein is to provide nanostructure metallic nano-antennas, metallic nano-rods, metallic nano-wires, metallic nano-prolate spheroids and metallic nano-oblate spheroids exhibiting localized plasmon-polariton resonance having the first wavelength within the infrared spectrum and the second wavelength within the visible light spectrum.

Yet another object of the embodiments herein is to provide metallic nanostructures to locally enhance the electric fields near an up-converting phosphor or material in a television or radio receiver to enhance an absorption of energy and in transmitter at the radio station to enhance an emission of energy.

Yet another object of the embodiments herein is to develop metallic nanostructures to enhance the emission rate of an emitter.

Yet another object of the embodiments herein is to develop rod-like gold nano-crystals for use in a wide range of biomedical applications such as sensing, imaging and photo-thermal therapy.

Yet another object of the embodiments herein is to develop metallic dimers to improve the surface-enhanced Raman scattering (SERS).

Yet another object of the embodiments herein is to develop a linear nano-antenna to improve the tuning of an optical response as compared to a dimer.

Yet another object of the embodiments herein is to develop metallic nano-particles with dipoles or multipoles exhibiting multiple spectral resonance peaks at microwave or radio frequencies.

Yet another object of the embodiments herein is to develop metallic nano-particles with paired nanorods acting like nano-antenna to enhance the contrast of the spectra, when coupled between the aperture and the nanorods array.

Yet another object of the embodiments herein is to develop metallic nano-particles to enhance a transmission through an aperture probe.

Yet another object of the embodiments herein is to develop metallic nano-particles to form the linear nano-antennas having a pair of aligned nano-wires to enhance a local electric field within a feed gap due to the effect of a coupled surface plasmon resonance.

These and other objects and advantages of the embodiments herein will become readily apparent from the following detailed description taken in conjunction with the accompanying drawings.

SUMMARY

The various embodiments herein provide metallic nano-products comprising of various configurations such as antennas, rods, wires, prolate spheroids and oblate spheroids. The metallic nano-products are made up of a metallic salt, a surfactant, a reducing agent, a dispersant and a capping agent. The metallic salt used herein is gold salt. Fatty acid used herein acts as a surfactant, a reducing agent, a dispersant and also a capping agent. The fatty acid used can be either unsaturated or saturated carboxylic acid.

According to one embodiment herein the nano-product having an elongated shape has a length exceeding 30 nm and a diameter less than 200 nm. The nano-product having an elongated shape is a nano-rod having the length and the diameter dimension producing aspect ratio of between 2 and 10.

The various embodiments herein provide a method for the synthesis of metallic nano-products such as metallic nano-antennas, metallic nano-rods, metallic nano-wires, metallic nano-prolate spheroids and metallic nano-oblate spheroids. The embodiments herein provide a method of synthesizing metallic nano-products in the presence of saturated and unsaturated carboxylic acids by solvo-thermally heating the mixture for a pre-determined period of time at a pre-determined temperature. The metals herein may include one or more selected from a group consisting of silver, gold, copper, nickel, cobalt, platinum, palladium and their alloys. The saturated or unsaturated carboxylic acids used herein are saturated and unsaturated fatty acids acting as reducing agent, surfactant, dispersant and capping molecule. The configuration of the nano-product is controlled by adjusting the added amount of fatty acid and the amount of heating at a pre-determined temperature for a pre-determined period of time. The fatty acid used herein accelerates the major axis growth of certain metallic nano-products.

According to one embodiment herein, in a method of producing metallic nano-products, firstly, a reaction mixture is prepared by mixing a solvent, a fatty acid and a metallic salt. Secondly, a mixture of reducing agents is prepared by mixing a solvent and a fatty acid. Thirdly, the two solutions are combined and heated solvo-thermally at a pre-determined temperature for a pre-determined period of time. The metallic salt used herein is gold salt. The solvent used to prepare the two mixtures is a polar protic solvent, polar aprotic solvent or non-polar solvent. The pre-determined temperature herein is from 50° C. to 300° C. The pre-determined period of time herein is within the range of about 10 min to about 35 min, about 15 min to about 20 min, about 20 min to about 25 min, about 25 min to about 30 min, about 30 min to about 35 min. In the mixture of reducing agent fatty acid is acting as a reducing agent.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
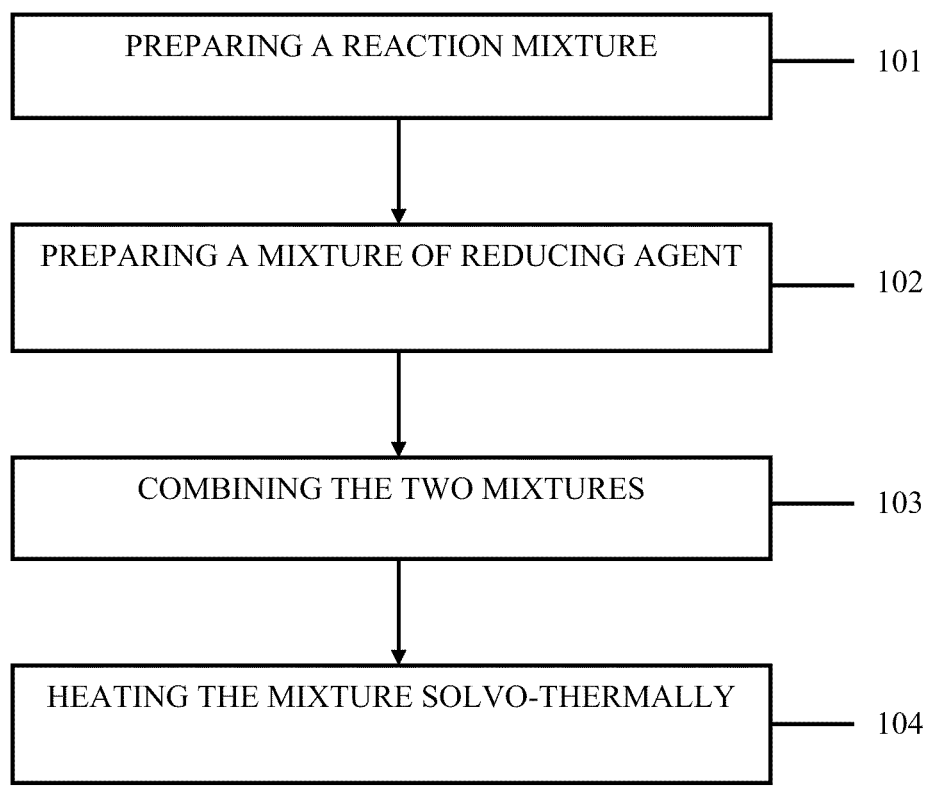
FIG. 1 is a flow chart illustrating the various steps of manufacturing the metallic nano-products.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for the synthesis of nano-products, such as metallic nano-antennas, metallic nano-rods, metallic nano-wires, metallic nano-prolate spheroids and metallic nano-oblate spheroids. The method allows metallic nano-products to be formed in a range of tunable diameters and aspect ratios in the nanometer size scales. The nanostructure metallic nano-antennas, metallic nano-rods, metallic nano-wires, metallic nano-prolate spheroids and metallic nano-oblate spheroids exhibit localized plasmon-polariton resonance. The first wavelength of these nano-structures is within the infrared spectrum and the second wavelength is within the visible light spectrum. The metallic nano-structures can be used to locally enhance the electric field near an up-converting phosphor or material to enhance both absorption of energy, for example, with a television or radio receiver and emission of energy, for example, energy emitted by a transmitter at a radio station. The term "metallic nano-antenna" used herein corresponds to paired nano-rods.

The metallic nano-products herein exhibit multiple resonance spectral range. The first plasmon-polariton resonance is tuned across a first axis of the nanostructure antenna to a first wavelength and a second plasmon-polariton resonance is tuned across a second axis of the nanostructure antenna to a second wavelength. The nano-scaled antenna has a dimension smaller than a wavelength of excitation of the localized plasmon-polariton resonance.

The conformation of metallic nano-products such as metallic nano-antennas, metallic nano-rods, metallic nano-wires, metallic nano-prolate spheroids and metallic nano-oblate spheroids are dipole or multipole geometrically. The dipoles or multipoles of metallic nano-products produce stronger field enhancement than the single metallic nano-products. The strength of field enhancement of dipole or multipole nano-product depends on nano-product length, gap dimension and its gap width. The dipole or multipole nano-product exhibit spectral resonance peak at microwave or radio frequencies. The paired nano-rods herein act like nano-antenna and an array of them, initially designed, act as a negative-index material for the near infrared region. Coupling between the aperture and the nano-rod array makes the contrast higher. Transmission through the aperture is enhanced when the aperture probe is positioned between the nano-rods.

The metallic dimers, linear nano-antennas (a pair of aligned nanowires) and bowtie nano-antennas enhance the local electric field within their feed gap because of the effect of coupled surface plasmon resonance (SPR). These metallic dimers can also be successfully applied for the surface-enhanced Raman scattering (SERS).

The metallic nano-antennas, metallic nano-rods, metallic nano-wires, metallic nano-prolate spheroids and metallic nano-oblate spheroids refer to nano-products having an elongated shape wherein the length and diameter dimension produce aspect ratios of between 2 and 10. With respect to an individual nano-product "aspect ratio" as used herein refers to the length divided by diameter of the individual nano-products. The elongated nano-products have a length exceeding 30 nm and a diameter less than 200 nm.

With respect to bulk material "aspect ratio" refers to the averaged aspect ratio that is characterized based on the average length and diameter dimensions obtained by sampling the individual nano-products contained in the bulk material. Herein, the "nano-rods" refer to the nano-product having an elongated shape wherein the length and diameter dimension produce aspect ratios of between 2 and 10.

The synthesized non-spherical prolate spheroids or rod shaped nano-particles according to the embodiments herein, exhibit symmetry which thus breaks the limitation of the spherical shape resulting in two plasmon resonances associated with excitation along each axis.

According to one embodiment herein by a proper choice of the aspect ratio along each axis, two plasmon resonances can be tuned to the infrared spectrum and the visible spectrum for up-conversion application. The infrared resonance at and near the metallic nanostructures enhance the absorption of the light to be up-converted, while the visible resonance enhances the emission of the up-converted light. The absorbance by materials having the plasmon enhanced response can be tuned to other wavelengths using the shape of the particle, such as an aspect ratio of length to width. Gold particles shaped as rods can exhibit response and local field enhancements in the infrared spectrum, whereas a spherical particle will exhibit a response only in the visible light portion of the spectrum. Absorption features are present in both the infrared and visible light spectrum in the case of rod-shaped particles. A molecule near the particle surface, which absorbs energy where the plasmon resonance of a nano-scaled metallic particle occurs experiences the enhanced field and absorbs energy at a higher rate. Similarly, a molecule radiating where plasmon resonance occur can emit energy faster than it could into free space. The nanoscale metallic structures act as high-gain antennae for light sensitive molecules similar to a metal rod acting as a gain antenna for a television set. When the nanoscale structure is much smaller than the wavelength of light the structure concentrates, absorbs and transfers energy. For example, an antenna used to collect approximately one meter wavelength radio waves is sized to a similar one meter length to detect the radio waves in the air. According to one embodiment herein, a metallic nanostructure having a dimension of about 40 nanometers, which is much less than the wavelength of visible light (i.e., about 500 nanometers), provides for a significant and measurable up-conversion of infrared light.

The various embodiments herein provide a method of synthesizing metallic nano-products in the presence of saturated and unsaturated carboxylic acids by solvo-thermally heating the mixture of acids and metallic salt for a pre-determined period of time. The solvo-thermal process of heating is said to be a reaction or a transformation of precursors in the presence of a solvent in a close system and at a temperature higher than the boiling temperature of the solvent and consequently at least an autogenous pressure parameter is also involved.

According to one embodiment herein, a method is provided, wherein size of metal nano-products can be adjusted and the stability of dispersion can be obtained by the fatty acid. The various configurations of metallic nano-products are metallic nano-antennas, metallic nano-rods, metallic nano-wires, metallic nano-prolate spheroids and metallic nano-oblate spheroids. The configuration of the nano-product is controlled by adjusting the amount of least one type of the saturated carboxylic acid or unsaturated carboxylic acid (fatty acid), the amount of heating the mixture at a pre-determined temperature for a pre-determined period of time.

According to an embodiment herein, the nano-products such as metallic nano-antennas, metallic nano-rods, metallic nano-wires, metallic nano-prolate spheroids and metallic nano-oblate spheroids are synthesized by providing a mixture of polar protic solvents, polar aprotic solvents or non-polar solvents and at least one unsaturated carboxylic acids or saturated carboxylic acids with a metallic salt solution and considered as reaction mixture. A solution of reducing agents is prepared by mixing polar protic solvents, polar aprotic solvents or non-polar solvents and at least one unsaturated carboxylic acids or saturated carboxylic acids. The reaction mixture and the mixture of reducing agents are mixed and heated for a pre-determined temperature and pre-determined period of time.

FIG. 1 illustrates a flow chart showing the steps of producing the metallic nano-products. With respect to FIG. 1, a reaction mixture is prepared by dissolving a gold salt in a mixture of solvent and a fatty acid (101). A mixture of reducing agent is prepared by mixing a fatty acid with a solvent (102). The two mixtures are combined (103) and heated solvo-thermally at a pre-determined temperature for a pre-determined period of time (104).

According to the embodiments herein, the heating of the mixture for a pre-determined period of time comprises solvo-thermally treating the mixture. The higher the temperature, the greater the diameter of the nano-product; and the longer the period, the longer the lengths of the nano-product. The heating temperature herein is 50° C. to 300° C.

As used herein with respect to practice of the methods, the terms "added", "mixed" or "combined" are generally interchangeable and refer to the act of adding, mixing or combining one or more of the reactants with one or more other reactants. This can occur by adding reactants to, or mixing or combining the reactants in, the reaction vessel and/or with each other.

The content of the reducing agent is x/y mole ratio with respect to the gold salt. If the content of the reducing agent is less than x mole ratio, reducing power is too weak to obtain the desired effect. If the content of the reducing agent is more than y mole ratio, the reaction is too explosive to control the reaction. The content of reducing agent may be determined according to reaction time, reaction temperature and desirable oxidation state of gold nano-particles. The temperature in heat reaction after adding the reducing agent may be 50 to 150° C. For a gold salt concentration in the synthesis solution, a range of 0.5 mM to 20 mM is appropriate, and a range of 1 mM to 5 mM is more preferable.

According to the embodiments herein, the metallic salt solution comprises of gold salt solution. The gold salt can be a gold hydroxide or an organic or inorganic gold salt. Non-limiting examples of suitable gold compounds include gold salts of inorganic and organic acids such as nitrates, nitrites, sulfates, halides (e.g., fluorides, chlorides, bromides and iodides), carbonates, phosphates, azides, borates (including fluoroborates, pyrazolylborates, etc.), sulfonates, carboxylates (such as, e.g., formates, acetates, propionates, oxalates and citrates), substituted carboxylates (including halogenocarboxylates such as, e.g., trifluoroacetates, hydroxycarboxylates, aminocarboxylates, etc.) and salts and acids wherein the gold is part of an anion (such as, e.g., hexachloroplatinates, tetrachloroaurate, tungstates and the corresponding acids) as well as combinations of any two or more of the foregoing. Further non-limiting examples of suitable gold compounds according to one embodiment herein includes alkoxides, complex salts of gold such as, e.g., beta-diketonates (e.g., acetylacetonates), complexes with amines, N-heterocyclic compounds (e.g., pyrrole, aziridine, indole, piperidine, morpholine, pyridine, imidazole, piperazine, triazoles, and substituted derivatives thereof), aminoalcohols (e.g., ethanolamine, etc.), amino acids (e.g., glycine, etc.), amides (e.g., formamides, acetamides, etc.), and nitriles (e.g., acetonitrile, etc.) as well as combinations of any two or more of the foregoing. According to the embodiments herein the gold compound is selected such that the reduction by-product is volatile and/or can be decomposed into a volatile by-product at a relatively low temperature.

The solvent used to dissolve the gold compound to thereby form the gold solution may be a single solvent or a mixture of two or more solvents (individually or collectively (as appropriate) referred to herein as 'gold solvent'). According to one embodiment the gold solvent is the polyol (i.e. a single polyol or a mixture of polyols). In one embodiment, the gold solvent is a mixture of the polyol and one or more other solvents that, for example, may be selected because the gold compound is more soluble in this solvent or these solvents. In one embodiment, the gold solvent does not comprise the polyol but rather comprises one or more other solvents that, for example, may be selected because the gold compound is more soluble in the selected solvent or solvents than it is in the polyol. According to one embodiment, the gold solvent can be selected to dissolve a significant amount, or all, of the gold compound at room temperature and/or at the temperature that the gold solution is intended to have when it is combined (e.g. mixed) with the one or more of the other reactants. Solvents, other than the polyol, that may be used to produce the gold solution include protic and aprotic polar solvents that are non-oxidative. Non-limiting examples of such solvents include aliphatic, cycloaliphatic and aromatic alcohols (the term "alcohol" as used herein is used interchangeably with the terms "monoalcohol" and "monohydric alcohol") such as, e.g., ethanol, propanol, butanol, pentanol, cyclopentanol, hexanol, cyclohexanol, octanol, decanol, isodecanol, undecanol, dodecanol, benzyl alcohol, butyl carbitol and the terpineols, ether alcohols such as, e.g., the monoalkyl ethers of diols such as, e.g., the $C_{1-6}$ monoalkyl ethers of $C_{1-6}$ alkanediols and polyetherdiols derived therefrom (e.g., the monomethyl, monoethyl, monopropyl and monobutyl ethers of ethylene glycol, diethylene glycol, triethylene glycol, propylene glycol, dipropylene glycol, 1,3-propanediol, and 1,4-butanediol such as, e.g., 2-methoxyethanol, 2-ethoxyethanol, 2-propoxyethanol and 2-butoxyethanol), aminoalcohols such as, e.g., ethanolamine, amides such as, e.g., dimethylformamide, dimethylacetamide 2-pyrrolidone and N-methylpyrrolidone, esters such as, e.g., ethyl acetate and ethyl formate, sulfoxides such as, e.g., dimethylsulfoxide, ethers such as, e.g., tetrahydrofuran and tetrahydropyran.

The temperature of the gold solution may, at least in part, depend on the nature of the gold solvent. In addition to the potential for prematurely reducing the gold compound to gold metal, other factors should be considered when determining the temperature of the gold solution. According to one embodiment herein too low a temperature may increase the viscosity of the solution and/or reduce the solubility of the gold compound to an undesirable degree. Too low a temperature may also significantly lower the reaction temperature or the temperature of other reactants when the gold solution is combined with the other reactants. Thus, the ordinary practitioner will appreciate that the temperature of the gold solution during storage and at the time when it is combined with the other reactants can be selected to influence the product of the carboxylic acids reaction.

If the gold solvent is a carboxylic acid, the gold solution can be maintained at or below boiling point, at or below 50° C.; at or below 40° C., at or below 30° C. or at ambient temperature. A temperature above 50° C. is not prohibited but it should be kept in mind that a lower temperature reduces the reaction rate of the reductive conversion of the gold compound to gold metal. The length of time the gold solution is to be stored before it is used is also a consideration. If the gold solution need to be stored before it is used it can be kept cool (even below ambient temperature) under conditions that prevent (or minimize) the gold compounds' reduction and then warmed to the appropriate temperature before use.

If the gold solvent does not comprise a carboxylic acid and does not contain a reducing agent or reducing agents, the temperature of the gold solution can be elevated above ambient temperature to, for example, increase the solubility of the gold compound and/or to avoid a large drop in reaction temperature when the gold solution is combined with the other reactants. If the solvent does contain a carboxylic acid, then for a very short time, the temperature of the gold solvent may be elevated. Thus, in the embodiments herein, the temperature of the gold solution can be about room temperature. In the embodiments herein, the temperature of the gold solution can be higher than ambient temperature or even significantly above ambient temperature. In the embodiments herein, the gold solution can be heated to the intended reaction temperature, or above this temperature, so that combining the gold solution with one or more of the other reactants does not result in a substantial decrease in the reaction temperature of the reaction mixture. By "substantial decrease" we mean a decrease in the reaction temperature of at least 5° C.

According to one embodiment, the temperature of the gold solution can be 50° C. or above. In the embodiments herein, the temperature of the gold solution can be 60° C. or above; can be 70° C. or above, can be 80° C. or above, can be 90° C. or above, can be 100° C. or above, can be 110° C. or above, can be 120° C. or above, can be 130° C., and before boiling point of the solvents used herein. Accordingly, in the embodiments herein, those of skilled in the art, using no more than knowledge available to the ordinary practitioner, the disclosure provided herein and routine experimentation, can select an appropriate temperature for the gold solution to preferentially produce gold nanoproducts as compared with other nano-products.

As used herein the "reaction temperature" refers to the temperature of the heat source applied to the reaction vessel or the actual temperature of the reaction mixture during the reaction as determined by direct monitoring. For example, the reaction temperature can be the temperature of an oil bath used to heat the vessel containing all the reactants of a carboxylic acids reaction or could be the temperature of the reaction mixture as determined by a thermometer or thermocouple inserted into said reaction mixture. According to the embodiments herein, the reaction temperature is within the range of: about 90° C. to about 95° C., about 95° C. to about 100° C., about 100° C. to about 105° C., about 105° C. to about 110° C.

The reaction time is measured from the time that at least a portion of each of the reactants to be reacted are combined (i.e. there must be a mixture that contains at least a portion of each of the reactants that are to be reacted) and then extends through any time where a continued combining of the reactants occurs until the time when all reactants have been added to the reaction. The reaction time also includes the time after all of the reactants have been combined during which nano-products are produced. The reaction time also includes the time after nano-products are produced, the reaction is cooled and until the process of separating the metal from the other components of the product solution (e.g. by decanting, filtration, precipitation, or centrifugation) is completed. There is no limitation on the reaction time. It can be as short as 1-2 minutes (or shorter) or as long as a week (or longer). In general the reaction is complete when the gold metal has formed nano-products.

According to one embodiment herein the reaction time can be from about 15 minutes to about 24 hours. In the embodiments herein, reaction time can be from about 30 minutes to about 5 hours. In the embodiments herein, reaction time can be from about 1 to about 4 hours. In the embodiments herein, reaction time can be from about 15 minutes to about 1 hour. In one embodiment, reaction time can be from about 30 minutes to about 45 minutes. According to the embodiments herein the reaction time is within the range of about 10 min to about 35 min, about 15 min to about 20 min, about 20 min to about 25 min, about 25 min to about 30 min, about 30 min to about 35 min. It is to be understood that these time frames are not limiting as the reactions time can also be extremely short or extremely long. The only limitation is that the reaction produces the desired nano-products, such as gold nanoproducts. In one embodiment, the reaction time can be from about 2 minutes to several weeks, months or even years. Thus, in the embodiments herein, using no more than the disclosure provided herein and routine experimentation, one of skilled in the art can select an appropriate reaction time to preferentially produce gold nanoproducts compared with other nano-products.

As used herein, the fatty acid refers to a carboxylic acid with a long un-branched aliphatic tail (chain) which is either saturated or unsaturated. Carboxylic acids as short as butyric acid (4 carbon atoms) are considered to be fatty acids, whereas fatty acids derived from natural fats and oils may be assumed to have at least eight carbon atoms, for example, caprylic acid (octanoic acid). The most abundant natural fatty acids have an even number of carbon atoms because their biosynthesis involves acetyl-CoA, a coenzyme carrying a two-carbon-atom group. Fatty acids are produced by the hydrolysis of the ester linkages in fat or biological oil (both of which are triglycerides) with the removal of glycerol. Fatty acids are aliphatic monocarboxylic acids derived from, or contained in esterified form, in an animal or vegetable fat, oil or wax. Natural fatty acids commonly have a chain of four to 28 carbons (usually un-branched and even numbered) which may be saturated or unsaturated. By extension, the term is sometimes used to embrace all acyclic aliphatic carboxylic acids. This would include acetic acid, which is not usually considered a fatty acid because it is so short. Fatty acids can be saturated and unsaturated, depending on double bonds. They differ in length as well. Unsaturated fatty acids are of similar form, except that one or more alkenyl functional groups exist along the chain, with each alkene substituting a single-bonded "—CH2-CH2-" part of the chain with a double-bonded "—CH═CH—" portion (that is, a carbon double-bonded to another carbon). The two next carbon atoms in the chain that are bound to either side of the double bond can occur in a cis or trans configuration.

A cis configuration means that adjacent hydrogen atoms are on the same side of the double bond. The rigidity of the double bond freezes its conformation and, in the case of the cis isomer, causes the chain to bend and restricts the conformational freedom of the fatty acid. The more double bonds the chain has in the cis configuration, the less flexibility it has. When a chain has many cis bonds, it becomes quite curved in its most accessible conformations. For example, oleic acid with just one double bond has a "kink" in it whereas linoleic acid with two double bonds has a more pronounced bend. Alpha-linolenic acid with three double bonds favors a hooked shape. The effect of this is that in restricted environments such as when fatty acids are part of a phospholipid in a lipid bilayer or triglycerides in lipid droplets, cis bonds limit the ability of the fatty acids to be closely packed and therefore could affect the melting temperature of the membrane or of the fat.

A trans configuration, by contrast, means that the next two hydrogen atoms are bound to opposite sides of the double bond. As a result, they do not cause the chain to bend much, and their shape is similar to straight saturated fatty acids.

As used herein, saturated fatty acid refers to a long-chain carboxylic acid that usually has between 12 and 24 carbon atoms that has no double bonds. Thus, saturated fatty acids are saturated with hydrogen (since double bonds reduce the number of hydrogen on each carbon). For example, lauric acid (12 C), myristic acid (14 C), palmitic acid (16 C), stearic acid (18 C), arachidic acid (20 C).

As used herein, the carboxylic acid refers to organic acid characterized by the presence of at least one carboxyl group. The general formula of a carboxylic acid is R—COOH, where R is some monovalent functional group. A carboxyl group (or carboxy) is a functional group consisting of a carbonyl and a hydroxyl having the formula —C(=O)OH, usually written as —COOH or —CO2H.

Carboxylic acids are Bronsted-Lowry acids as they are proton donors. They are the most common type of organic acid. Among the simplest examples are the formic acid (H—COOH) that occurs in ants and acetic acid (CH3-COOH) that gives vinegar its sour taste. Acids with two or more carboxyl groups are called dicarboxylic acid, tricarboxylic acid, etc. The simplest dicarboxylic example is oxalic acid (COOH)$_2$ which is just two connected carboxyls (—COOH). Mellitic acid is an example of a hexacarboxylic acid. Other important natural examples are citric acid (in lemons) and tartaric acid (in tamarinds). Carboxylic acids are most readily identified as such by infrared spectroscopy. They exhibit a sharp band associated with vibration of the C—O vibration bond (vC=O) between 1680 and 1725 cm$^{-1}$. A characteristic vO—H band appears as a broad peak in the 2500 to 3000 cm$^{-1}$ region. By 1H NMR spectrometry, the hydroxyl hydrogen appears in the 10-13 ppm region, although it is often either broadened or not observed owing to exchange with traces of water. Carboxylic acids are polar by nature because they are both hydrogen-bond acceptors (the carbonyl) and hydrogen-bond donors (the hydroxyl). They also participate in hydrogen bonding. Together the hydroxyl and carbonyl group forms the functional group carboxyl. Carboxylic acids usually exist as dimeric pairs in nonpolar media due to their tendency to "self-associate." Smaller carboxylic acids (1 to 5 carbons) are soluble with water, whereas higher carboxylic acids are less soluble due to the increasing hydrophobic nature of the alkyl chain. These longer chain acids tend to be rather soluble in less-polar solvents such as ethers and alcohols.

According to the embodiments herein, the saturated carboxylic acids or unsaturated carboxylic acids used are saturated and unsaturated fatty acids. The saturated carboxylic acid or unsaturated carboxylic acids are expressed by the following expression: $C_nH_{2n}O_2$, $C_nH_{2n-2}O_2$, $C_nH_{2n-4}O_2$, $C_nH_{2n-6}O_2$, $C_nH_{2n-3}{}^O{}_2$, $C_nH_{2n-10}O_2$, $C_nH_{2n-12}O_2$, where n is an integer of 10-18.

The fatty acids herein are the compounds acting as a reducing agent, surfactant, dispersant and capping molecule. The fatty acid referred to as herein is saturated or unsaturated fatty acids of $C_3$-$C_{22}$. According to the embodiments herein the saturated carboxylic acids or the unsaturated carboxylic acid used herein act as reducing agent and also act as surfactant. The various examples of the fatty acid used herein may be one or more compounds selected from the group consisting of hexanoic acid, heptanoic acid, nonanoic acid, decanoic acid, undecanoic acid, dodecanoic acid, oleic acid, myristic acid, palmitic acid, stearic acid, linoleic acid and linolenic acid. According to the embodiments herein the fatty acids used are one or more selected from a group consisting of dodecanoic acid ($C_{11}H_{23}COOH$), oleic acid ($C_{17}H_{33}COOH$), hexadecanoic acid ($C_{15}H_{33}COOH$) and tetradecanoic acid ($C_{13}H_{27}COOH$). Among the fatty acids used herein at least one acts as a reducing agent. The size of the metallic nanoparticles is adjustable and the stability of dispersion is obtained by the fatty acids. The fatty acid accelerates the major axis growth of nano-products such as metallic nano-antennas, nano-wires, prolate spheroids and oblate spheroids. The major axis growth as used herein refers to the length dimension of the nano-products.

The saturated fatty acids herein used are long-chain carboxylic acids that have carbon atoms from 12 to 24, without any double bond. The various saturated fatty acids, for example, are as follows: acetic ($C_2$), propionic ($C_3$), butyric ($C_4$), valeric ($C_5$), hexanoic ($C_6$), heptanoic ($C_7$), caprylic ($C_8$), nonanoic ($C_9$), decanoic ($C_{10}$), lauric ($C_{12}$), myristic ($C_{14}$), palmitic ($C_{16}$), heptadecanoic ($C_{17}$), stearic ($C_{18}$), arachidic ($C_{20}$), behenic ($C_{22}$), lignoceric ($C_{24}$), tetratriacontanoicacid ($C_{34}$). According to one embodiment herein, the fatty acid is selected from a group consisting of saturated fatty acids ($C_nH_{2n}O_2$) such as oleic acids ($C_nH_{2n-2}O_2$), linoleic acid ($C_nH_{2n-4}O_2$), linolenic acid ($C_nH_{2n-6}O_2$) and high unsaturated acids ($C_nH_{2n-8}O_2$, $C_nH_{2n-10}O_2$, $C_nH_{2n-12}O_2$) where n is an integer of 10-18. The type of saturated carboxylic acid used herein is such that the nano-product precursor is non-volatile at the temperature in which the nano-product precursor is heated.

The unsaturated fatty acids used herein are of similar form, except that one or more alkenyl functional groups exist along the chain, with each alkene substituting a single-bonded "—CH2-CH2-" part of the chain with a double-bonded "—CH=CH—" portion. The various unsaturated fatty acids, for example, are as follows: omega-3 unsaturated fatty acid (like α-linolenic, stearidonic, eicosapentaenoic, docosahexaenoic), omega-6 unsaturated fatty acid (like linoleic, γ-linolenic, dihomo-γ-linolenic, arachidonic), omega-9 unsaturated fatty acid (like oleic, elaidic, eicosenoic, erucic, nervonic). The type of unsaturated carboxylic acid is such that the nano-product precursor is non-volatile at the temperature in which the nano-product precursor is heated.

Solvents with a relative static permittivity greater than 15 can be further divided into protic and aprotic. Protic solvents solvate anions (negatively charged solutes) strongly via hydrogen bonding. Water is a protic solvent. Aprotic solvents such as acetone or dichloromethane tend to have large dipole moments (separation of partial positive and partial negative charges within the same molecule) and solvate positively charged species via their negative dipole. In chemical reactions the use of polar protic solvents favors the $SN_1$ reaction mechanism, while polar aprotic solvents favor the $SN_2$ reaction mechanism.

Table-1 shows the properties of common solvents. With respect to table-1, the solvents are grouped into non-polar, polar aprotic and polar protic solvents and written in increasing order of their polarity. The polarity is given as the dielectric constant. The properties of solvents that exceed those of water are bolded.

TABLE 1

SHOWING THE PROPERTIES OF COMMON SOLVENTS

| SOLVENT | CHEMICAL FORMULA | BOILING POINT (° C.) | DIELECTRIC CONSTANT | DENSITY (g/ml) | DIPOLE MOMENT (D) |
|---|---|---|---|---|---|
| NON-POLAR SOLVENTS | | | | | |
| Pentane | $CH_3-CH_2-CH_2-CH_2-CH_3$ | 36 | 1.84 | 0.626 | 0.00 |
| Cyclopentane | $C_5H_{10}$ | 40 | 1.97 | 0.751 | 0.00 |
| Hexane | $CH_3-CH_2-CH_2-CH_2-CH_2-CH_3$ | 69 | 1.88 | 0.655 | 0.00 |
| Cyclohexane | $C_6H_{12}$ | 81 | 2.02 | 0.779 | 0.00 |
| Benzene | $C_6H_6$ | 80 | 2.3 | 0.879 | 0.00 |
| Toluene | $C_6H_5-CH_3$ | 111 | 2.38 | 0.867 | 0.36 |
| 1,4-Dioxane | $/-CH_2-CH_2-O-CH_2-CH_2-O-\backslash$ | 101 | 2.3 | 1.033 | 0.45 |
| Chloroform | $CHCl_3$ | 61 | 4.81 | 1.498 | 1.04 |
| Diethyl ether | $CH_3CH_2-O-CH_2-CH_3$ | 35 | 4.3 | 0.713 | 1.15 |
| POLAR APROTIC SOLVENTS | | | | | |
| Dichloromethane (DCM) | $CH_2Cl_2$ | 40 | 9.1 | 1.3266 | 1.60 |
| Tetrahydrofuran (THF) | $/-CH_2-CH_2-O-CH_2-CH_2-\backslash$ | 66 | 7.5 | 0.886 | 1.75 |
| Ethyl acetate | $CH3-C(=O)-O-CH2-CH3$ | 77 | 6.02 | 0.894 | 1.78 |
| Acetone | $CH_3-C(=O)-CH_3$ | 56 | 21 | 0.786 | 2.88 |
| Dimethylformamide (DMF) | $H-C(=O)N(CH_3)_2$ | 153 | 38 | 0.944 | 3.82 |
| Acetonitrile (MeCN) | $CH_3-C\equiv N$ | 82 | 37.5 | 0.786 | 3.92 |
| Dimethylsulfoxide (DMSO) | $CH_3-S(=O)-CH_3$ | 189 | 46.7 | 1.092 | 3.96 |
| POLAR PROTIC SOLVENTS | | | | | |
| Formic acid | $H-C(=O)OH$ | 101 | 58 | 1.21 | 1.41 |
| n-butanol | $CH_3-CH_2-CH_2-CH_2-OH$ | 118 | 18 | 0.810 | 1.63 |
| Isopropanol (IPA) | $CH_3-CH(-OH)-CH_3$ | 82 | 18 | 0.785 | 1.66 |
| n-propanol | $CH3-CH2-CH2-OH$ | 97 | 20 | 0.803 | 1.68 |
| Ethanol | $CH_3-CH_2-OH$ | 79 | 30 | 0.789 | 1.69 |
| Methanol | $CH_3-OH$ | 65 | 33 | 0.791 | 1.70 |
| Acetic acid | $CH_3-C(=O)OH$ | 118 | 6.2 | 1.049 | 1.74 |
| Water | $H-O-H$ | 100 | 80 | 1.000 | 1.85 |

There is another powerful way to look at these same solvents that is by knowing their Hansen solubility parameter values (HSPiP), which are based on δD=dispersion bonds, δP=polar bonds and δH=hydrogen bonds. By using these parameters and their inter-molecular interactions with other solvents and with polymers, pigments, nanoparticles etc. one can perform two operations: firstly, one can create rational formulations by knowing a good HSP match between a solvent and a polymer. Secondly, one can make rational substitutions for "good" solvents (as they dissolve things well) that are "bad" for the environment, for health and have a high cost etc.

Table-2 shows the values of various parameters like dispersion bonds, polar bonds and hydrogen bonds for various "non-polar", "polar aprotic" and "polar protic" solvents.

TABLE 2

SHOWING THE VALUES OF DISPERSION BONDS, POLAR BONDS AND HYDROGEN BONDS

| SOLVENT | CHEMICAL FORMULA | DISPERSION (δD) | POLAR (δP) | HYDROGEN BONDING (δH) |
|---|---|---|---|---|
| NON-POLAR SOLVENTS | | | | |
| Hexane | $CH_3-CH_2-CH_2-CH_2-CH_2-CH_3$ | 14.9 | 0.0 | 0.0 |
| Benzene | $C_6H_6$ | 18.4 | 0.0 | 2.0 |
| Toluene | $C_6H_5-CH_3$ | 18.0 | 1.4 | 2.0 |
| Diethyl ether | $CH_3CH_2-O-CH_2-CH_3$ | 14.5 | 2.9 | 4.6 |
| Chloroform | $CHCl_3$ | 17.8 | 3.1 | 5.7 |
| Ethyl acetate | $CH_3-C(=O)-O-CH_2-CH_3$ | 15.8 | 5.3 | 7.2 |
| POLAR APROTIC SOLVENTS | | | | |
| 1,4-Dioxane | $/-CH_2-CH_2-O-CH_2-CH_2-O-\backslash$ | 17.5 | 1.8 | 9.0 |
| Tetrahydrofuran (THF) | $/-CH_2-CH_2-O-CH_2-CH_2-\backslash$ | 16.8 | 5.7 | 8.0 |
| Dichloromethane | $CH_2Cl_2$ | 17.0 | 7.3 | 7.1 |
| Acetone | $CH_3-C(=O)-CH_3$ | 15.5 | 10.4 | 7.0 |

TABLE 2-continued

SHOWING THE VALUES OF DISPERSION BONDS, POLAR BONDS AND HYDROGEN BONDS

| SOLVENT | CHEMICAL FORMULA | DISPERSION ($\delta$D) | POLAR ($\delta$P) | HYDROGEN BONDING ($\delta$H) |
|---|---|---|---|---|
| Acetonitrile (MeCN) | $CH_3-C\equiv N$ | 15.3 | 18.0 | 6.1 |
| Dimethylformamide (DMF) | $H-C(=O)N(CH_3)_2$ | 17.4 | 13.7 | 11.3 |
| Dimethyl Sulfoxide (DMSO) | $CH_3-S(=O)-CH_3$ | 18.4 | 16.4 | 10.2 |
| POLAR PROTIC SOLVENTS | | | | |
| Acetic acid | $CH_3-C(=O)OH$ | 14.5 | 8.0 | 13.5 |
| n-Butanol | $CH_3-CH_2-CH_2-CH_2-OH$ | 16.0 | 5.7 | 15.8 |
| Isopropanol | $CH_3-CH(-OH)-CH_3$ | 15.8 | 6.1 | 16.4 |
| n-propanol | $CH_3-CH_2-CH_2-OH$ | 16.0 | 6.8 | 17.4 |
| Ethanol | $CH_3-CH_2-OH$ | 15.8 | 8.8 | 19.4 |
| Methanol | $CH_3-OH$ | 14.7 | 12.3 | 22.3 |
| Formic acid | $H-C(=O)OH$ | 14.6 | 10.0 | 14.0 |
| Water | $H-O-H$ | 15.5 | 16.0 | 42.3 |

Table-2 shows that the intuitions from "non-polar", "polar aprotic" and "polar protic" are put numerically and the "polar" molecules have higher levels of δP and the protic solvents have higher levels of δH. Because numerical values are used, comparisons can be made rationally by comparing numbers. So acetonitrile is much more polar than acetone but slightly less in hydrogen bonding.

By considering a simple example of rational substitution. Suppose for environmental reasons we needed to replace the chlorinated solvent, chloroform, with a solvent (blend) of equal solvency using a mixture of two non-chlorinated solvents from this table via trial-and-error, a spreadsheet or some software such as HSPiP. We found that a 50:50 mix of toluene and 1,4 dioxane is a close match. The δD of the mixture is the average of 18.0 and 17.5=17.8. The δP of the mixture is the average of 1.4 and 1.8=1.6 and the OH of the mixture is the average of 2.0 and 9.0=5.5. So the mixture is 17.8, 1.6, 5.5 compared to Chloroform at 17.8, 3.1, 5.7. Because Toluene itself has many health issues, other mixtures of solvents can be found using a full Hansen solubility parameter dataset.

According to the embodiments herein the polar protic solvents, polar aprotic solvents or non-polar solvents used as solvents of unsaturated carboxylic acids and saturated carboxylic acids are acetone, diethyl ether, chloroform, methanol, hexane, ethylene glycol. The one or more non-polar solvents consists of organic solvents and may be one or more non-aqueous solvents selected from the group consisting of hexane, toluene, xylene, chloroform, dichloromethane, tetradecane, octadecene, chlorobenzoic acid, 1-hexadecene, 1-tetradecene and 1-octadecene.

EXPERIMENTAL DATA

The gold salt was dissolved in the solvent, the reducing agent herein fatty acid was added to it and the mixture was heated solvo-thermally. The salt consists of Gold Chloride Trihydrate ($HAuCl_4.3H_2O$), herein used as a precursor for the production of gold nanoparticles. The examples herein are provided using various saturated and unsaturated fatty acid. The content of the reducing agent is x/y mole ratio with respect to the gold salt. If the content of the reducing agent, used herein, is less than x mole ratio, reducing power is too weak to obtain the desired effect. If the content of the reducing agent is more than y mole ratio, the reaction is too explosive to control the reaction. The temperature in heat reaction after adding the reducing agent may be 50 to 150° C. For a gold salt concentration, a range of 0.5 mM to 20 mM is appropriate, and a range of 1 mM to 5 mM is more preferable. The embodiments described herein will become clearer with the help of various examples cited below.

With respect to the various examples cited, herein after, gold nano-particles were manufactured using the following fatty acids: palmitic acid, stearic acid, oleic acid, linoleic acid and investigated by using various techniques like Transmission electronic microscopy (TEM), Attenuated total reflection-Fourier transform infrared spectroscopy (ATR-TIR), X-ray diffraction (XRD), Differential Scanning calorimetry (DSC), Scanning electronic microscopy (SEM) and Atomic force microscopy (AFM).

The infrared spectra (IR) were obtained with a NEXUS 870 Fourier transform spectrometer (Thermo Nicolet Corp.). A ZnSe crystal attachment together with the mercury cadmium telluride detector was used to record the attenuated total reflection (ATR) spectrum. Each spectrum was obtained by averaging 64 interferograms with resolution of 4 $cm^{-1}$. All spectra were recorded in the range from 4000 to 600 $cm^{-1}$. The transmission spectra for the surfactant-coated Au nanoparticles were taken after making pellets with KBr powder.

Figure 2:
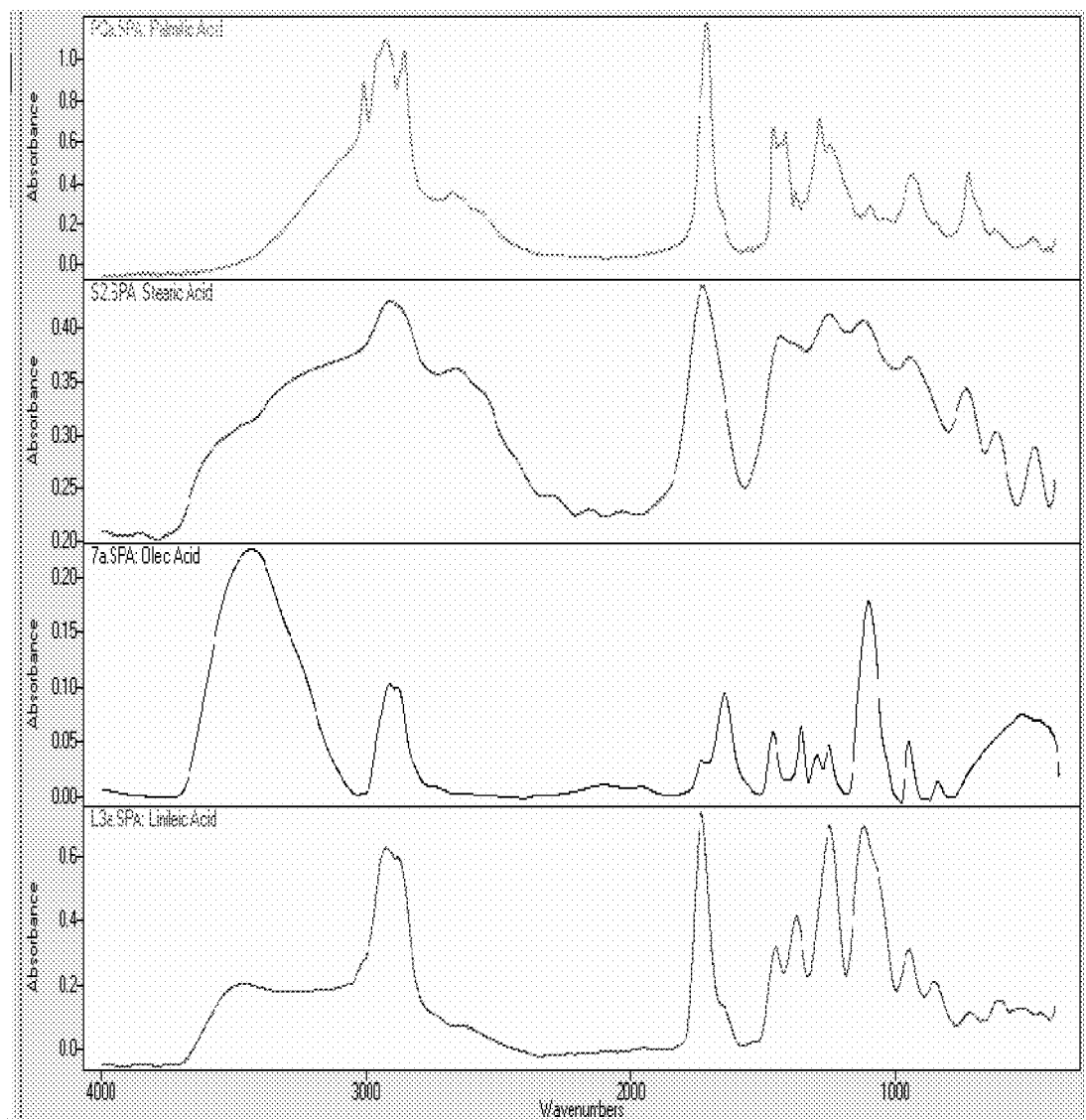
FIG. 2 shows an absorbance of Fourier Transform Infrared (FTIR) spectra of the gold nano-antennas, gold nano-rods, gold nano-wires, gold nano-prolate spheroids and gold nano-oblate spheroids manufactured using palmitic acid, stearic acid, oleic acid and linoleic acid.

The infrared spectra (IR) were obtained with a NEXUS 870 Fourier transform spectrometer (Thermo Nicolet Corp.). A ZnSe crystal attachment together with the mercury cadmium telluride detector was used to record the attenuated total reflection (ATR) spectrum. Each spectrum was obtained by averaging 64 interferograms with resolution of 4 $cm^{-1}$. All spectra were recorded in the range from 4000 to 600 $cm^{-1}$. FIG. 2 shows the absorbance of FTIR spectra of the gold nano-antennas, gold nano-rods, gold nano-wires, gold nano-prolate spheroids and gold nano-oblate spheroids manufactured using palmitic acid, stearic acid, oleic acid and linoleic acid.

Figure 3:
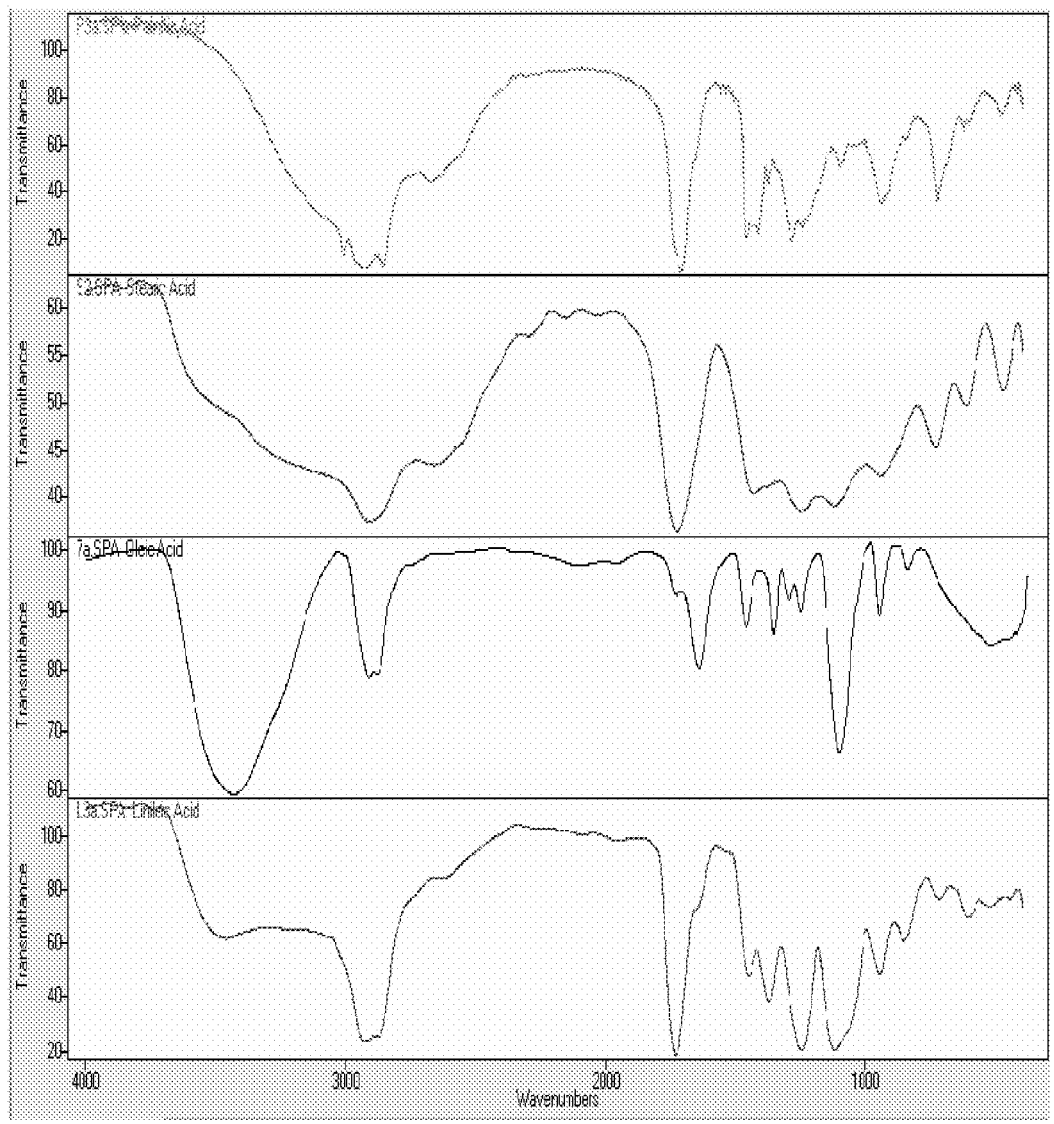
FIG. 3 shows % Transmittance of FTIR spectra of the gold nano-antennas, gold nano-rods, gold nano-wires, gold nano-prolate spheroids and gold nano-oblate spheroids manufactured by using palmitic acid, stearic acid, oleic acid and linoleic acid.

The Transmission FTIR spectra for the surfactant-coated Au nanoparticles were taken after making pellets with KBr powder. FIG. 3 shows the % Transmittance of FTIR spectra of the gold nano-antennas, gold nano-rods, gold nano-wires, gold nano-prolate spheroids and gold nano-oblate spheroids manufactured by using palmitic acid, stearic acid, oleic acid and linoleic acid.

Figure 4:
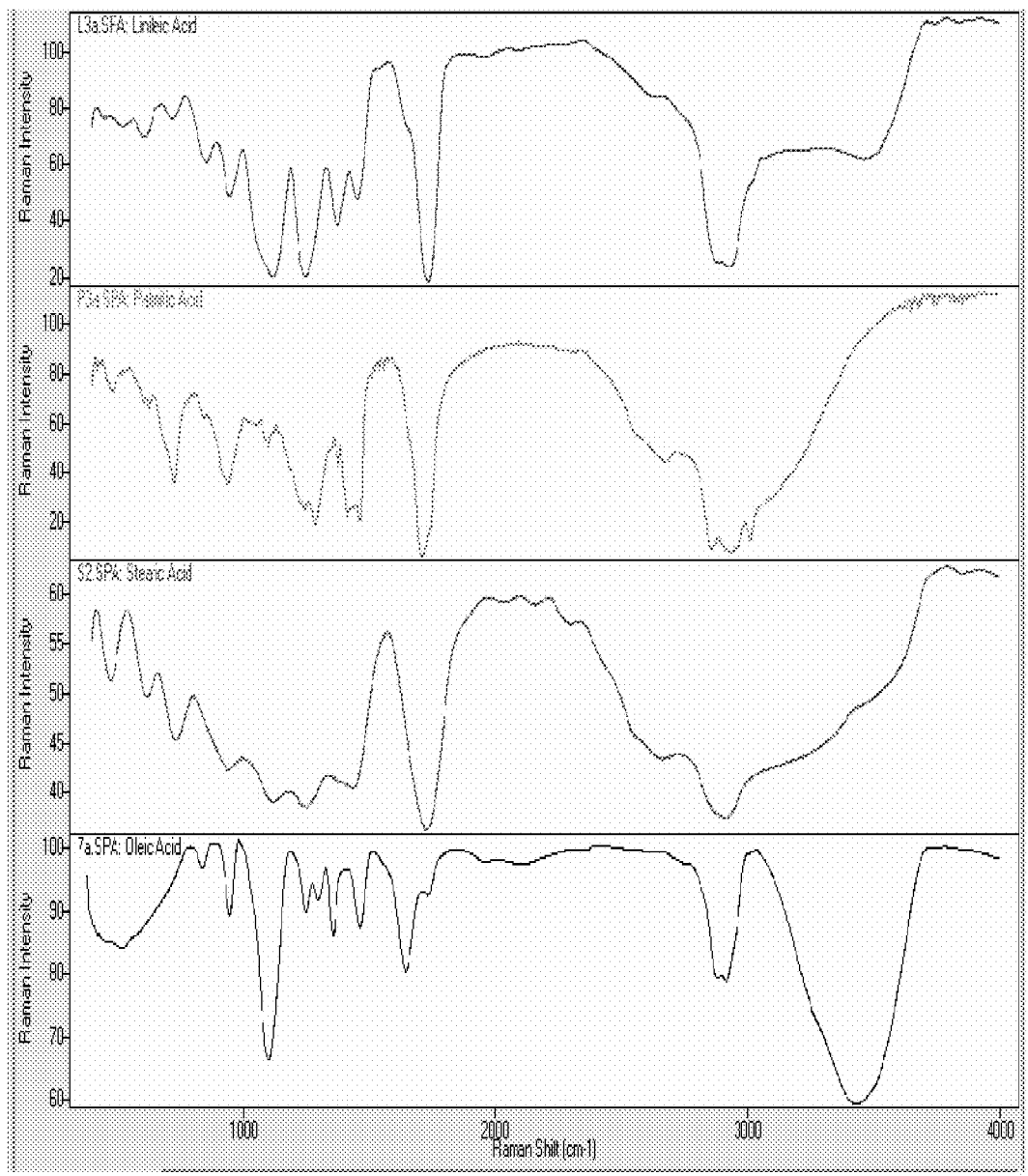
FIG. 4 shows Raman Intensity of FTIR spectra of the gold nano-antennas, gold nano-rods, gold nano-wires, gold nano-prolate spheroids and gold nano-oblate spheroids manufactured by palmitic acid, stearic acid, oleic acid and linoleic acid.

Raman Intensity of FTIR spectra of the gold nano-antennas, gold nano-rods, gold nano-wires, gold nano-prolate spheroids and gold nano-oblate spheroids manufactured by different fatty acids were obtained. FIG. 4 shows the Raman Intensity of FTIR spectra of the gold nano-antennas, gold nano-rods, gold nano-wires, gold nano-prolate spheroids and gold nano-oblate spheroids manufactured by palmitic acid, stearic acid, oleic acid and linoleic acid.

Figure 5:
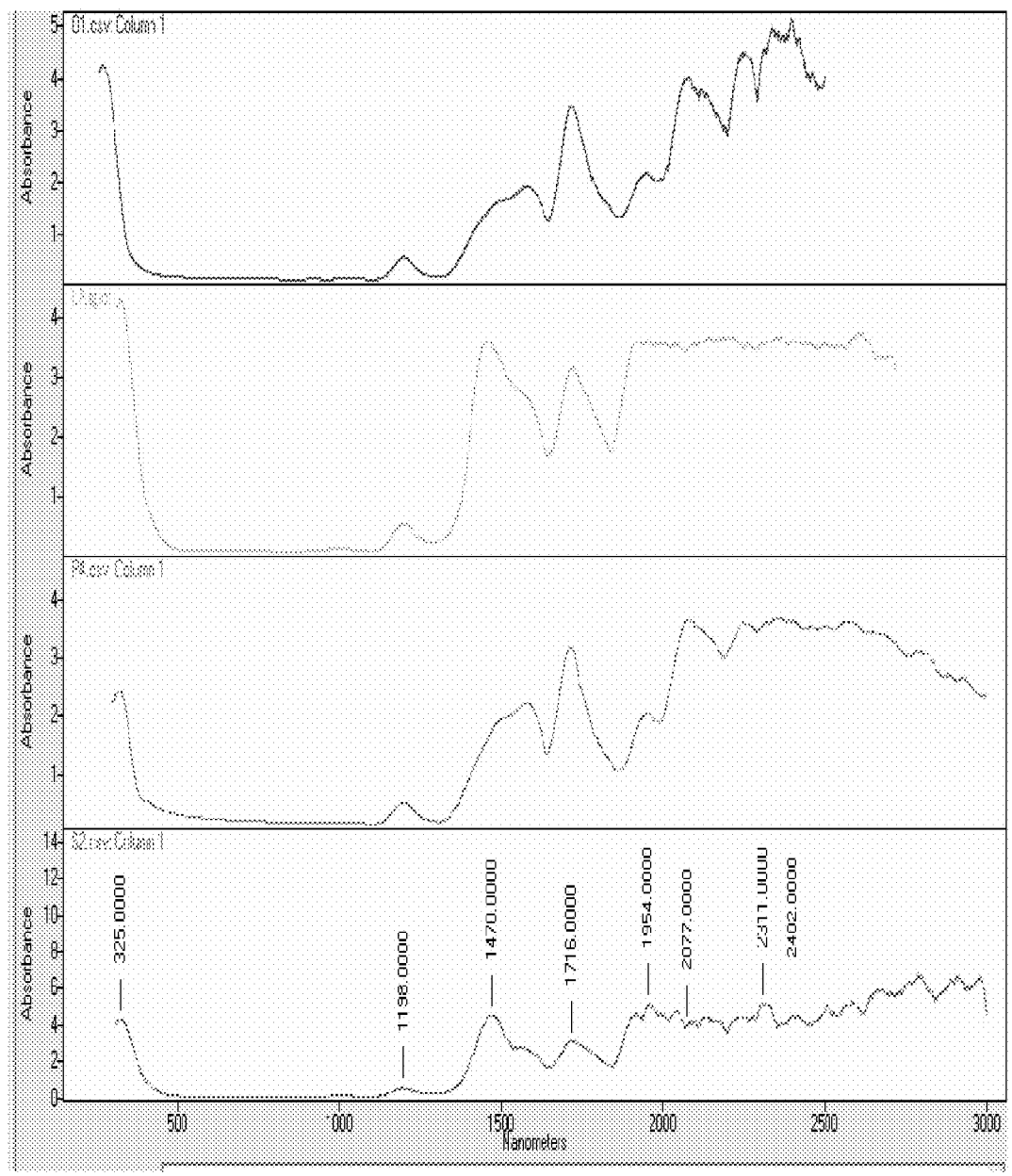
FIG. 5 shows an absorbance of Ultraviolet Near Infra-red (UV-NIR) spectra of the gold nano-antennas, gold nano-rods, gold nano-wires, gold nano-prolate spheroids and gold nano-oblate spheroids manufactured by oleic acid, linoleic acid, palmitic acid and stearic acid.
Figure 6:
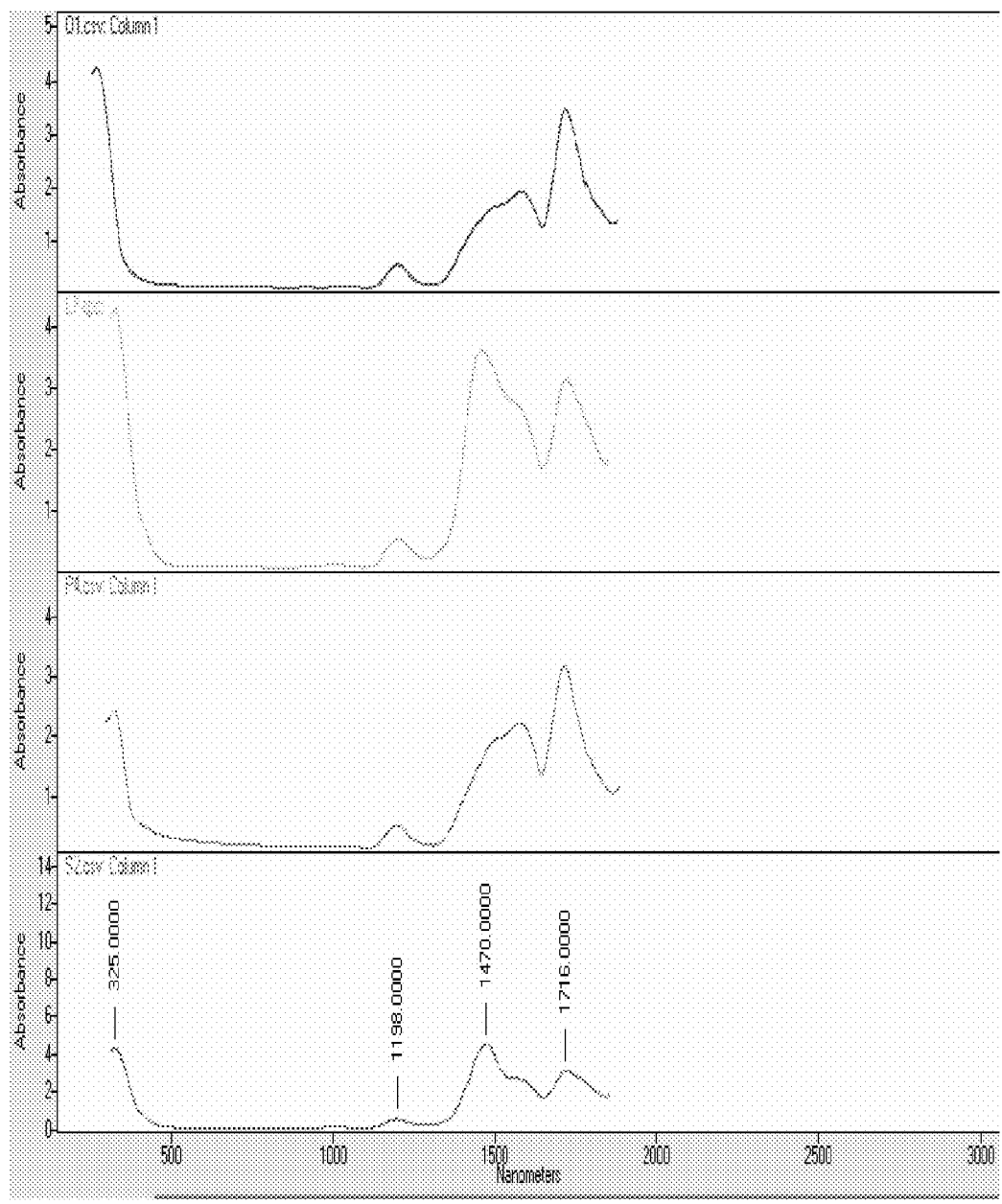
FIG. 6 shows segments of UV-NIR spectra of the gold nano-antennas, gold nano-rods, gold nano-wires, gold nano-prolate spheroids and gold nano-oblate spheroids manufactured by oleic acid, linoleic acid, palmitic acid and stearic acid.

UV-NIR spectra of the synthesized gold nano-antennas, gold nano-rods, gold nano-wires, gold nano-prolate spheroids and gold nano-oblate spheroids were obtained. FIG. 5 shows the absorbance of UV-NIR spectra of the gold nano-antennas, gold nano-rods, gold nano-wires, gold nano-prolate spheroids and gold nano-oblate spheroids manufactured by oleic acid, linoleic acid, palmitic acid and stearic acid. FIG. 6 shows the segments of UV-NIR spectra of the gold nano-antennas, gold nano-rods, gold nano-wires, gold nano-prolate spheroids and gold nano-oblate spheroids manufactured by oleic acid, linoleic acid, palmitic acid and stearic acid.

X-ray diffraction patterns of the obtained gold nanoparticles were obtained with an X'Pert Pro (PANalytical) automated diffractometer using Ge (111)-mono-chromated CuK radiation and an X'Celerator detector. The diffractograms were recorded between 5° and 45° C. in 0.017° steps at 45 kV and 35 mA for 30 min. The samples were placed on an aluminium support with temperature control. Calorimetric experiments were performed on a differential scanning calorimeter from Shimadzu Corp. model DSC-50. Scan rate of 5° C./min was used in the temperature range of −60° C. to 100° C. The low temperatures were reached with liquid nitrogen Aluminium DSC pans contains between 4 mg to 6 mg of the corresponding sample. The samples were placed on a metallic holder using a double side adhesive tape and coated with a 0.05 m thin film of gold. A JEOL JSM-840, Japan, scanning electron microscope operated at 10-20 kV was used for examination of the samples. AFM images were obtained with a Topometrix Explorer microscope operating in contact mode. A large scale scanner (maximum X-Y range of 130 m×130 m and 13 m in Z) with 0.58 $Nm^{-1}$ nominal force constant was employed. Samples were attached to a glass slide using a double side adhesive tape and analyzed at room conditions, typically 20-25° C. and 45-50% relative humidity. Calibration in the X-Y-Z directions was done with commercial calibration gratings.

Various examples are set forth to illustrate the synthesis of metallic nano-particles and are not intended to limit the invention in spirit or in scope.

EXAMPLES USING OLEIC ACID

Example#1

1 ml from 1 mM to 5 mM $HAuCl_4.3H_2O$ and 1.5 mL to 10 mL oleic acid were dissolved and mixed in 40 mL to 90 mL diethylether and heated to 80° C. -110° C. The color of the reaction solution was changed to green color. In a separate flask, 4 mL to 10 mL oleic acid was dissolved in 10 mL to 30 mL diethylether and heated to 70° C.-90° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#2

1 ml from 1 mM to 10 mM $HAuCl_4.3H_2O$ and 1.5 mL to 10 mL oleic acid were dissolved and mixed in 50 mL to 100 mL Methanol and heated to 100° C.-150° C. The color of the reaction solution was changed to green color. In a separate flask, 4 mL to 10 mL oleic acid was dissolved in 10 mL to 50 mL Methanol and 10 mL to 50 mL Acetic acid and heated to 80° C.-100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#3

1 ml from 1 mM to 10 mM $HAuCl_4.3H_2O$ and 1.5 mL to 10 mL oleic acid were dissolved and mixed in 40 mL to 100 mL Chloroform and heated to 80° C.-100° C. The color of the reaction solution was changed to green color. In a separate flask, 4 mL to 10 mL oleic acid was dissolved in 10 mL to 50 mL Chloroform and heated to 80° C. for 10 min to be used as a reducing solvent. Subsequently, the reducing solvent was injected into the mixture. The mixture was held at 120° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#4

1 ml from 1 mM to 10 mM $HAuCl_4.3H_2O$ and 10 mL to 50 mL oleic acid were dissolved and mixed in 40 mL to 90 mL Chloroform and heated to 100° C.-180° C. The color of the reaction solution was changed to green color. In a separate flask, 100 mL to 200 mL oleic acid was dissolved in 500 mL to 1000 mL Propylene Glycol 300 and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#5

1 ml from 1 mM to 10 mM $HAuCl_4.3H_2O$ and 10 mL to 50 mL oleic acid were dissolved and mixed in 40 mL to 90 mL Methanol and heated to 80° C.-100° C. The color of the reaction solution was changed to green color. In a separate flask, 50 mL to 200 mL oleic acid was dissolved in 500 mL to 1000 mL Propylene glycol 300 and heated to 150° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#6

1 ml from 1 mM to 10 mM $HAuCl_4.3H_2O$ and 10 mL to 50 mL oleic acid were dissolved and mixed in 40 mL to 90 mL Methanol and heated to 110° C. The color of the reaction solution was changed to green color. In a separate flask, 50 mL to 200 mL oleic acid was dissolved in 500 mL to 1000 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#7

1 ml from 1 mM to 10 mM $HAuCl_4.3H_2O$ and 10 mL to 30 mL oleic acid were dissolved and mixed in 40 mL to 90 mL diethylether and heated to 100° C. The color of the reaction solution was changed to green color. In a separate flask, 4 mL oleic acid was dissolved in 100 mL to 500 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#8

1 ml from 1 mM to 10 mM $HAuCl_4.3H_2O$ and 10 mL to 30 mL oleic acid were dissolved and mixed in 40 mL to 80 mL diethylether and heated to 100° C. The color of the reaction solution was changed to green color. In a separate flask, 10 mL to 30 mL oleic acid was dissolved in 100 mL to 500 mL polyethylene Glycol 2000 and heated to 120° C. for 30 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#9

1 ml from 1 mM to 10 mM $HAuCl_4.3H_2O$ and 10 mL to 30 mL oleic acid were dissolved and mixed in 40 mL to 80 mL diethylether and heated to 100° C. The color of the reaction solution was changed to green color. In a separate flask, 10 mL to 50 mL oleic acid was dissolved in 50 mL to 100 mL Propylene glycol 300 and 10 mL to 50 mL Acetic acid and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#10

1 ml from 1 mM to 10 mM $HAuCl_4.3H_2O$ and 10 mL to 30 mL oleic acid were dissolved and mixed in 40 mL to 80 mL Chloroform and heated to 80° C. The color of the reaction solution was changed to green color. In a separate flask, 40 mL to 80 mL oleic acid was dissolved in 50 mL to 100 mL Polyethylene glycol 1000 and 1 mL to 10 mL Ascorbic acid and heated to 100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Figure 7:
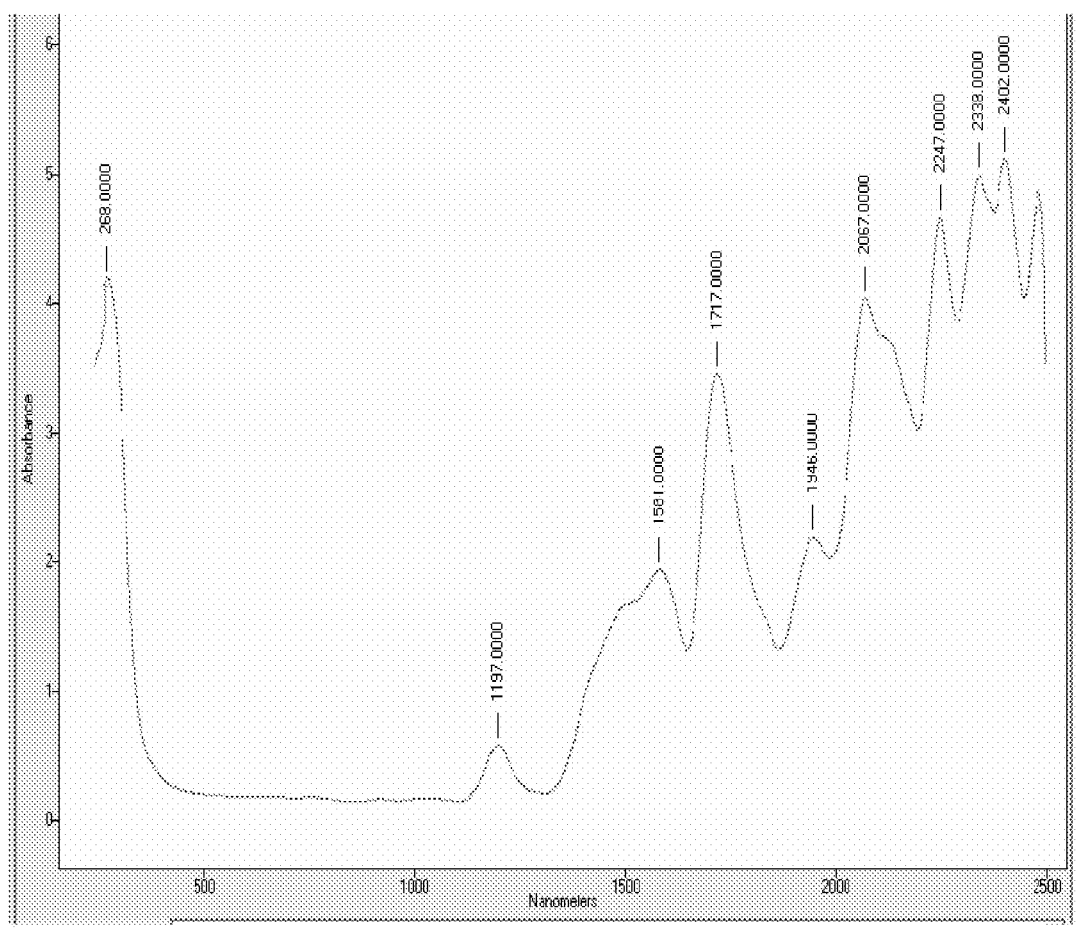
FIG. 7 shows an absorbance of UV-NIR spectra of the gold nano-antennas, gold nano-rods, gold nano-wires, gold nano-prolate spheroids and gold nano-oblate spheroids manufactured by oleic acid.

UV-NIR spectra of the gold nano-antennas, gold nano-rods, gold nano-wires, gold nano-prolate spheroids and gold nano-oblate spheroids manufactured by oleic acid were obtained. FIG. 7 shows the Absorbance of UV-NIR spectra of the gold nano-antennas, gold nano-rods, gold nano-wires, gold nano-prolate spheroids and gold nano-oblate spheroids manufactured by oleic acid according to example 1-10 stated above.

Figure 8A:
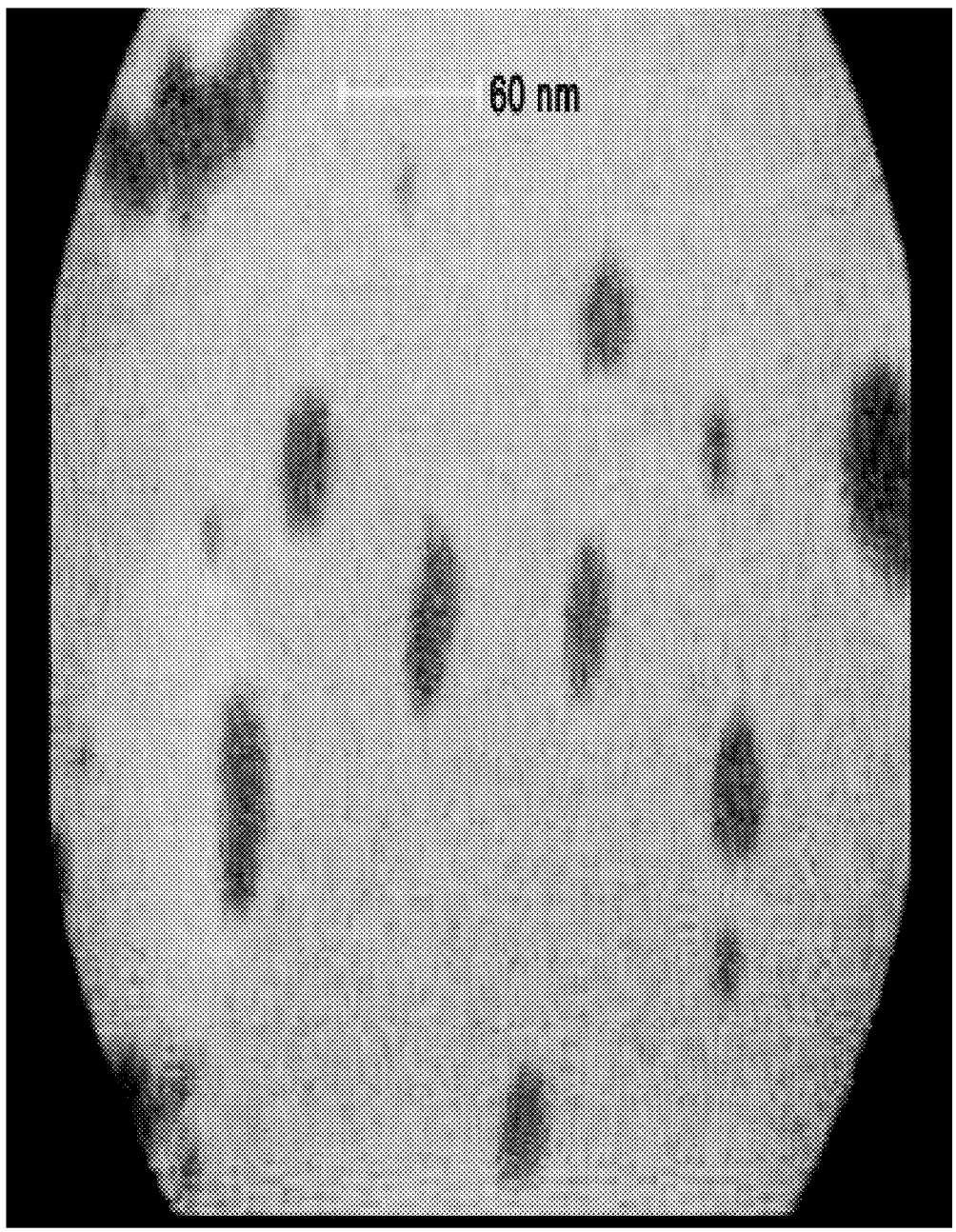
FIG. 8A shows a Transmission Electron Microscopy (TEM) image of the gold nano-prolate spheroid manufactured by oleic acid.
Figure 8B:
FIG. 8B shows a TEM image of the gold nano-prolate spheroid manufactured by oleic acid.
Figure 8C:
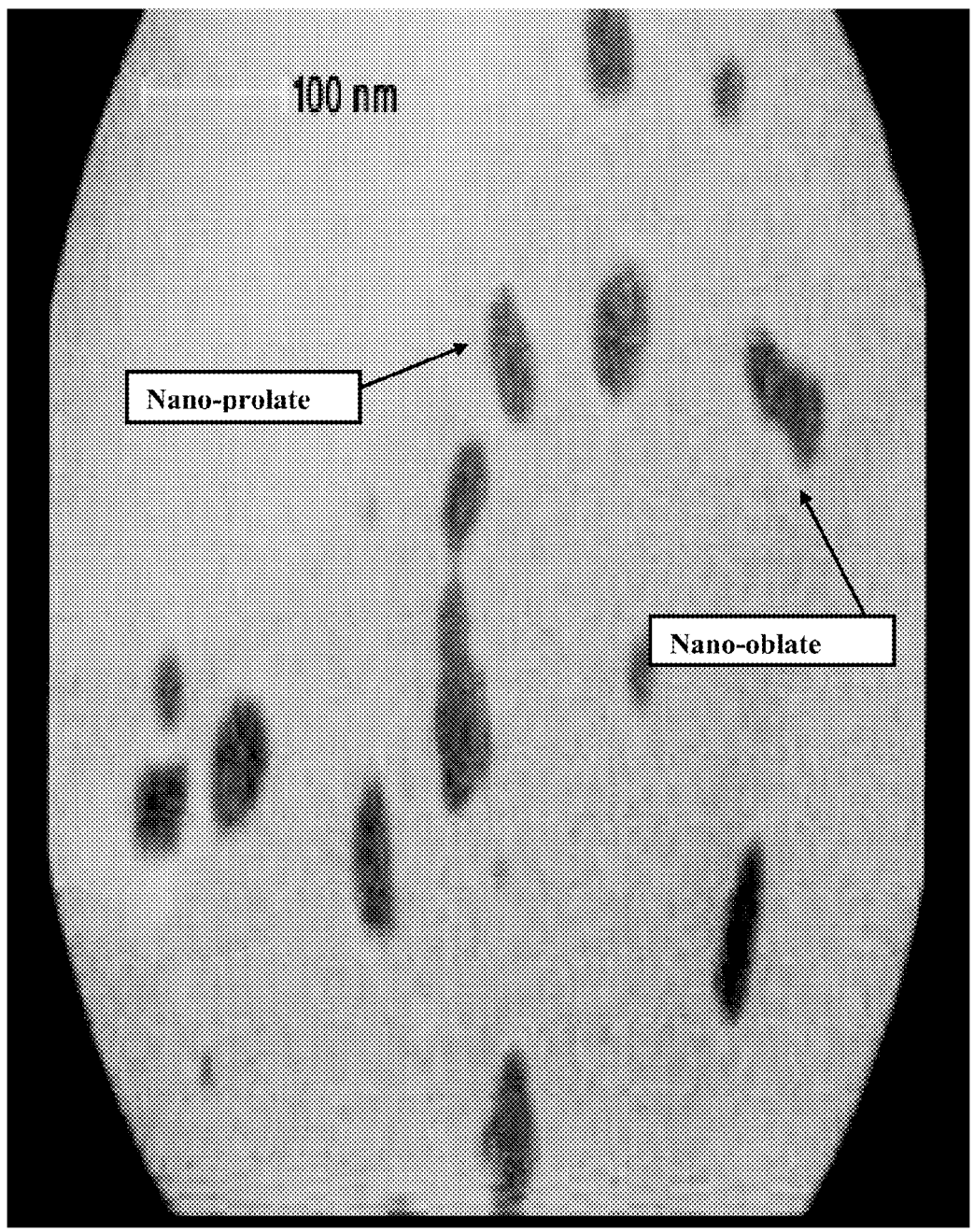
FIG. 8C shows a TEM image of the gold nano-prolate spheroid and gold nano-oblate spheroid manufactured by oleic acid.
Figure 8D:
FIG. 8D shows a TEM image of the gold nano-rod manufactured by oleic acid.
Figure 8E:
FIG. 8E shows a TEM image of the gold nano-prolate spheroid manufactured by oleic acid.

The morphology of the Au nanoparticles and the self-assembly of the nanoparticles was studied by a Hitachi HF-2000 cold field emission gun (cFEG) transmission electron microscope (TEM). For TEM observation, the nano-particles were dispersed in ethanol and then deposited on an amorphous carbon-supported Cu grid. Transmission Electron Microscopy (TEM) images of the gold nano-prolate spheroid manufactured by oleic acid was obtained to confirm the presence of gold nano-particles. FIG. 8A shows a TEM image of the gold nano-prolate spheroid manufactured by oleic acid according to example 1-10 stated above. FIG. 8B shows the TEM image of the gold nano-prolate spheroid manufactured by oleic acid according to example 1-10 stated above. FIG. 8C shows the TEM image of the gold nano-prolate spheroid and gold nano-oblate spheroid manufactured by oleic acid according to example 1-10 stated above. FIG. 8D shows the TEM image of the gold nano-rod manufactured by oleic acid according to example 1-10 stated above. FIG. 8E shows the TEM image of the gold nano-prolate spheroid manufactured by oleic acid according to example 1-10 stated above.

Figure 9:
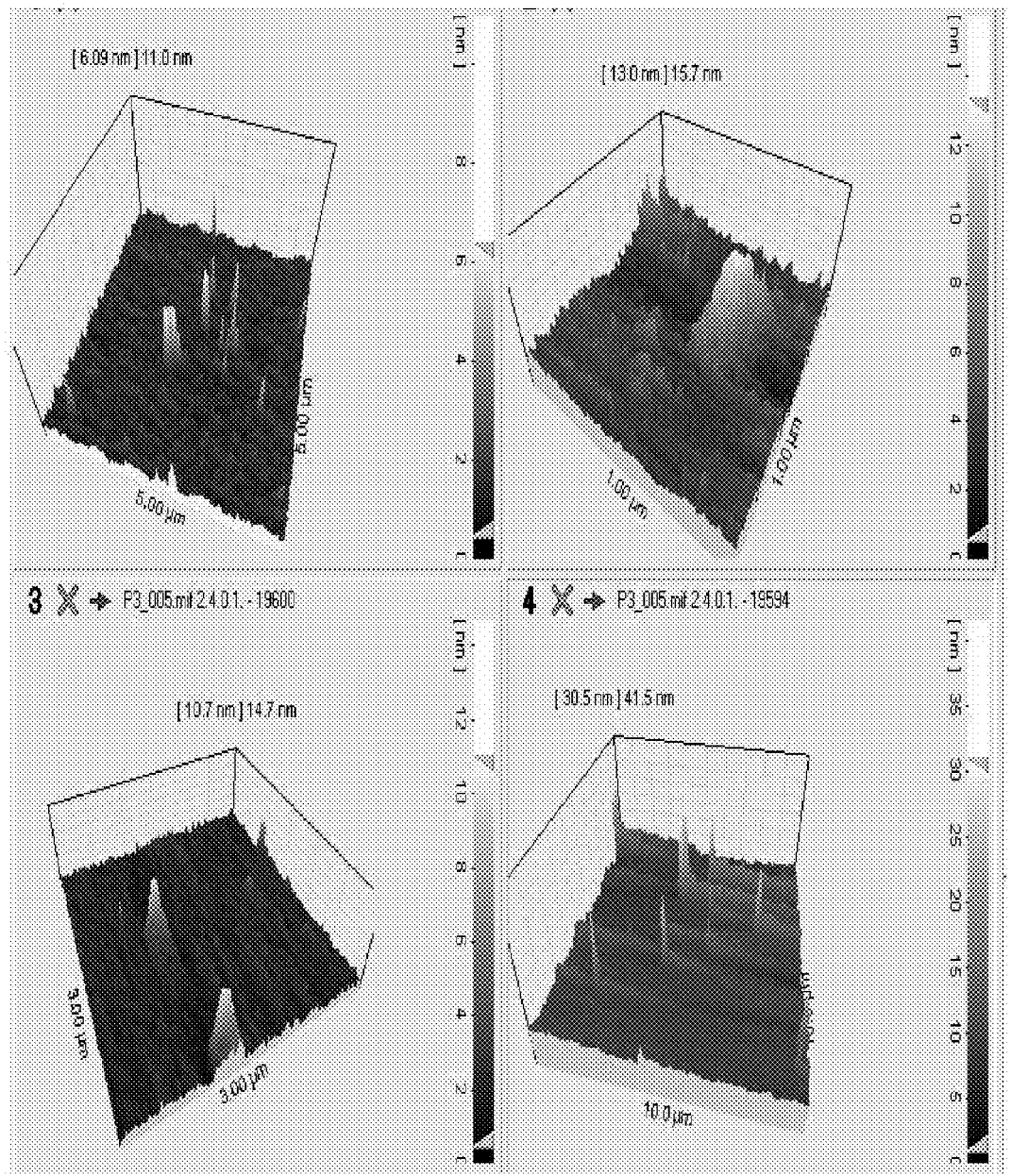
FIG. 9 shows an Atomic force Microscopy (AFM) image of the gold nano-antenna, gold nano-rod, gold nano-wire, gold nano-prolate spheroid and gold nano-oblate spheroid manufactured by oleic acid.

Atomic Force Microscopy of the nano-particles manufactured by using oleic acid was done. Various AFM images of the various nano-particles were obtained. FIG. 9 shows the AFM image of the gold nano-antenna, gold nano-rod, gold nano-wire, gold nano-prolate spheroid and gold nano-oblate spheroid manufactured by oleic acid according to example 1-10 stated above.

Figure 10A:
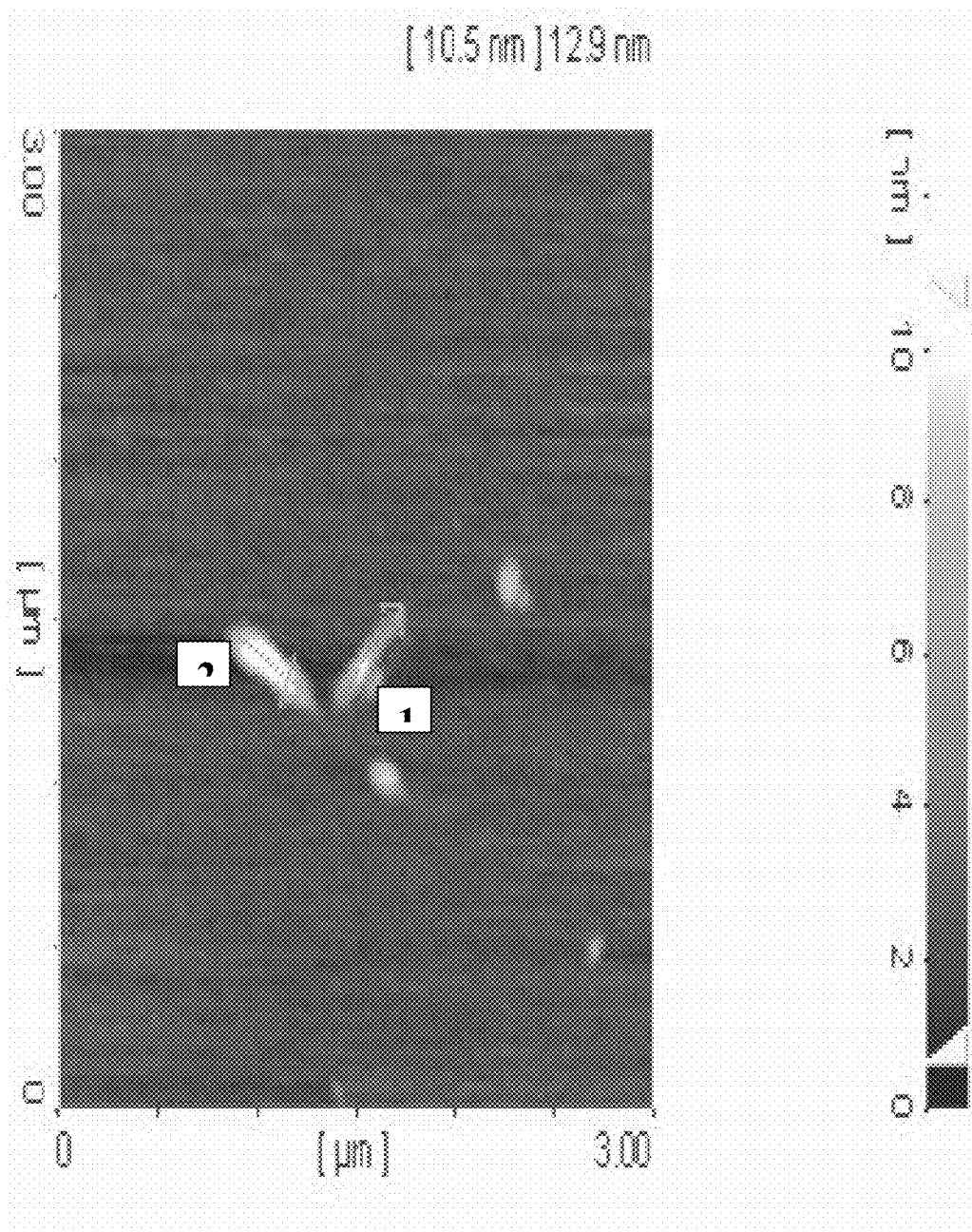
FIG. 10A shows a 2-Dimensional AFM image of the gold nano-rod manufactured by oleic acid, where 1 and 2 show the presence of gold nano-rod.
Figure 10B:
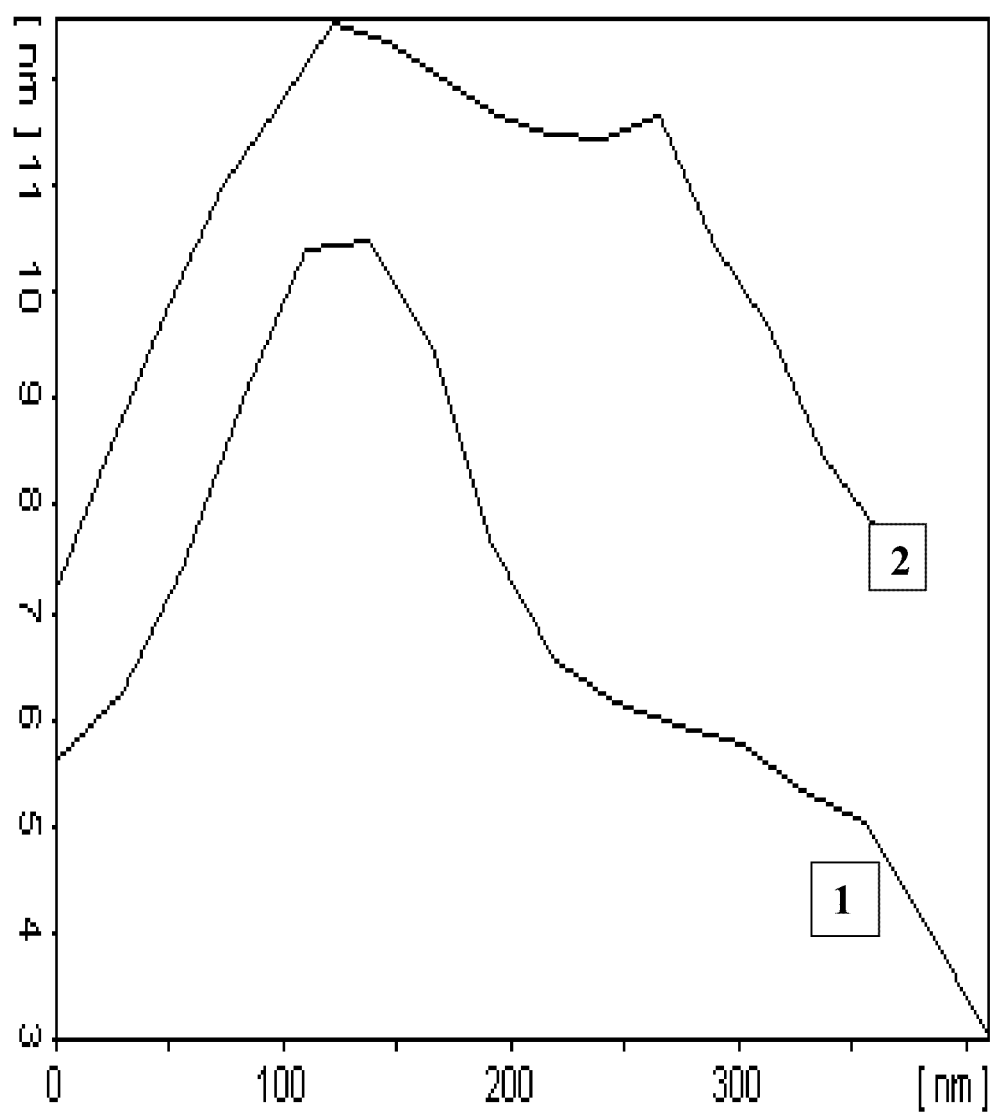
FIG. 10B shows the AFM profile image of the gold nano-rod manufactured by oleic acid showing the size distribution of the gold nano-rods.

FIG. 10A shows the 2-Dimensional AFM image of the gold nano-rod manufactured by oleic acid according to example 1-10 stated above, where 1 and 2 show the presence of gold nano-rod. FIG. 10B shows the AFM profile image of the gold nano-rod manufactured by oleic acid according to example 1-10 stated above showing the size distribution of the gold nano-rods.

EXAMPLES USING LINOLENIC ACID

Example#1

1 ml from 1 mM to 5 mM $HAuCl_4.3H_2O$ and 0.5 mL to 5 mL linolenic acid were dissolved and mixed in 10 mL to 50 mL diethylether and heated to 80° C.-110° C. The color of the reaction solution was changed to green color. In a separate flask, 4 mL to 10 mL linolenic acid was dissolved in 10 mL to 30 mL diethylether and heated to 70° C.-90° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#2

1 ml from 1 mM to 10 mM $HAuCl_4.3H_2O$ and 1.5 mL to 10 mL linolenic acid were dissolved and mixed in 10 mL to 50 mL Methanol and heated to 100° C.-150° C. The color of the reaction solution was changed to green color. In a separate flask, 4 mL to 10 mL linolenic acid was dissolved in 10 mL to 50 mL Methanol and 10 mL to 50 mL Acetic acid and heated to 80° C.-100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#3

1 ml from 1 mM to 10 mM $HAuCl_4.3H_2O$ and 1 mL to 5 mL linolenic acid were dissolved and mixed in 10 mL to 50 mL Chloroform and heated to 80° C.-100° C. The color of the reaction solution was changed to green color. In a separate flask, 4 mL to 10 mL linolenic acid was dissolved in 10 mL to 50 mL Chloroform and heated to 80° C. for 10 min to be used as a reducing solvent. Subsequently, the reducing solvent was injected into the mixture. The mixture was held at 120° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#4

1 ml from 1 mM to 10 mM $HAuCl_4.3H_2O$ and 1 mL to 10 mL linolenic acid were dissolved and mixed in 40 mL to 90 mL Chloroform and heated to 100° C.-180° C. The color of the reaction solution was changed to green color. In a separate flask, 10 mL to 20 mL linolenic acid was dissolved in 100 mL to 500 mL Propylene glycol 300 and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#5

1 ml from 1 mM to 10 mM HAuCl$_4$.3H$_2$O and 1 mL to 10 mL linolenic acid were dissolved and mixed in 40 mL to 90 mL Methanol and heated to 80° C.-100° C. The color of the reaction solution was changed to green color. In a separate flask, 10 mL to 20 mL linolenic acid was dissolved in 500 mL to 1000 mL Propylene glycol300 and heated to 150° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#6

1 ml from 1 mM to 10 mM HAuCl$_4$.3H$_2$O and 1 mL to 10 mL linolenic acid were dissolved and mixed in 10 mL to 50 mL Methanol and heated to 110° C. The color of the reaction solution was changed to green color. In a separate flask, 10 mL to 50 mL linolenic acid was dissolved in 500 mL to 1000 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#7

1 ml from 1 mM to 10 mM HAuCl$_4$.3H$_2$O and 1 mL to 10 mL linolenic acid were dissolved and mixed in 40 mL to 90 mL diethylether and heated to 100° C. The color of the reaction solution was changed to green color. In a separate flask, 10 mL to 50 mL linolenic acid was dissolved in 100 mL to 500 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#8

1 ml from 1 mM to 10 mM HAuCl$_4$.3H$_2$O and 5 mL to 10 mL linolenic acid were dissolved and mixed in 10 mL to 50 mL diethylether and heated to 100° C. The color of the reaction solution was changed to green color. In a separate flask, 10 mL to 30 mL linolenic acid was dissolved in 100 mL to 500 mL polyethylene Glycol 2000 and heated to 120° C. for 20 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#9

1 ml from 1 mM to 10 mM HAuCl$_4$.3H$_2$O and 5 mL to 10 mL linolenic acid were dissolved and mixed in 40 mL to 80 mL diethylether and heated to 100° C. The color of the reaction solution was changed to green color. In a separate flask, 10 mL to 50 mL linolenic acid was dissolved in 50 mL to 100 mL Propylene glycol 300 and 10 mL to 50 mL Acetic acid and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#10

1 ml from 1 mM to 10 mM HAuCl$_4$.3H$_2$O and 1 mL to 10 mL linolenic acid were dissolved and mixed in 10 mL to 50 mL Chloroform and heated to 80° C. The color of the reaction solution was changed to green color. In a separate flask, 10 mL to 20 mL linolenic acid was dissolved in 50 mL to 100 mL Polyethylene glycol 1000 and 1 mL to 10 mL Ascorbic acid and heated to 100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

EXAMPLES USING LINOLEIC ACID

Example#1

1 ml from 1 mM to 5 mM $HAuCl_4.3H_2O$ and 0.5 mL to 5 mL linoleic acid were dissolved and mixed in 10 mL to 50 mL diethylether and heated to 80° C. -110° C. The color of the reaction solution was changed to green color. In a separate flask, 4 mL to 10 mL linoleic acid was dissolved in 10 mL to 30 mL diethylether and heated to 70° C.-90° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#2

1 ml from 1 mM to 10 mM $HAuCl_4.3H_2O$ and 1.5 mL to 10 mL linoleic acid were dissolved and mixed in 10 mL to 50 mL Methanol and heated to 100° C.-150° C. The color of the reaction solution was changed to green color. In a separate flask, 4 mL to 10 mL linoleic acid was dissolved in 10 mL to 50 mL Methanol and 10 mL to 50 mL Acetic acid and heated to 80° C.-100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#3

1 ml from 1 mM to 10 mM $HAuCl_4.3H_2O$ and 1 mL to 5 mL linoleic acid were dissolved and mixed in 10 mL to 50 mL Chloroform and heated to 80° C.-100° C. The color of the reaction solution was changed to green color. In a separate flask, 4 mL to 10 mL linoleic acid was dissolved in 10 mL to 50 mL Chloroform and heated to 80° C. for 10 min to be used as a reducing solvent. Subsequently, the reducing solvent was injected into the mixture. The mixture was held at 120° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#4

1 ml from 1 mM to 10 mM $HAuCl_4.3H_2O$ and 1 mL to 10 mL linoleic acid were dissolved and mixed in 40 mL to 90 mL Chloroform and heated to 100° C.-180° C. The color of the reaction solution was changed to green color. In a separate flask, 10 mL to 20 mL linoleic acid was dissolved in 100 mL to 500 mL Propylene glycol 300 and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#5

1 ml from 1 mM to 10 mM $HAuCl_4.3H_2O$ and 1 mL to 10 mL linoleic acid were dissolved and mixed in 40 mL to 90 mL Methanol and heated to 80° C.-100° C. The color of the reaction solution was changed to green color. In a separate flask, 10 mL to 20 mL linoleic acid was dissolved in 500 mL to 1000 mL Propylene glycol 300 and heated to 150° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#6

1 ml from 1 mM to 10 mM $HAuCl_4.3H_2O$ and 1 mL to 10 mL linoleic acid were dissolved and mixed in 10 mL to 50 mL Methanol and heated to 110° C. The color of the reaction solution was changed to green color. In a separate flask, 10 mL to 50 mL linoleic acid was dissolved in 500 mL to 1000 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#7

1 ml from 1 mM to 10 mM $HAuCl_4.3H_2O$ and 1 mL to 10 mL linoleic acid were dissolved and mixed in 40 mL to 90 mL diethylether and heated to 100° C. The color of the reaction solution was changed to green color. In a separate flask, 10 mL to 50 mL linoleic acid was dissolved in 100 mL to 500 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#8

1 ml from 1 mM to 10 mM $HAuCl_4.3H_2O$ and 5 mL to 10 mL linoleic acid were dissolved and mixed in 10 mL to 50 mL diethylether and heated to 100° C. The color of the reaction solution was changed to green color. In a separate flask, 10 mL to 30 mL linoleic acid was dissolved in 100 mL to 500 mL polyethylene Glycol 2000 and heated to 120° C. for 20 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#9

1 ml from 1 mM to 10 mM $HAuCl_4.3H_2O$ and 5 mL to 10 mL linoleic acid were dissolved and mixed in 40 mL to 80 mL diethylether and heated to 100° C. The color of the reaction solution was changed to green color. In a separate flask, 10 mL to 50 mL linoleic acid was dissolved in 50 mL to 100 mL Propylene glycol 300 and 10 mL to 50 mL Acetic acid and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#10

1 ml from 1 mM to 10 mM $HAuCl_4.3H_2O$ and 1 mL to 10 mL linoleic acid were dissolved and mixed in 10 mL to 50 mL Chloroform and heated to 80° C. The color of the reaction solution was changed to green color. In a separate flask, 10 mL to 20 mL linoleic acid was dissolved in 50 mL to 100 mL Polyethylene glycol 1000 and 1 mL to 10 mL Ascorbic acid and heated to 100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Figure 11:
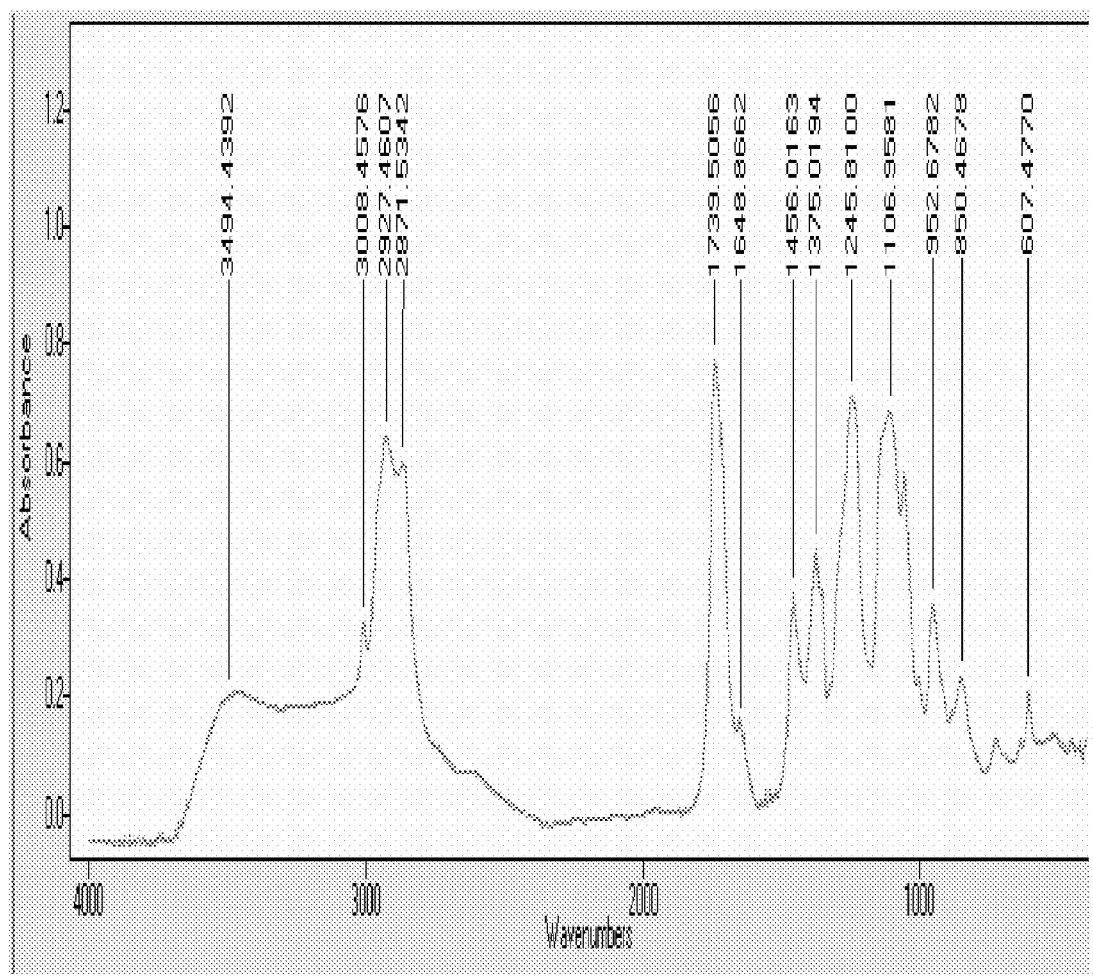
FIG. 11 shows an absorbance of FTIR spectra of the gold nano-antennas, gold nano-rods, gold nano-wires, gold nano-prolate spheroids and gold nano-oblate spheroids manufactured by linoleic acid.

FIG. 11 shows the absorbance of FTIR spectra of the gold nano-antennas, gold nano-rods, gold nano-wires, gold nano-prolate spheroids and gold nano-oblate spheroids manufactured by linoleic acid according to example 1-10 stated above.

Figure 12:
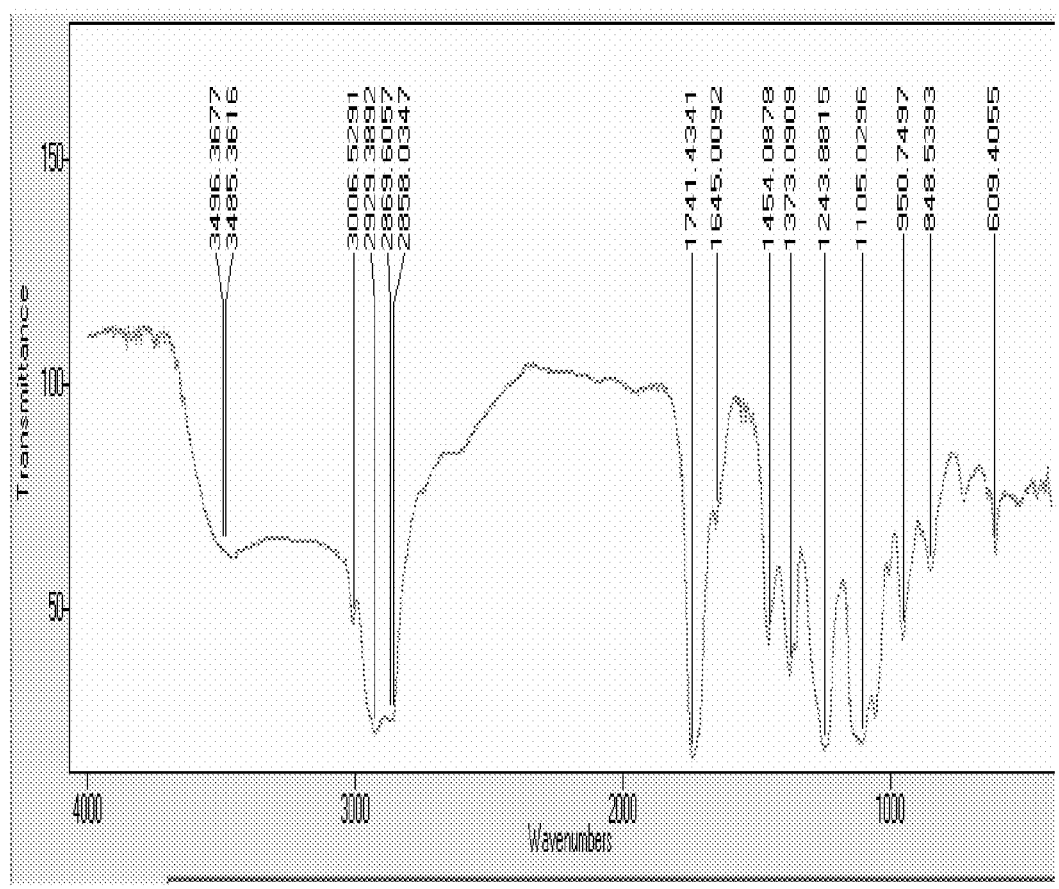
FIG. 12 shows a transmittance of FTIR spectra of the gold nano-antennas, gold nano-rods, gold nano-wires, gold nano-prolate spheroids and gold nano-oblate spheroids manufactured by linoleic acid.

FIG. 12 shows the transmittance of FTIR spectra of the gold nano-antennas, gold nano-rods, gold nano-wires, gold nano-prolate spheroids and gold nano-oblate spheroids manufactured by linoleic acid according to example 1-10 stated above.

Figure 13:
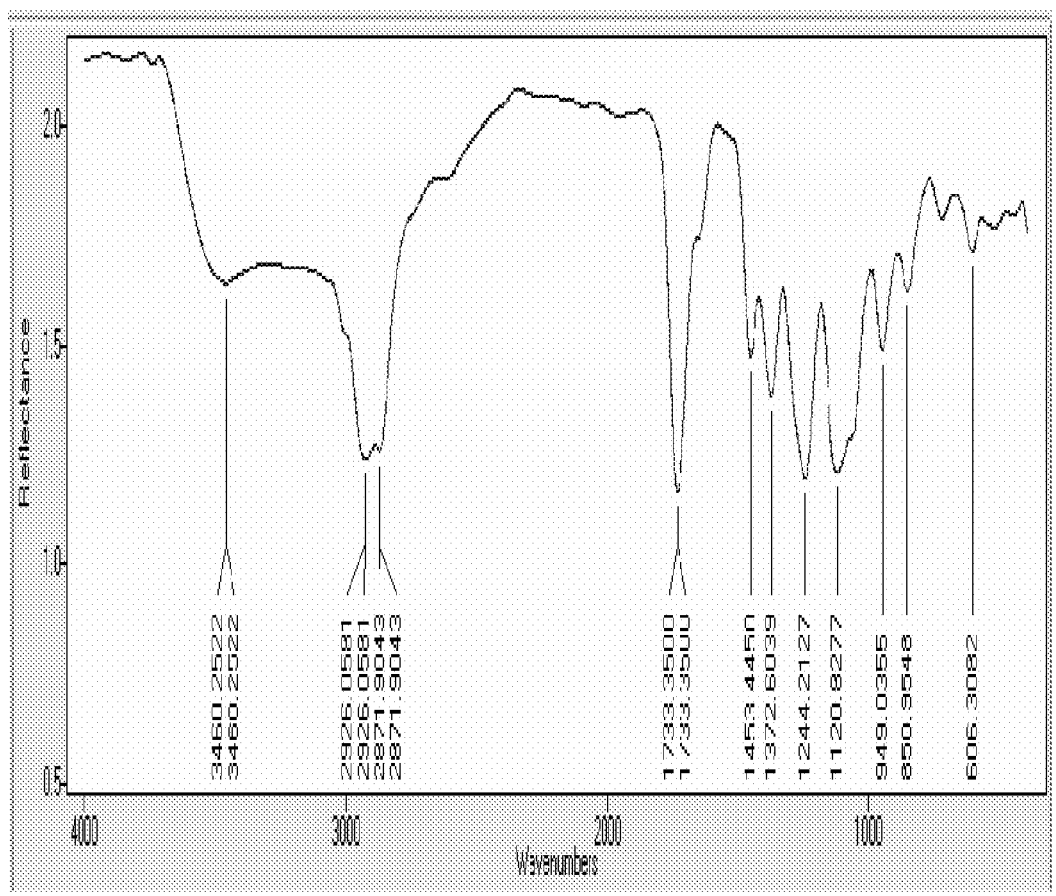
FIG. 13 shows reflectance FTIR spectra of the gold nano-antennas, gold nano-rods, gold nano-wires, gold nano-prolate spheroids and gold nano-oblate spheroids manufactured by linoleic acid.

FIG. 13 shows the reflectance FTIR spectra of the gold nano-antennas, gold nano-rods, gold nano-wires, gold nano-prolate spheroids and gold nano-oblate spheroids manufactured by linoleic acid according to example 1-10 stated above.

Figure 14:
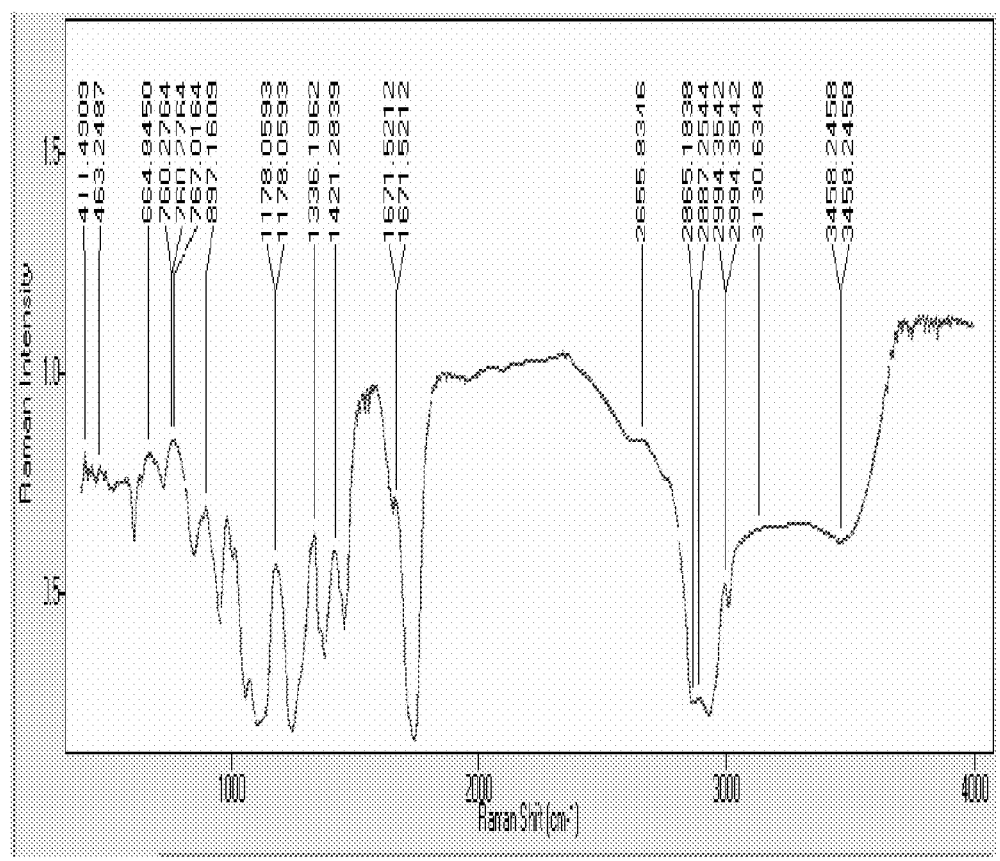
FIG. 14 shows Raman Intensity of FTIR spectra of the gold nano-antennas, gold nano-rods, gold nano-wires, gold nano-prolate spheroids and gold nano-oblate spheroids manufactured by linoleic acid.

FIG. 14 shows the Raman Intensity of FTIR spectra of the gold nano-antennas, gold nano-rods, gold nano-wires, gold nano-prolate spheroids and gold nano-oblate spheroids manufactured by linoleic acid according to example 1-10 stated above.

Figure 15:
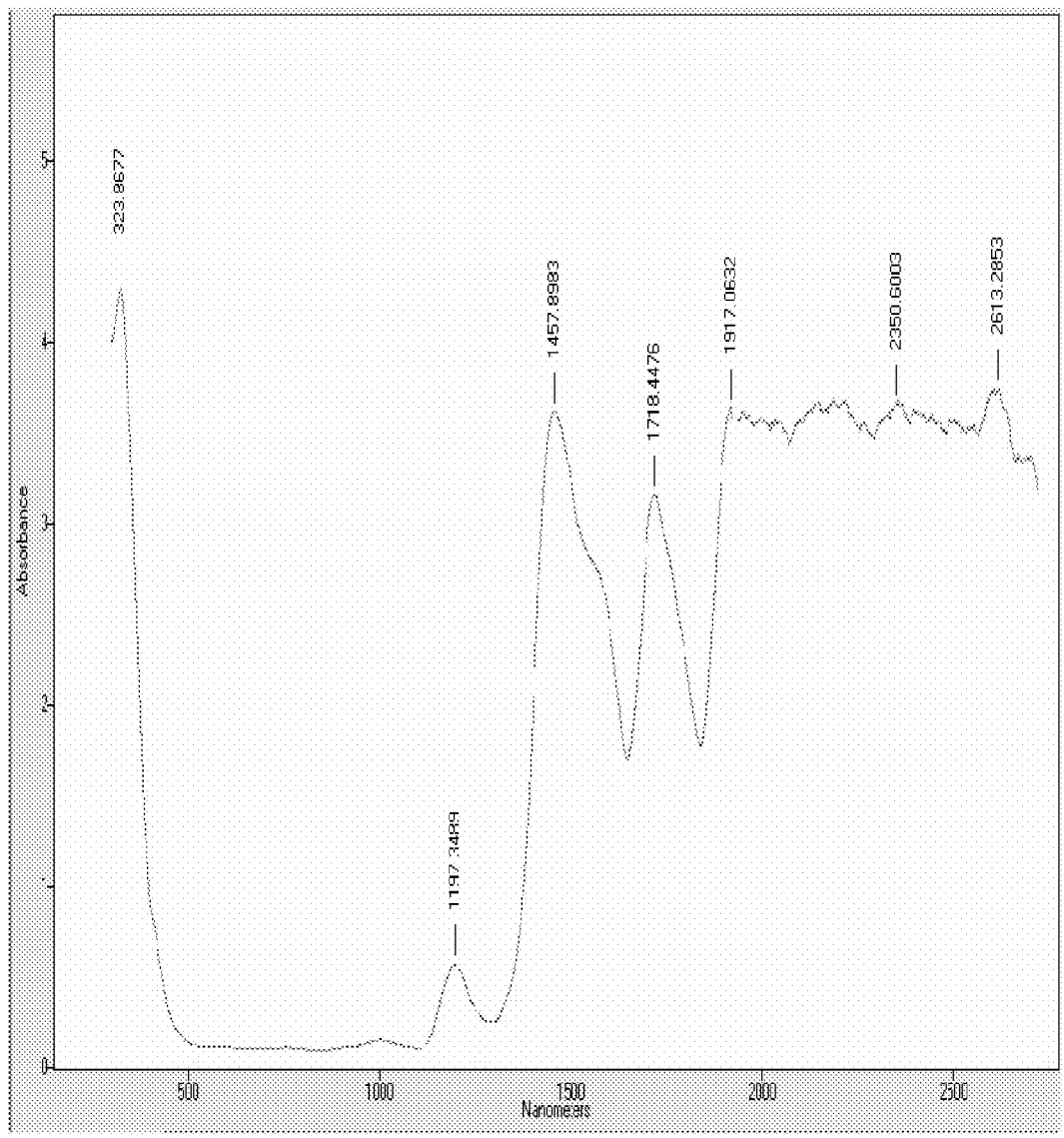
FIG. 15 shows absorbance of UV-NIR spectra of the gold nano-antennas, gold nano-rods, gold nano-wires, gold nano-prolate spheroids and gold nano-oblate spheroids manufactured by linoleic acid.

FIG. 15 shows the absorbance of UV-NIR spectra of the gold nano-antennas, gold nano-rods, gold nano-wires, gold nano-prolate spheroids and gold nano-oblate spheroids manufactured by linoleic acid according to example 1-10 stated above.

Figure 16A:
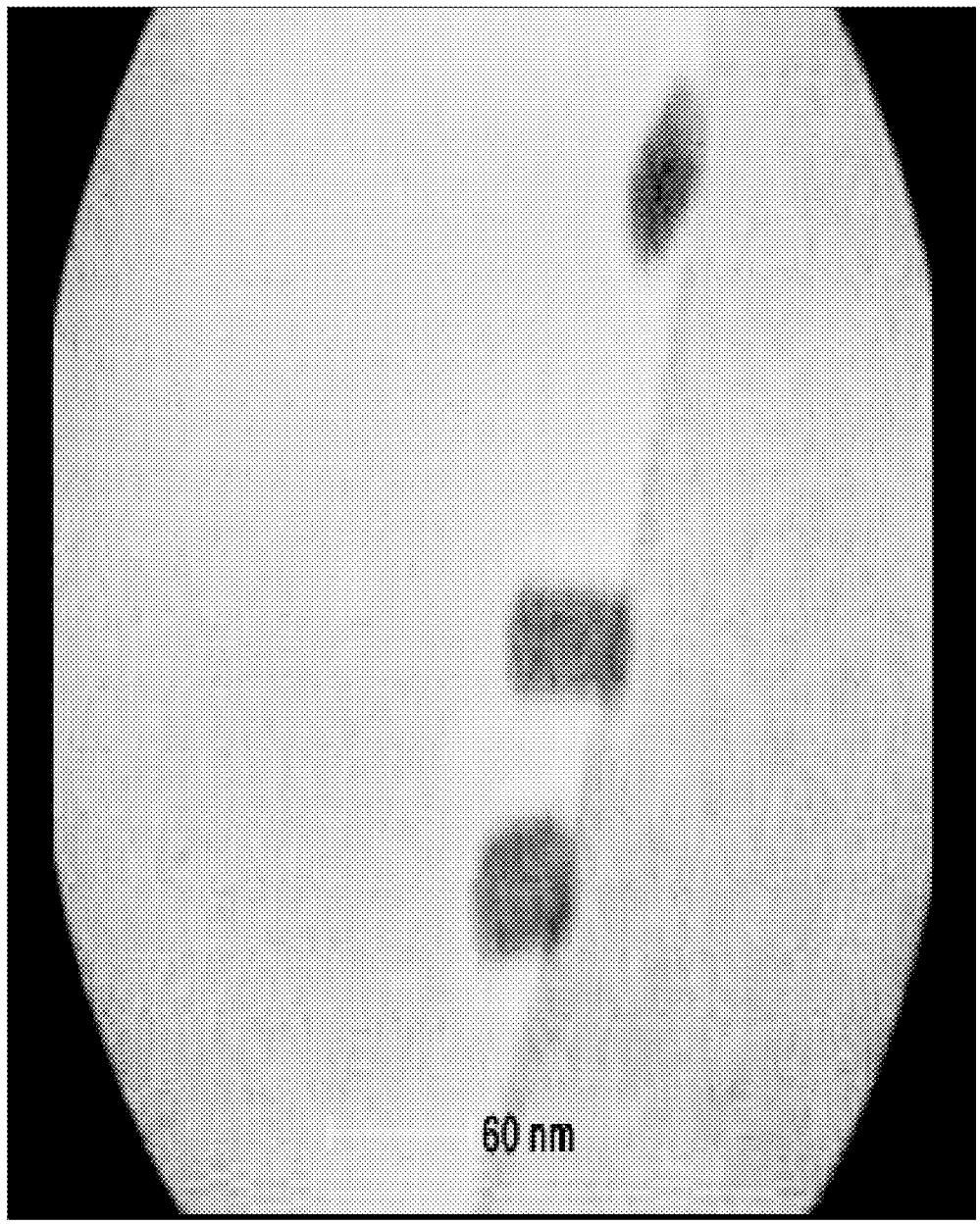
FIG. 16A shows a TEM image of the gold nano-rod manufactured by linoleic acid.

FIG. 16A shows the TEM image of the gold nano-rod manufactured by linoleic acid according to example 1-10 stated above.

Figure 16B:
FIG. 16B shows a TEM image of the gold nano-prolate spheroid manufactured by linoleic acid.

FIG. 16B shows the TEM image of the gold nano-prolate spheroid manufactured by linoleic acid according to example 1-10 stated above.

Figure 16C:
FIG. 16C shows a TEM image of the gold nano-rod and the gold nano-prolate spheroid manufactured by linoleic acid.

FIG. 16C shows the TEM image of the gold nano-rod and the gold nano-prolate spheroid manufactured by linoleic acid according to example 1-10 stated above.

Figure 16D:
FIG. 16D shows a TEM image of the gold nano-wire manufactured by linoleic acid.

FIG. 16D shows the TEM image of the gold nano-wire manufactured by linoleic acid according to example 1-10 stated above.

Figure 16E:
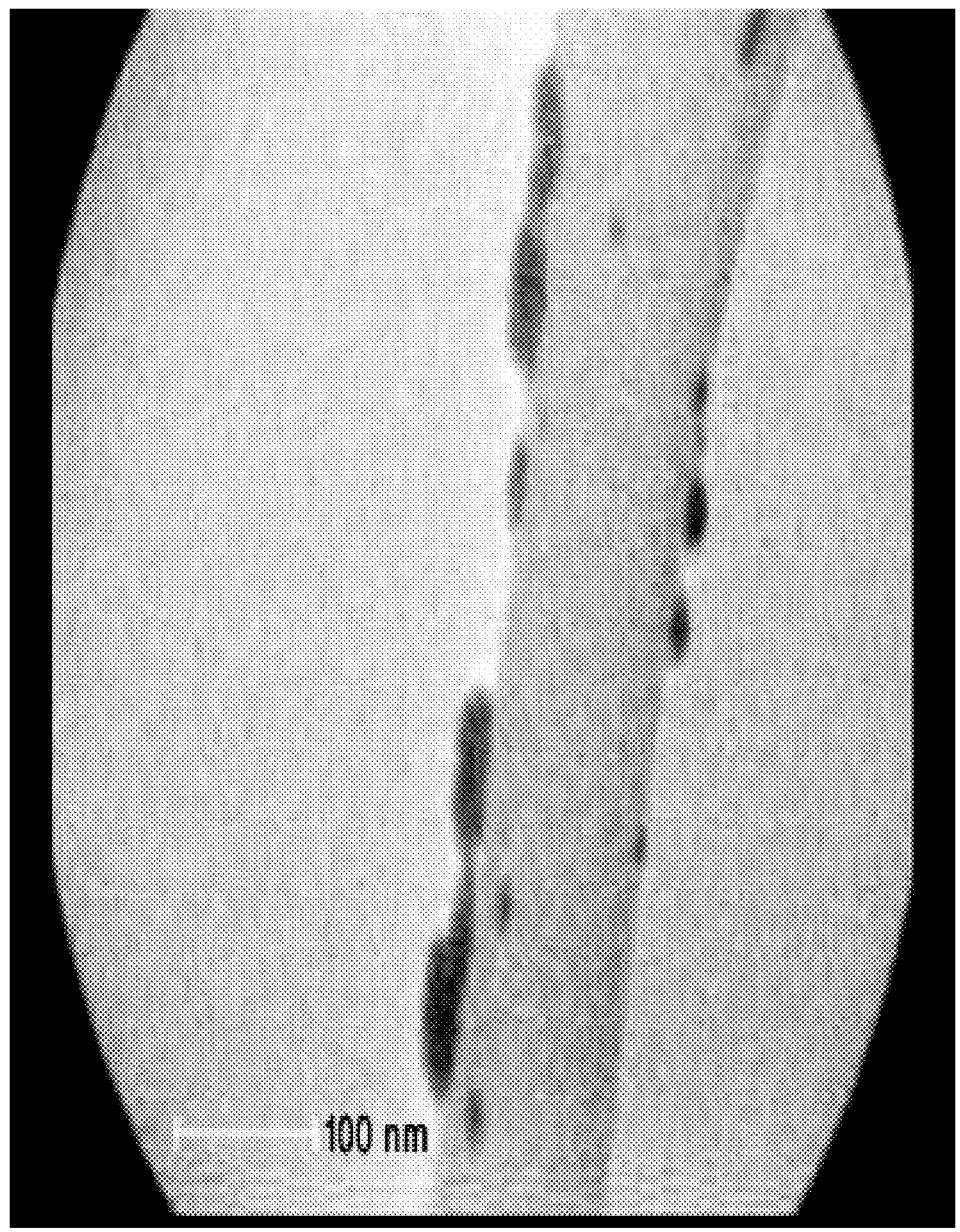
FIG. 16E shows a TEM image of the gold nano-antenna manufactured by linoleic acid.

FIG. 16E shows the TEM image of the gold nano-antenna manufactured by linoleic acid according to example 1-10 stated above.

Figure 16F:
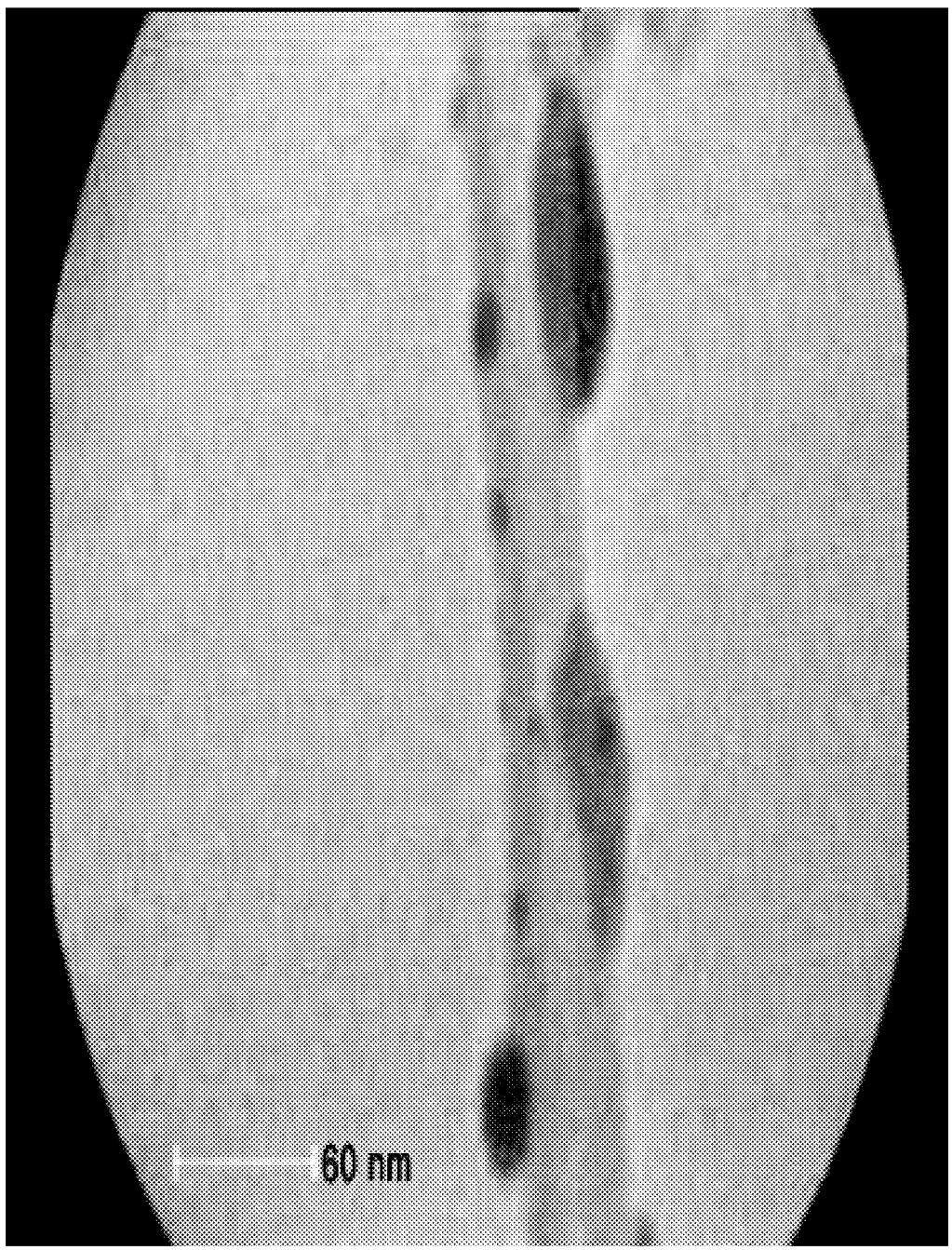
FIG. 16F shows a TEM image of the gold nano-prolate spheroid manufactured by linoleic acid.

FIG. 16F shows the TEM image of the gold nano-prolate spheroid manufactured by linoleic acid according to example 1-10 stated above.

Figure 16G:
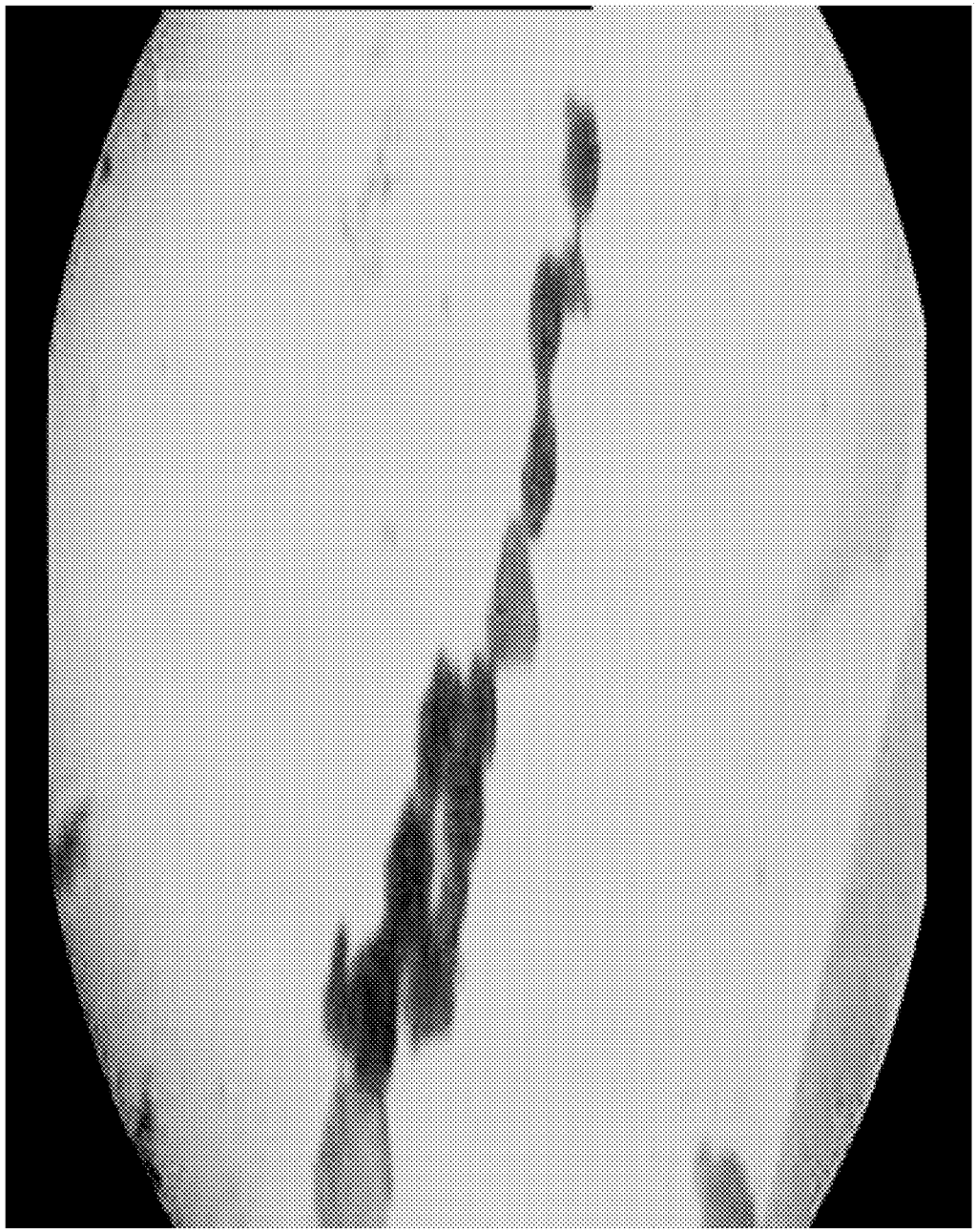
FIG. 16G shows a TEM image of the gold nano-antenna manufactured by linoleic acid.

FIG. 16G shows the TEM image of the gold nano-antenna manufactured by linoleic acid according to example 1-10 stated above.

Figure 16H:
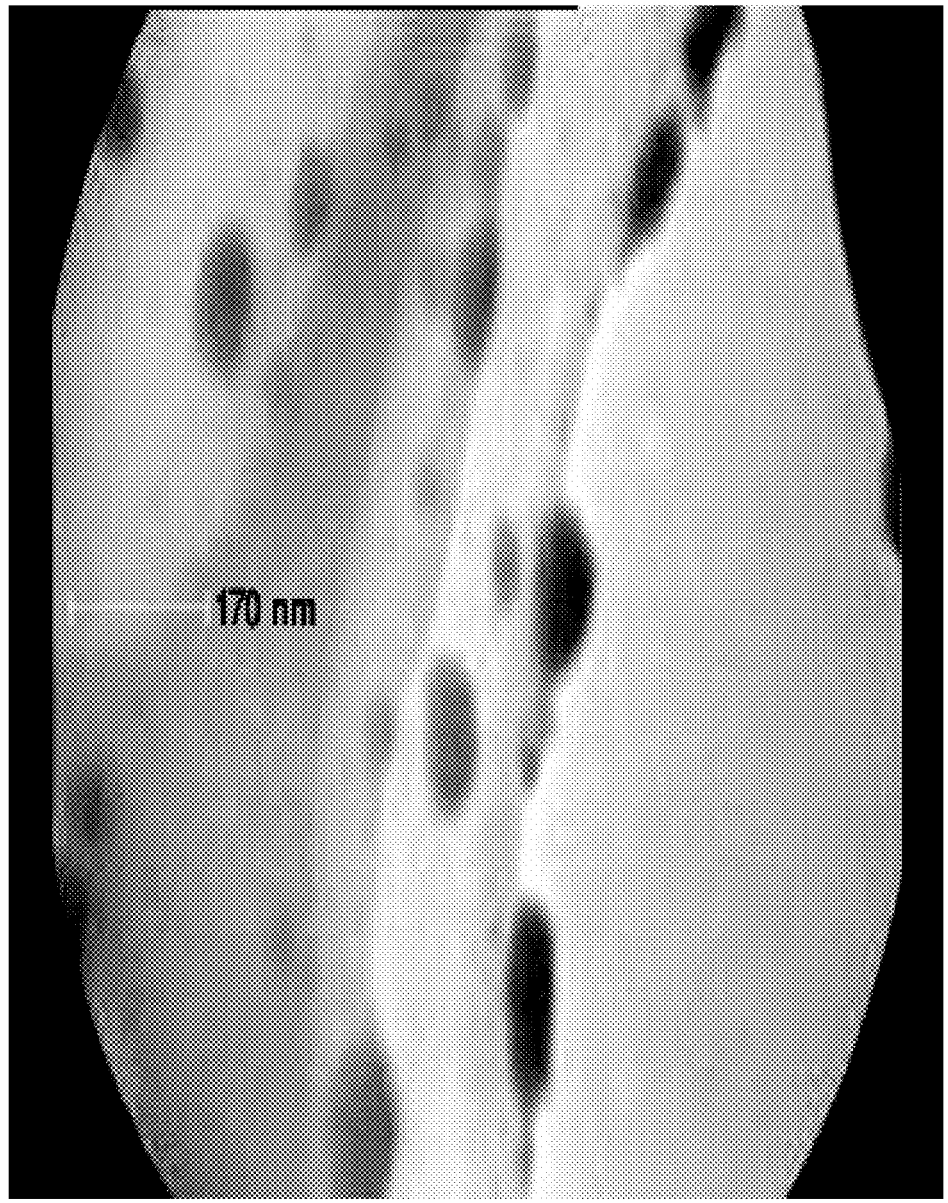
FIG. 16H shows a TEM image of the gold nano-prolate spheroid manufactured by linoleic acid.

FIG. 16H shows the TEM image of the gold nano-prolate spheroid manufactured by linoleic acid according to example 1-10 stated above.

Figure 17A:
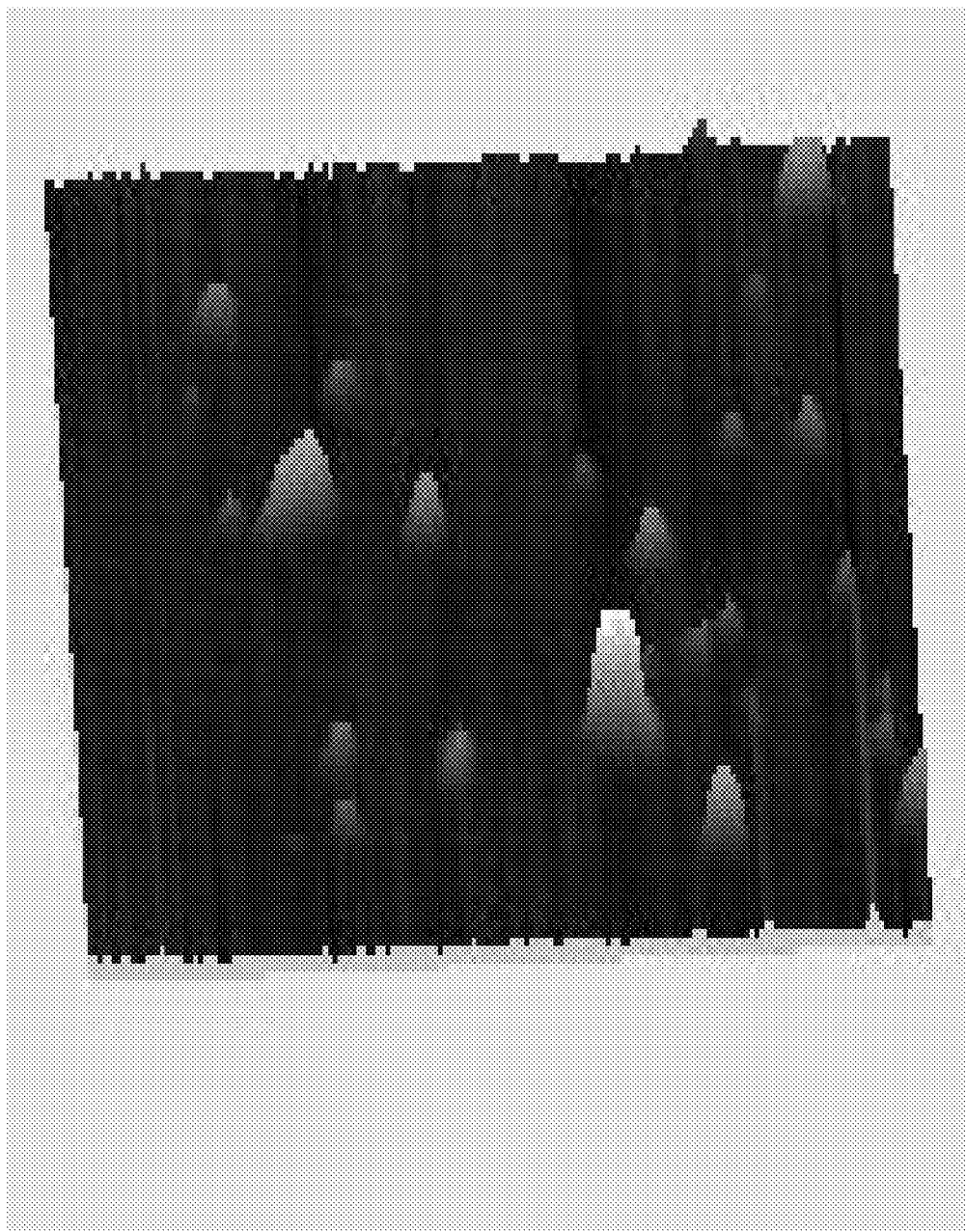
FIG. 17A shows AFM image of the gold nano-antenna, gold nano-rod, gold nano-wire, gold nano-prolate spheroid and gold nano-oblate spheroid manufactured by linoleic acid.

FIG. 17A shows the AFM image of the gold nano-antenna, gold nano-rod, gold nano-wire, gold nano-prolate spheroid and gold nano-oblate spheroid manufactured by linoleic acid according to example 1-10 stated above.

Figure 17B:
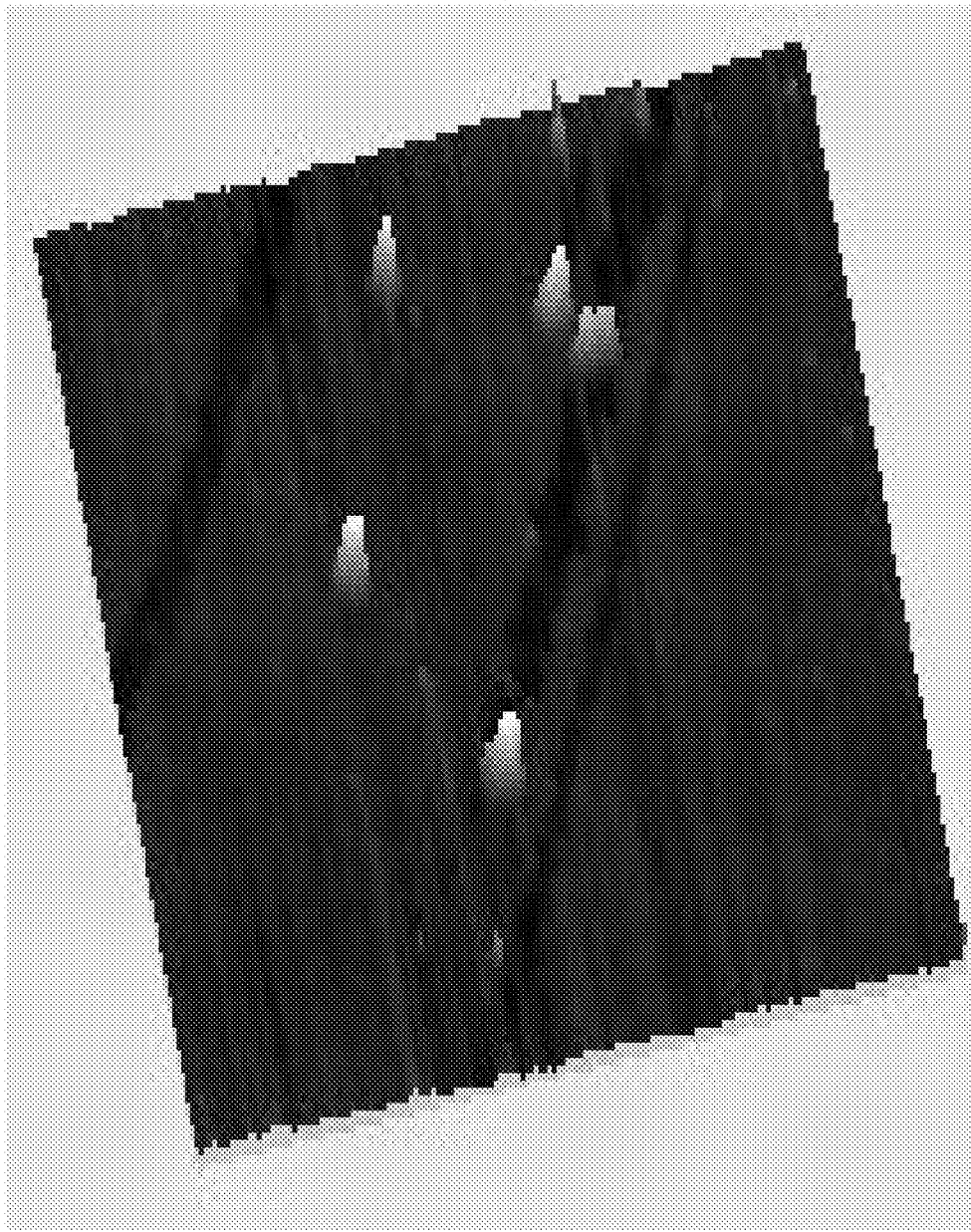
FIG. 17B shows AFM image of the gold nano-antenna, gold nano-rod, gold nano-wire, gold nano-prolate spheroid and gold nano-oblate spheroid manufactured by linoleic acid.

FIG. 17B shows the AFM image of the gold nano-antenna, gold nano-rod, gold nano-wire, gold nano-prolate spheroid and gold nano-oblate spheroid manufactured by linoleic acid according to example 1-10 stated above.

Figure 17C:
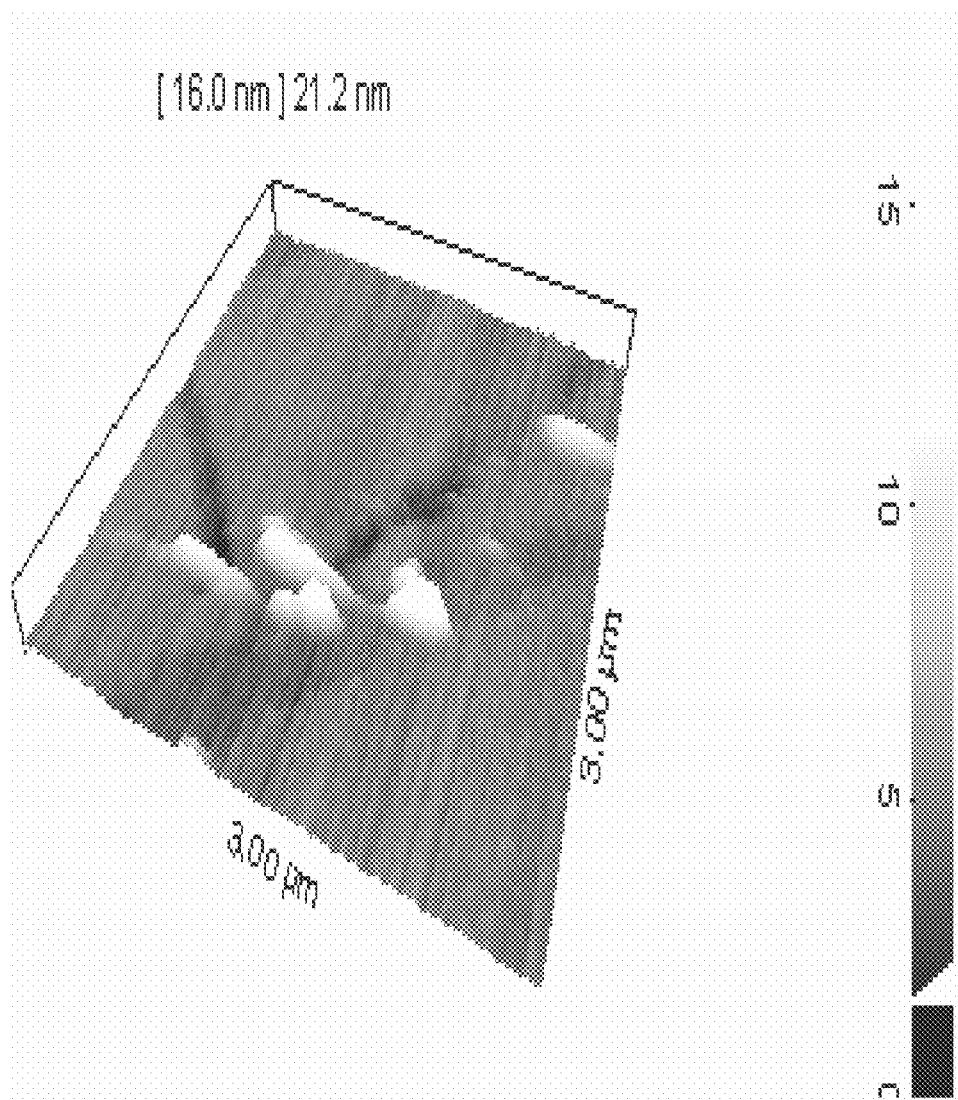
FIG. 17C shows AFM image of the gold nano-prolate spheroid manufactured by linoleic acid.

FIG. 17C shows the AFM image of the gold nano-prolate spheroid manufactured by linoleic acid according to example 1-10 stated above.

Figure 17D:
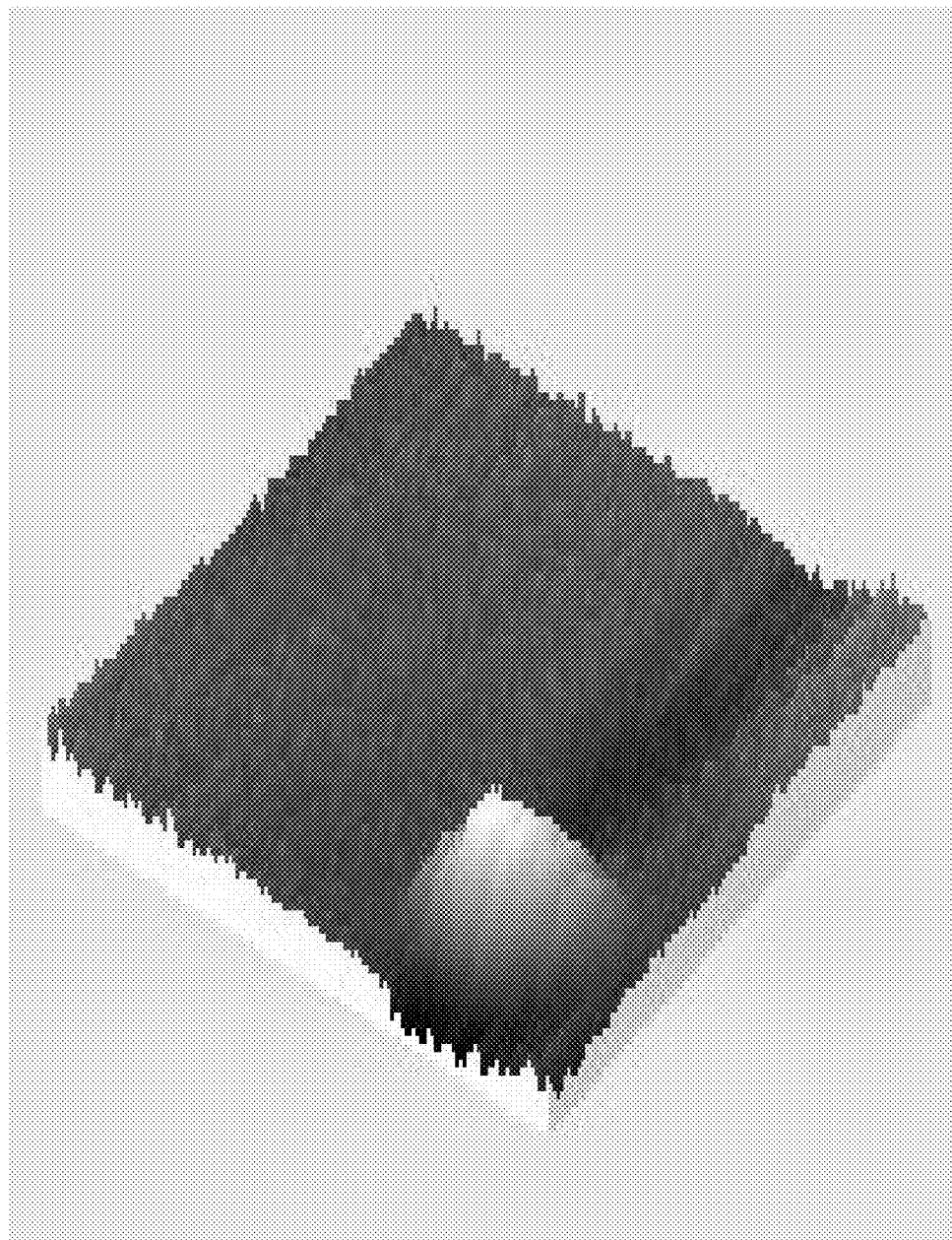
FIG. 17D shows AFM image of the gold nano-antenna, gold nano-rod, gold nano-wire, gold nano-prolate spheroid and gold nano-oblate spheroid manufactured by linoleic acid.

FIG. 17D shows the AFM image of the gold nano-antenna, gold nano-rod, gold nano-wire, gold nano-prolate spheroid and gold nano-oblate spheroid manufactured by linoleic acid according to example 1-10 stated above.

Figure 17E:
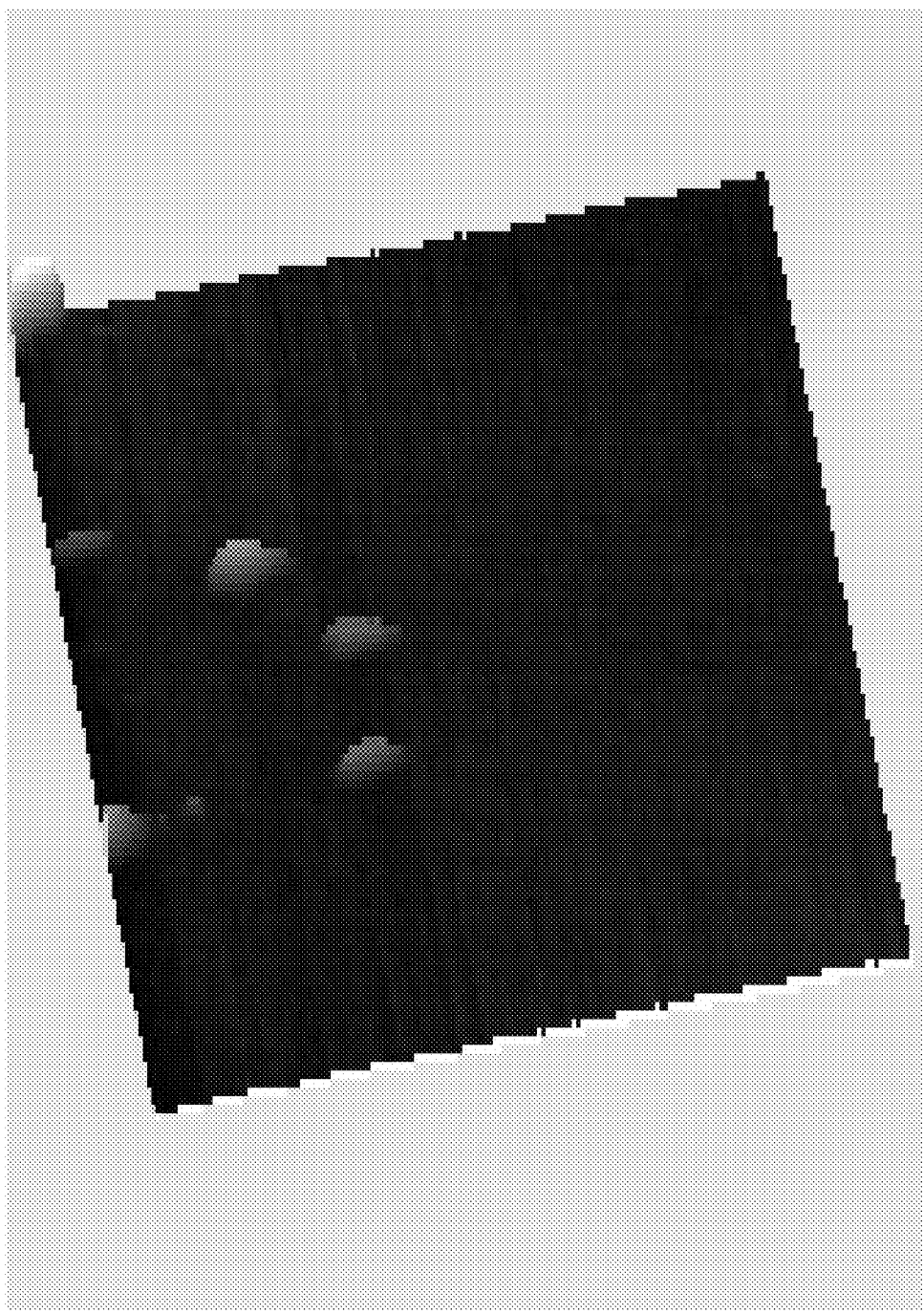
FIG. 17E shows AFM image of the gold nano-antenna, gold nano-rod, gold nano-wire, gold nano-prolate spheroid and gold nano-oblate spheroid manufactured by linoleic acid.

FIG. 17E shows the AFM image of the gold nano-antenna, gold nano-rod, gold nano-wire, gold nano-prolate spheroid and gold nano-oblate spheroid manufactured by linoleic acid according to example 1-10 stated above.

Figure 17F:
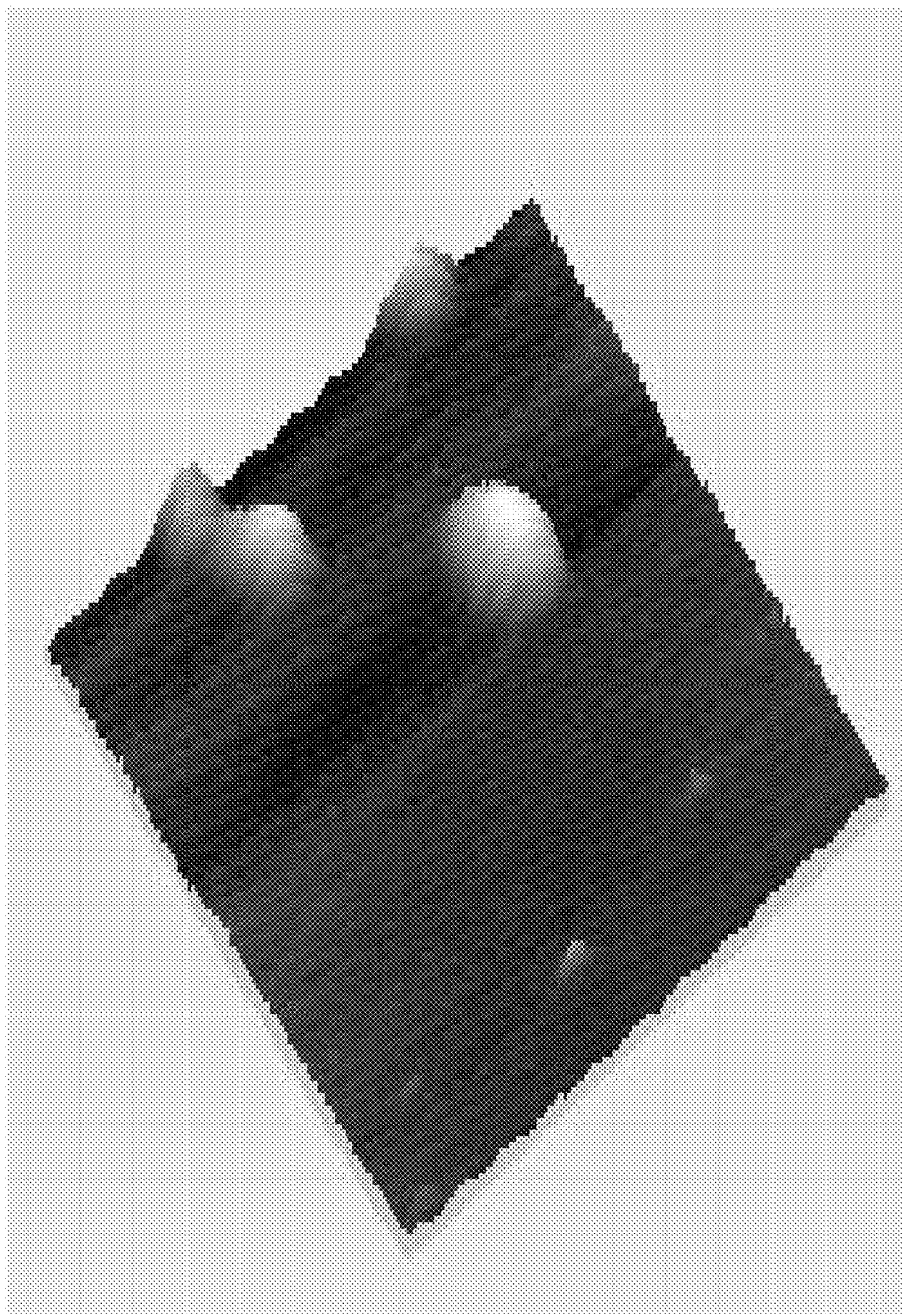
FIG. 17F shows AFM image of the gold nano-antenna, gold nano-rod, gold nano-wire, gold nano-prolate spheroid and gold nano-oblate spheroid manufactured by linoleic acid.

FIG. 17F shows the AFM image of the gold nano-antenna, gold nano-rod, gold nano-wire, gold nano-prolate spheroid and gold nano-oblate spheroid manufactured by linoleic acid according to example 1-10 stated above.

Figure 18A:
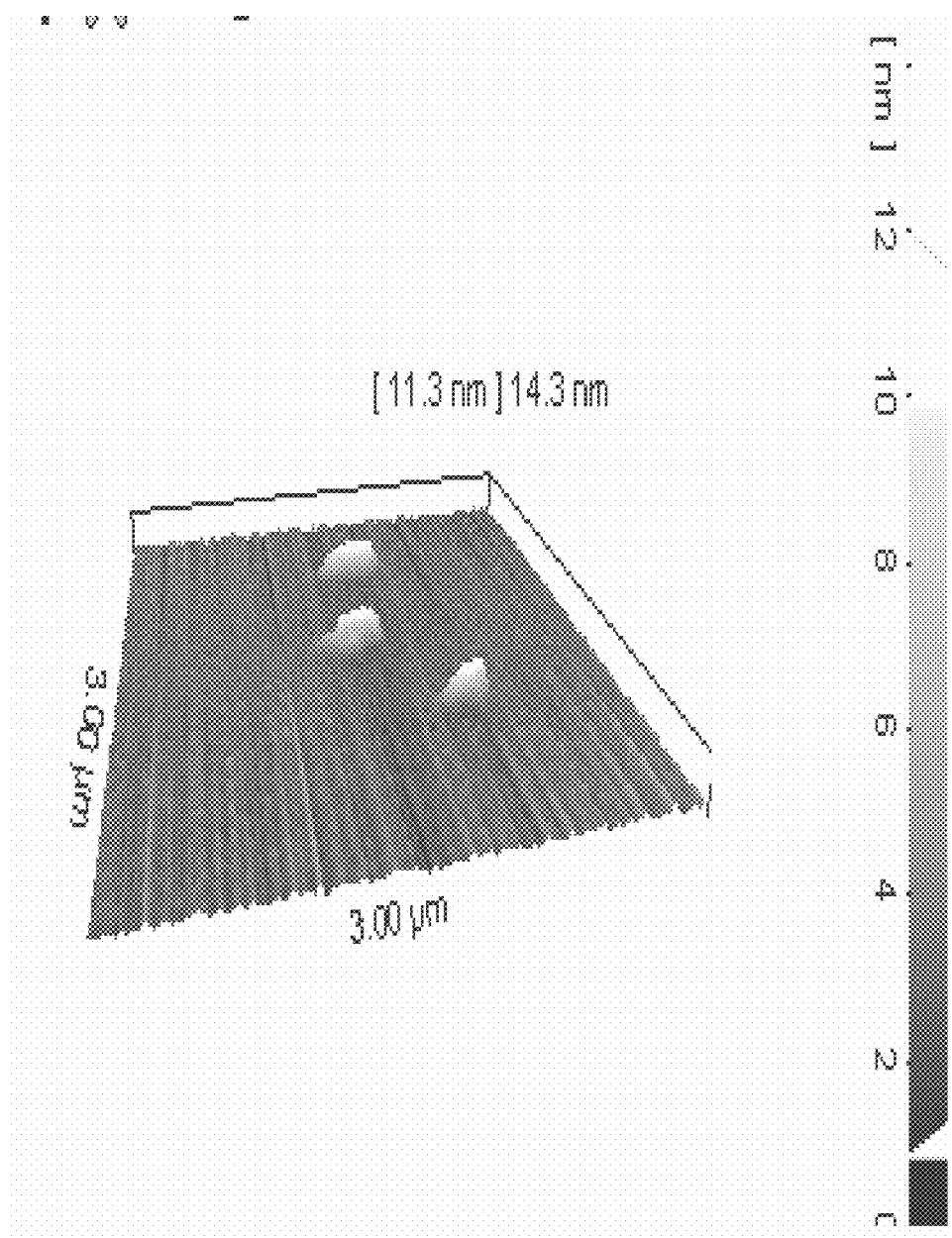
FIG. 18A shows an AFM image of the gold nano-antenna, gold nano-rod and gold nano-wire manufactured by linoleic acid.
Figure 18B:
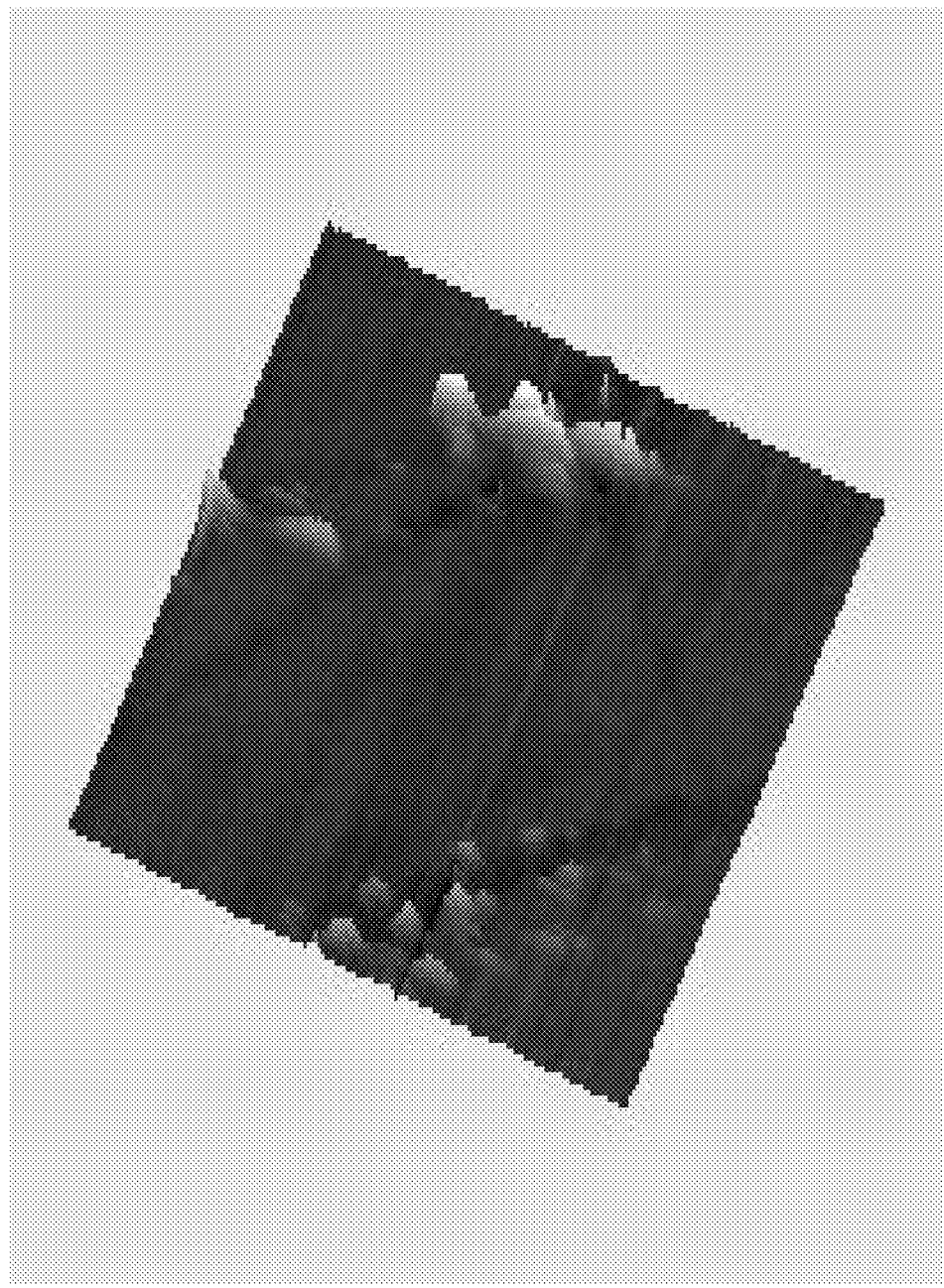
FIG. 18B shows AFM image of the gold nano-antenna, gold nano-rod, gold nano-wire, gold nano-prolate spheroid and gold nano-oblate spheroid manufactured by linoleic acid.
Figure 18C:
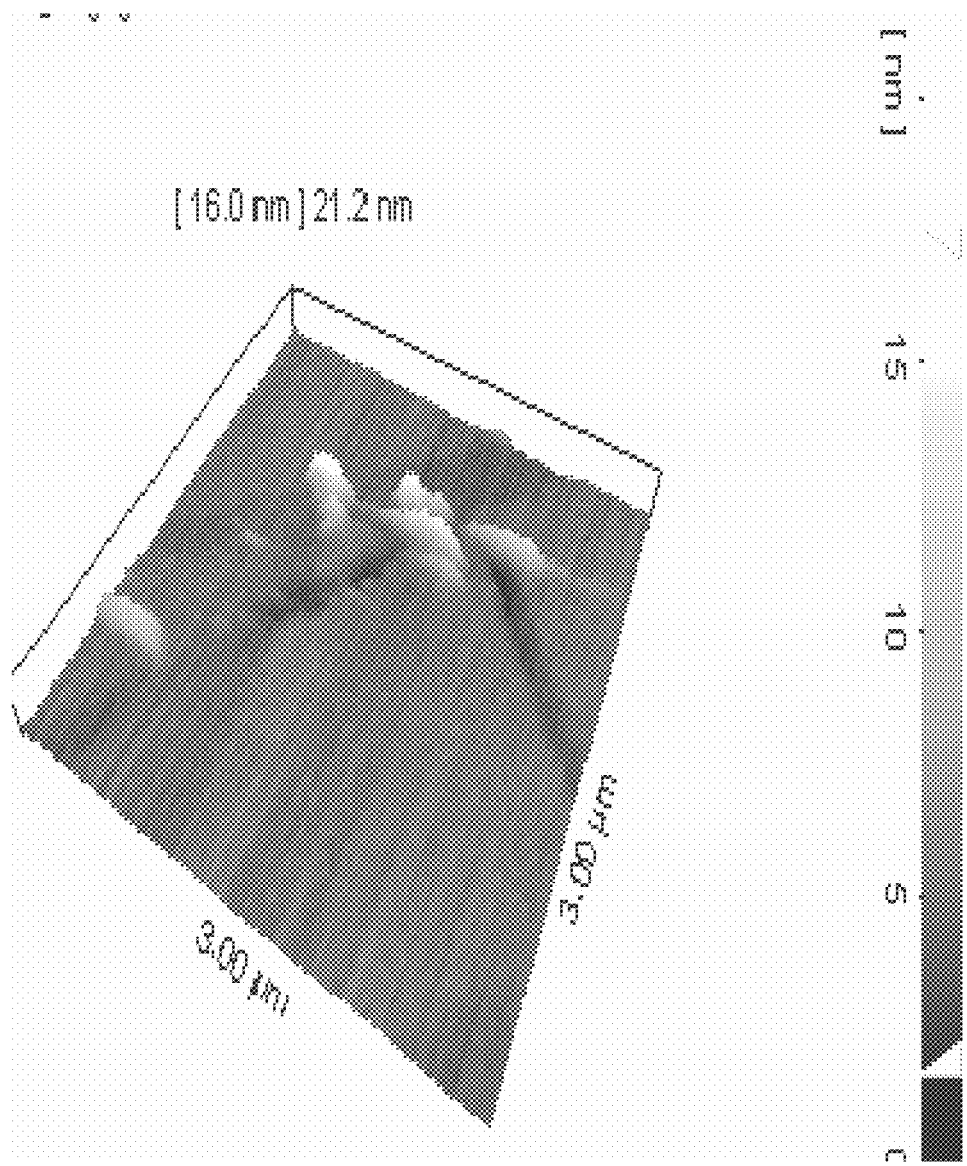
FIG. 18C shows AFM image of the gold nano-antenna, gold nano-rod, gold nano-wire manufactured by linoleic acid.
Figure 18D:
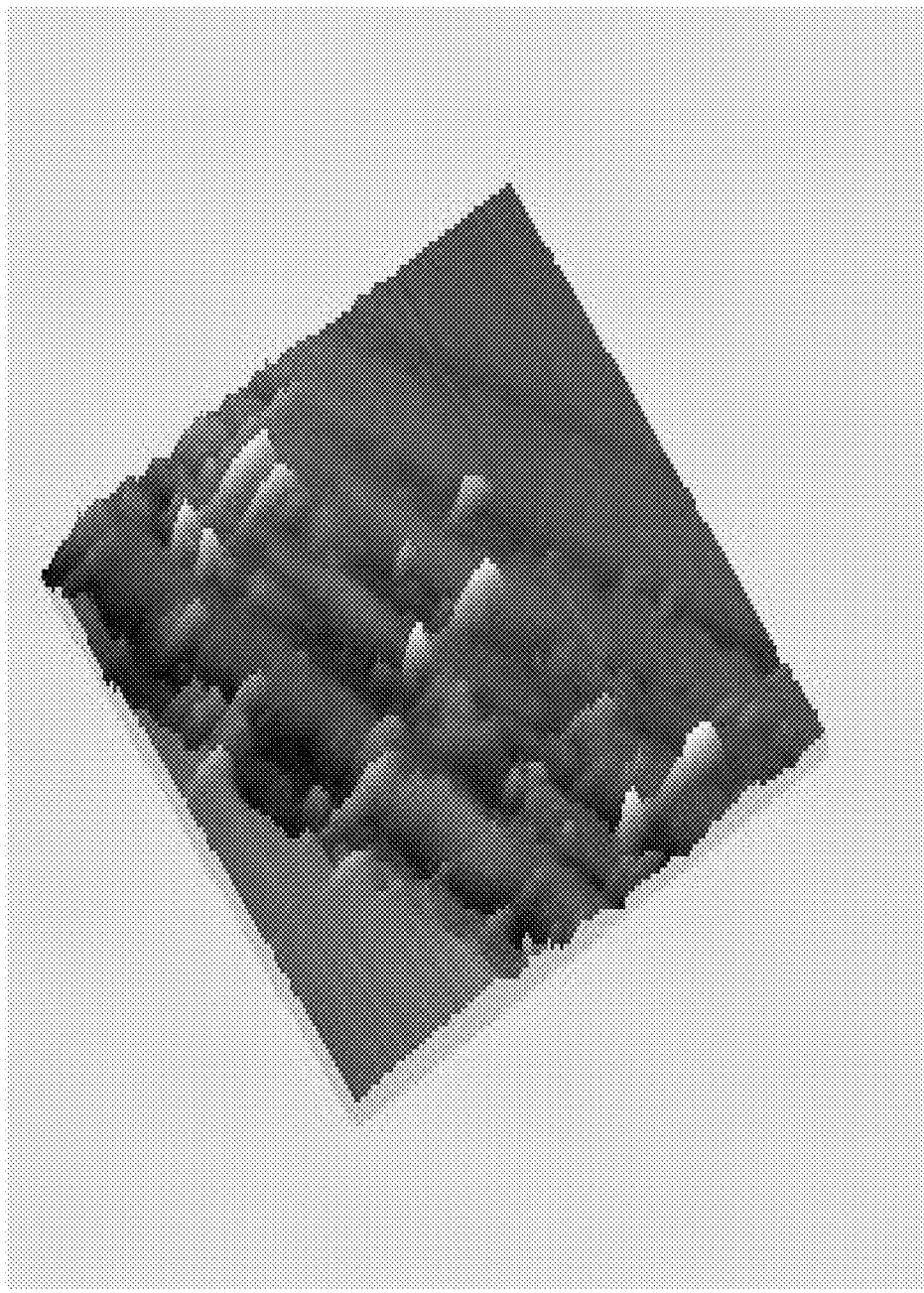
FIG. 18D shows AFM image of the gold nano-antenna, gold nano-rod, gold nano-wire, gold nano-prolate spheroid and gold nano-oblate spheroid manufactured by linoleic acid.

FIG. 18A shows the AFM image of the gold nano-antenna, gold nano-rod and gold nano-wire manufactured by linoleic acid according to example 1-10 stated above. FIG. 18B shows the AFM image of the gold nano-antenna, gold nano-rod, gold nano-wire, gold nano-prolate spheroid and gold nano-oblate spheroid manufactured by linoleic acid according to example 1-10 stated above. FIG. 18C shows the AFM image of the gold nano-antenna, gold nano-rod, gold nano-wire manufactured by linoleic acid according to example 1-10 stated above. FIG. 18D shows the AFM image of the gold nano-antenna, gold nano-rod, gold nano-wire, gold nano-prolate spheroid and gold nano-oblate spheroid manufactured by linoleic acid according to example 1-10 stated above.

Figure 19A:
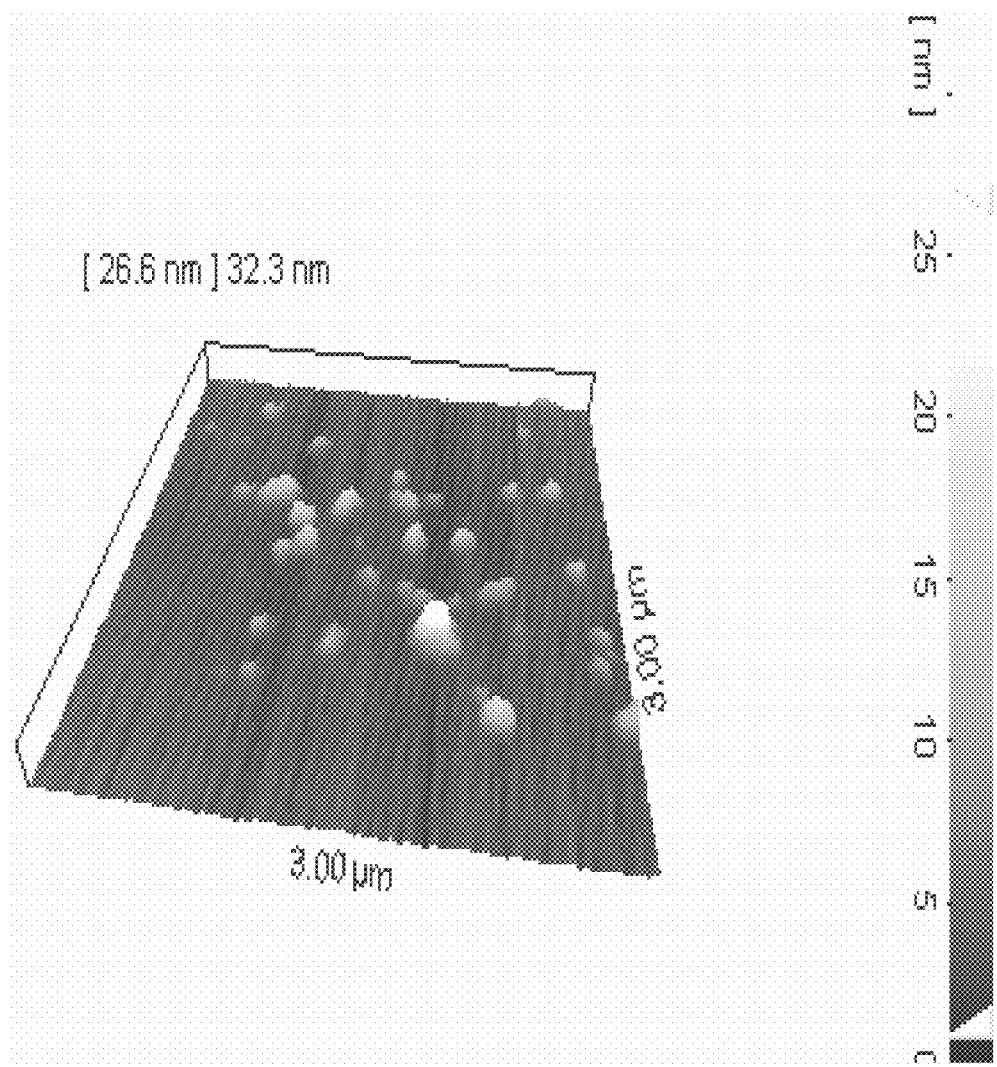
FIG. 19A shows an AFM image of the gold nano-rod manufactured by linoleic acid.
Figure 19B:
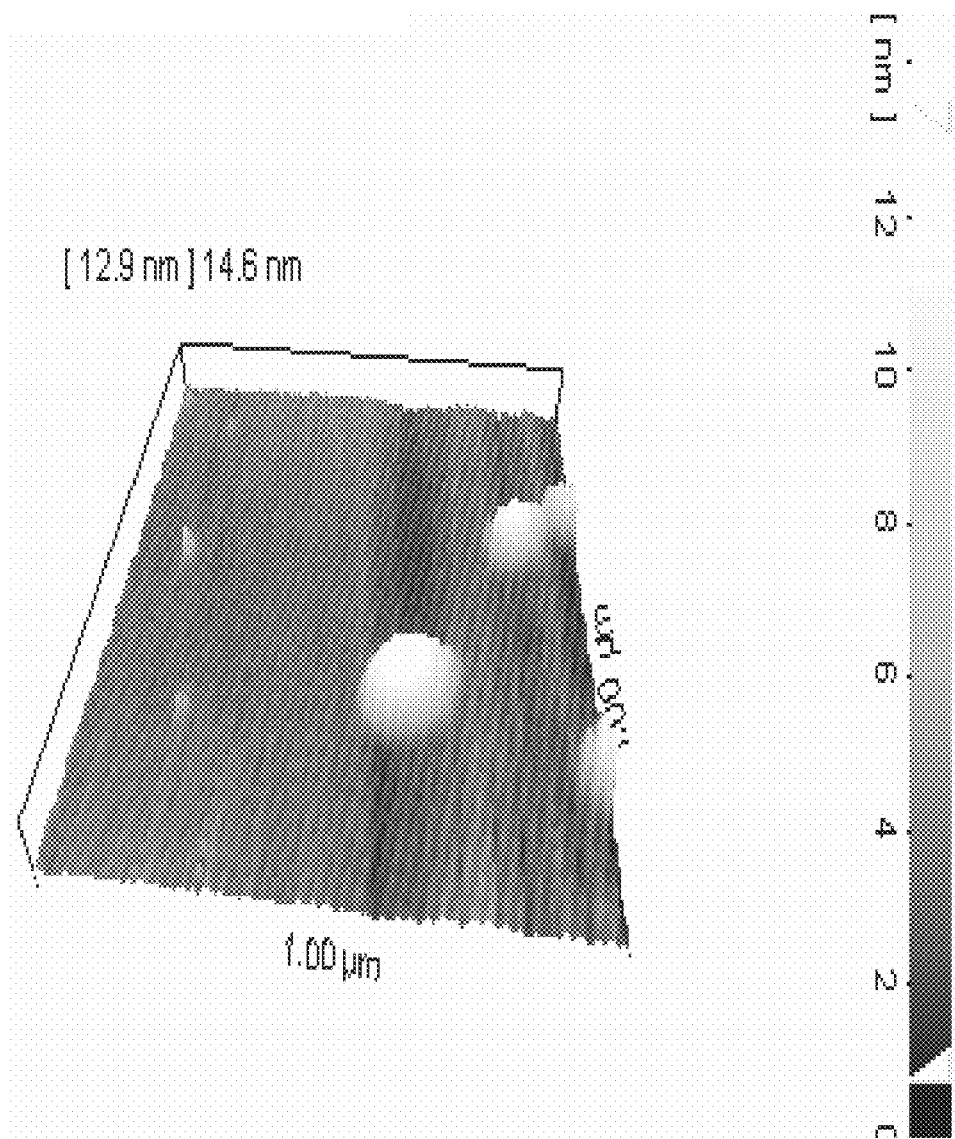
FIG. 19B shows AFM image of the gold nano-prolate spheroid manufactured by linoleic acid.

FIG. 19A shows the AFM image of the gold nano-rod manufactured by linoleic acid according to example 1-10 stated above. FIG. 19B shows the AFM image of the gold nano-prolate spheroid manufactured by linoleic acid according to example 1-10 stated above.

Figure 20:
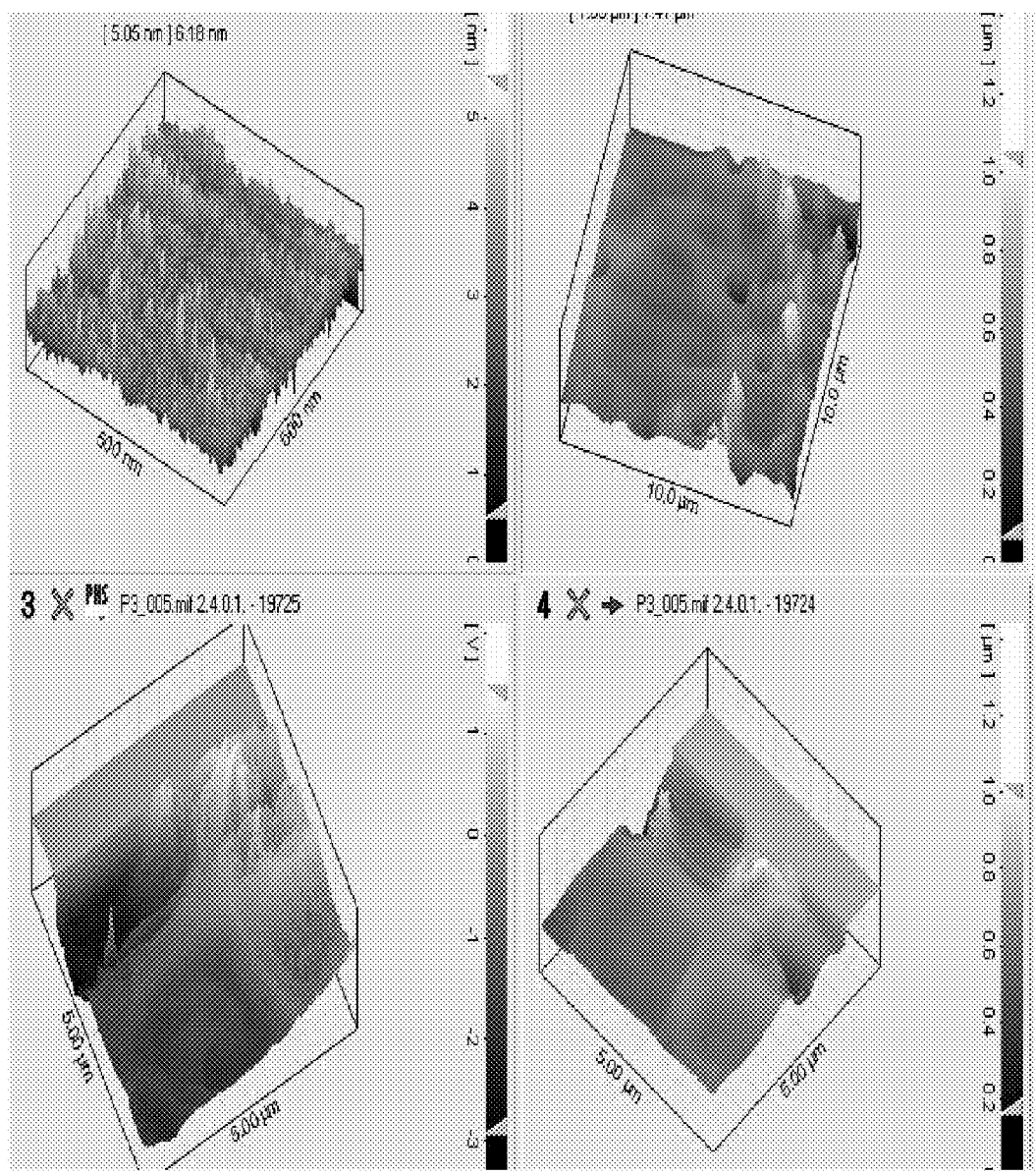
FIG. 20 shows an AFM image of the gold nano-antenna, gold nano-rod, gold nano-wire, gold nano-prolate spheroid and gold nano-oblate spheroid manufactured by linoleic acid.

FIG. 20 shows an AFM image of the gold nano-antenna, gold nano-rod, gold nano-wire, gold nano-prolate spheroid and gold nano-oblate spheroid manufactured by linoleic acid according to example stated above. With respect to FIG. 20, b shows the AFM image of gold nano-rod.

Figure 21:
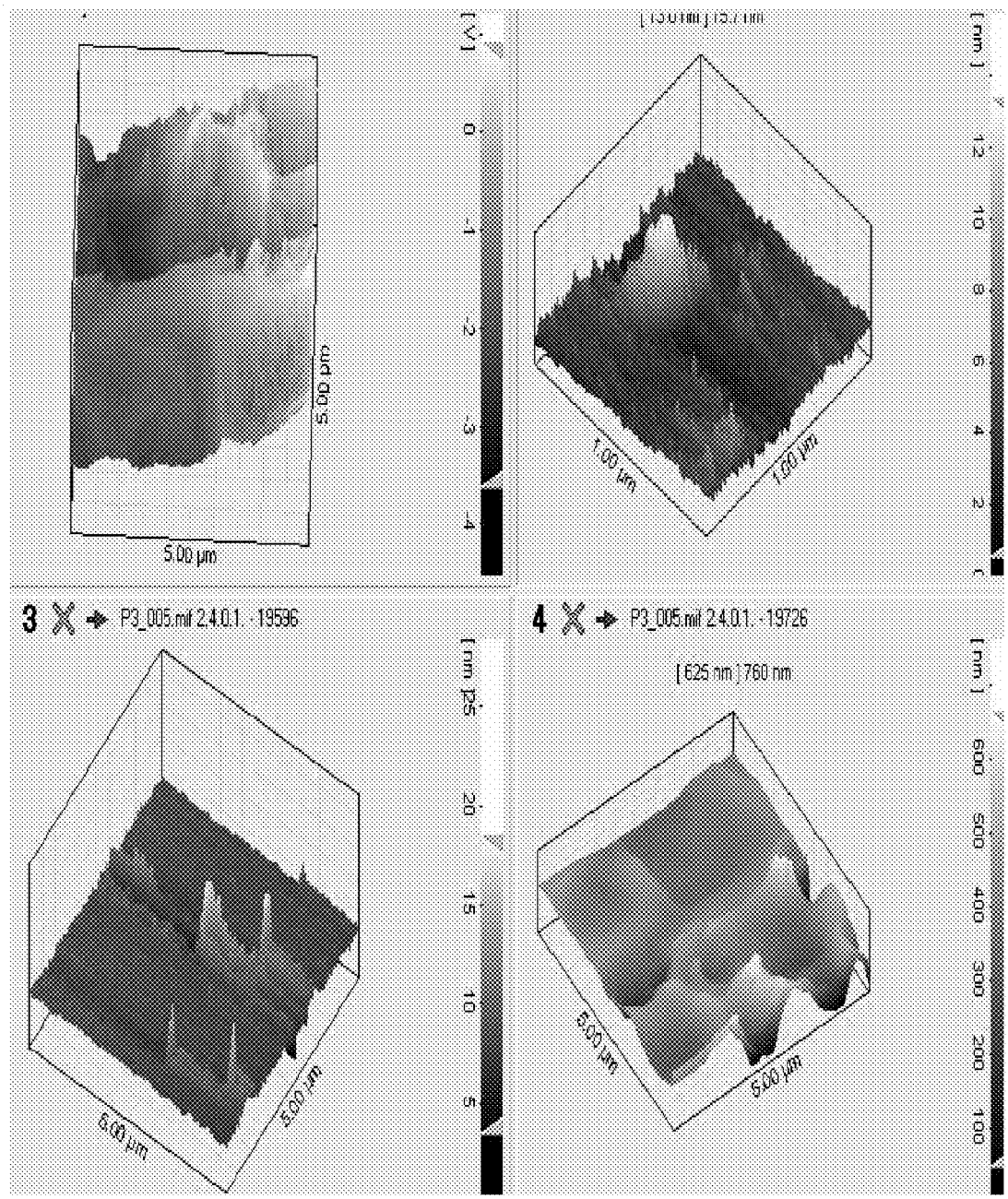
FIG. 21 shows an AFM image of the gold nano-antenna, gold nano-rod, gold nano-wire, gold nano-prolate spheroid and gold nano-oblate spheroid manufactured by linoleic acid.

FIG. 21 shows the AFM image of the gold nano-antenna, gold nano-rod, gold nano-wire, gold nano-prolate spheroid and gold nano-oblate spheroid manufactured by linoleic acid according to example 1-10 stated above. With respect to FIG. 21, d shows the gold nano-antenna, c shows the gold nano-antenna, the gold nano-rod and the gold nano-wire.

Figure 22:
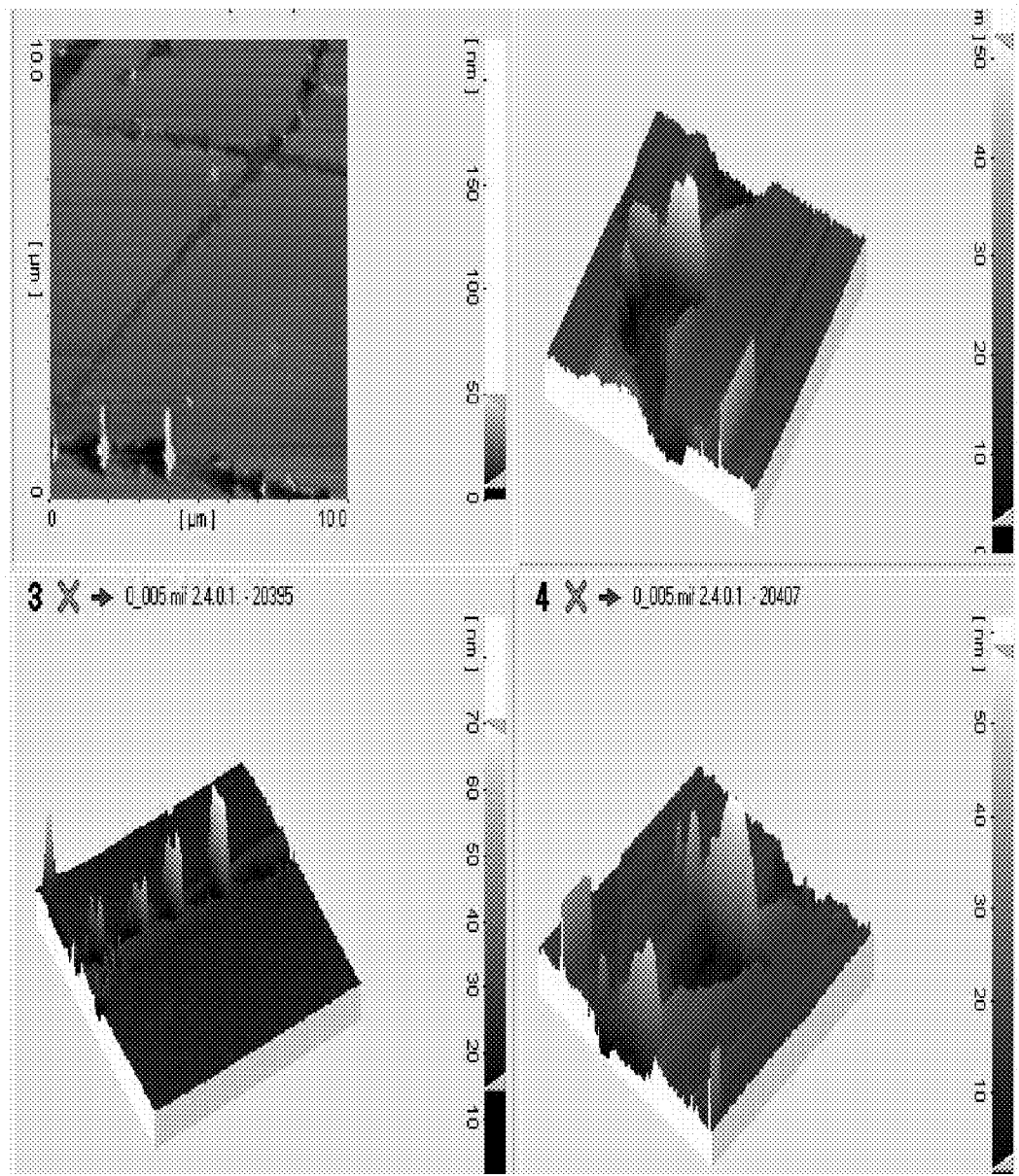
FIG. 22 shows an AFM image of the gold nano-antenna, gold nano-rod, gold nano-wire, gold nano-prolate spheroid and gold nano-oblate spheroid manufactured by linoleic acid.

FIG. 22 shows the AFM image of the gold nano-antenna, gold nano-rod, gold nano-wire, gold nano-prolate spheroid and gold nano-oblate spheroid manufactured by linoleic acid according to example 1-10 stated above. With respect to FIG. 22, a show the AFM image of gold nano-rod.

Figure 23:
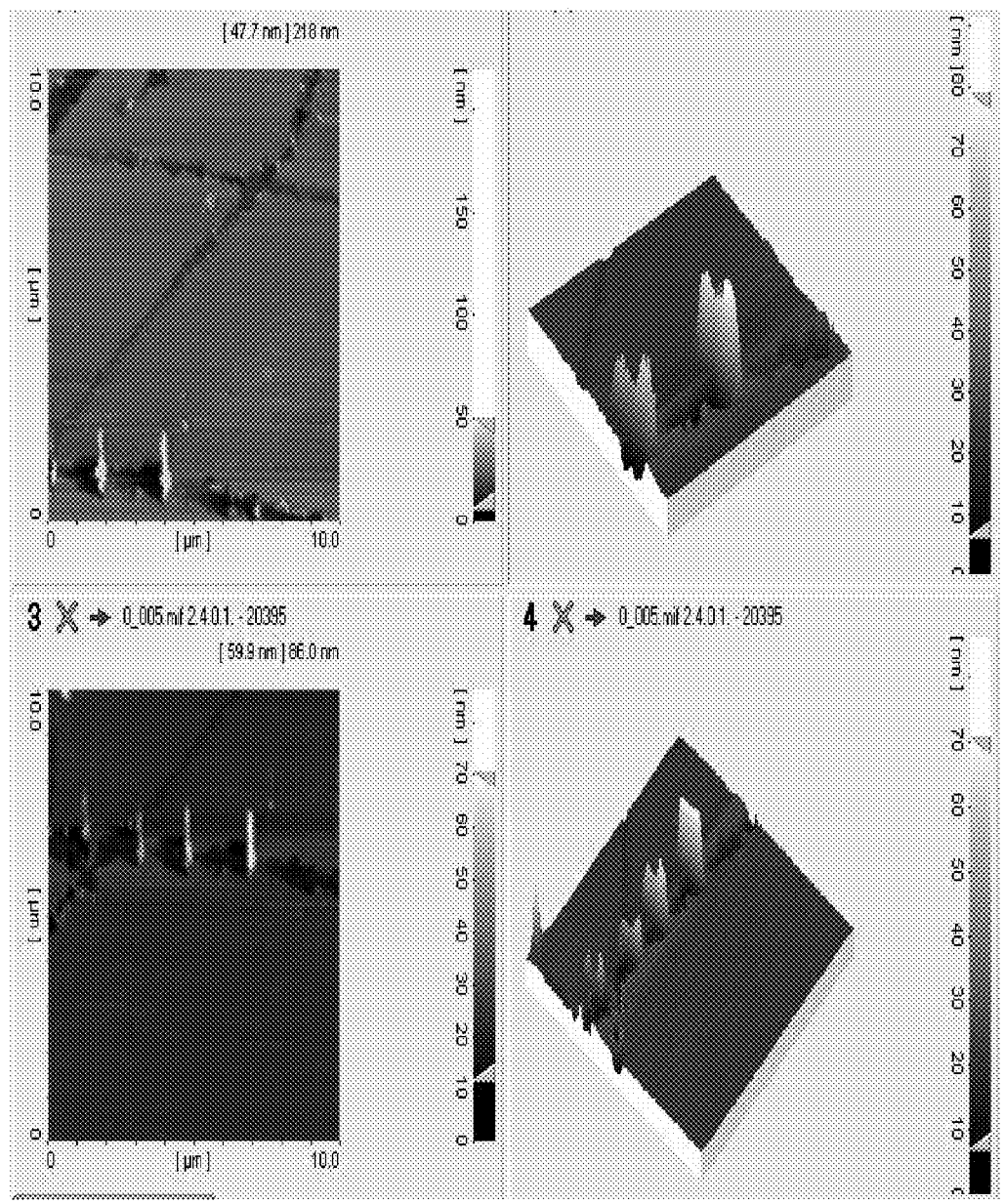
FIG. 23 shows the AFM image of the gold nano-antenna, gold nano-rod, gold nano-wire, gold nano-prolate spheroid and gold nano-oblate spheroid manufactured by linoleic acid.

FIG. 23 shows the AFM image of the gold nano-antenna, gold nano-rod, gold nano-wire, gold nano-prolate spheroid and gold nano-oblate spheroid manufactured by linoleic acid according to example 1-10 stated above. With respect to FIG. 23, c is gold nano-rod.

Figure 24:
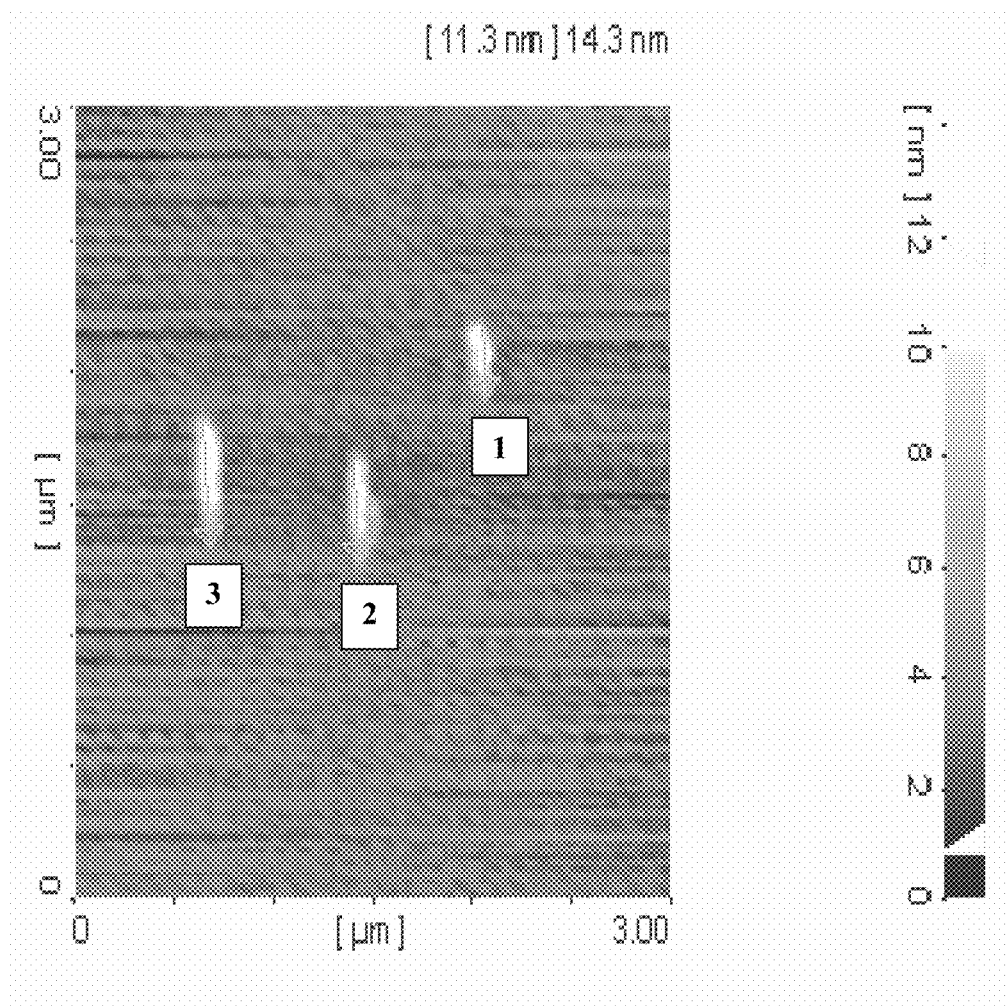
FIG. 24 shows the 2-Dimentional AFM image of the gold nano-rod manufactured by linoleic acid, in which 1, 2 and 3 shows the 2-Dimentional AFM image of a gold nano-rod.

FIG. 24 shows the 2-Dimentional AFM image of the gold nano-rod manufactured by linoleic acid according to example 1-10 stated above, where 1, 2 and 3 shows the gold nano-rod.

Figure 25:
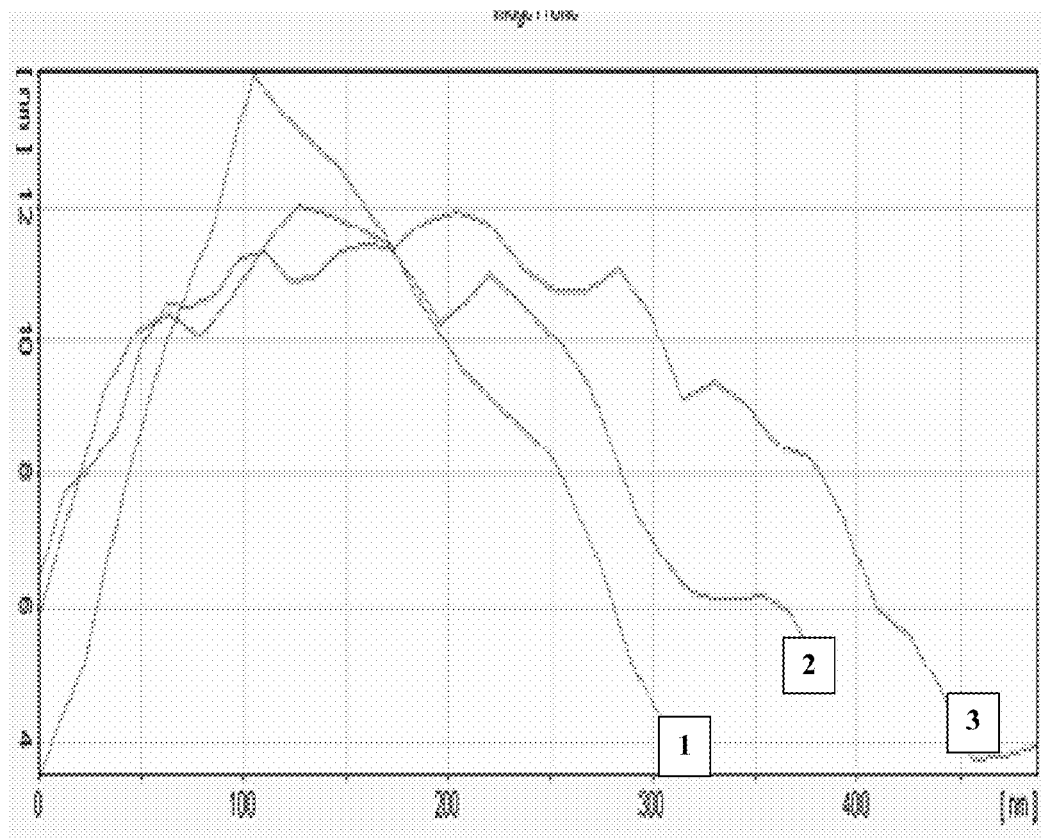
FIG. 25 shows an AFM profile image showing the size distribution of the gold nano-rod manufactured by linoleic acid.

FIG. 25 shows the AFM profile image showing the size distribution of the gold nano-rod manufactured by linoleic acid according to example 1-10 stated above. With respect to FIG. 25, 1, 2 and 3 shows the size distribution of the gold nano-particles 1, 2 and 3 showed in FIG. 24.

Figure 26:
FIG. 26 shows a 3-Dimentional AFM image of the gold nano-antenna and gold nano-rod manufactured by linoleic acid.

FIG. 26 shows the 3-Dimentional AFM image of the gold nano-antenna and gold nano-rod manufactured by linoleic acid according to example 1-10 stated above.

EXAMPLES USING PALMITIC ACID

Example#1

1 ml from 1 mM to 5 mM $HAuCl_4.3H_2O$ and 10 mL to 50 mL palmitic acid were dissolved and mixed in 40 mL to 90 mL diethylether and heated to 80° C.-110° C. The color of the reaction solution was changed to green color. In a separate flask, 30 mL to 80 mL palmitic acid was dissolved in 10 mL to 30 mL diethylether and heated to 70° C.-90° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#2

1 ml from 1 mM to 10 mM $HAuCl_4.3H_2O$ and 30 mL to 80 mL palmitic acid were dissolved and mixed in 50 mL to 100 mL Methanol and heated to 100° C.-150° C. The color of the reaction solution was changed to green color. In a separate flask, 50 mL to 100 mL palmitic acid was dissolved in 10 mL to 50 mL Methanol and 10 mL to 50 mL Acetic acid and heated to 80° C.-100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#3

1 ml from 1 mM to 10 mM $HAuCl_4.3H_2O$ and 20 mL to 40 mL palmitic acid were dissolved and mixed in 40 mL to 100 mL Chloroform and heated to 80° C.-100° C. The color of the reaction solution was changed to green color. In a separate flask, 40 mL to 80 mL palmitic acid was dissolved in 10 mL to 50 mL Chloroform and heated to 80° C. for 10 min to be used as a reducing solvent. Subsequently, the reducing solvent was injected into the mixture. The mixture was held at 120° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#4

1 ml from 1 mM to 10 mM $HAuCl_4.3H_2O$ and 10 mL to 50 mL palmitic acid were dissolved and mixed in 40 mL to 90 mL Chloroform and heated to 100° C.-180° C. The color of the reaction solution was changed to green color. In a separate flask, 100 mL to 200 mL palmitic acid was dissolved in 500 mL to 1000 mL Propylene glycol 300 and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#5

1 ml from 1 mM to 10 mM $HAuCl_4.3H_2O$ and 50 mL to 100 mL palmitic acid were dissolved and mixed in 40 mL to 90 mL Methanol and heated to 80° C.-100° C. The color of the reaction solution was changed to green color. In a separate flask, 100 mL to 200 mL palmitic acid was dissolved in 500 mL to 1000 mL Propyleneglycol300 and heated to 150° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#6

1 ml from 1 mM to 10 mM $HAuCl_4.3H_2O$ and 50 mL to 100 mL palmitic acid were dissolved and mixed in 40 mL to 90 mL Methanol and heated to 110° C. The color of the reaction solution was changed to green color. In a separate flask, 50 mL to 200 mL palmitic acid was dissolved in 500 mL to 1000 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#7

1 ml from 1 mM to 10 mM $HAuCl_4.3H_2O$ and 10 mL to 30 mL palmitic acid were dissolved and mixed in 40 mL to 90 mL diethylether and heated to 100° C. The color of the reaction solution was changed to green color. In a separate flask, 60 mL palmitic acid was dissolved in 100 mL to 500 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#8

1 ml from 1 mM to 10 mM $HAuCl_4.3H_2O$ and 10 mL to 30 mL palmitic acid were dissolved and mixed in 40 mL to 80 mL diethylether and heated to 100° C. The color of the reaction solution was changed to green color. In a separate flask, 50 mL to 100 mL palmitic acid was dissolved in 100 mL to 500 mL polyethylene Glycol 2000 and heated to 120° C. for 30 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#9

1 ml from 1 mM to 10 mM $HAuCl_4.3H_2O$ and 10 mL to 30 mL palmitic acid were dissolved and mixed in 40 mL to 80 mL diethylether and heated to 100° C. The color of the reaction solution was changed to green color. In a separate flask, 10 mL to 50 mL palmitic acid was dissolved in 50 mL to 100 mL Propyleneglycol300 and 10 mL to 50 mL Acetic acid and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#10

1 ml from 1 mM to 10 mM $HAuCl_4.3H_2O$ and 10 mL to 30 mL palmitic acid were dissolved and mixed in 40 mL to 80 mL Chloroform and heated to 80° C. The color of the reaction solution was changed to green color. In a separate flask, 40 mL to 80 mL palmitic acid was dissolved in 50 mL to 100 mL Polyethylene glycol 1000 and 1 mL to 10 mL Ascorbic acid and heated to 100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Figure 27:
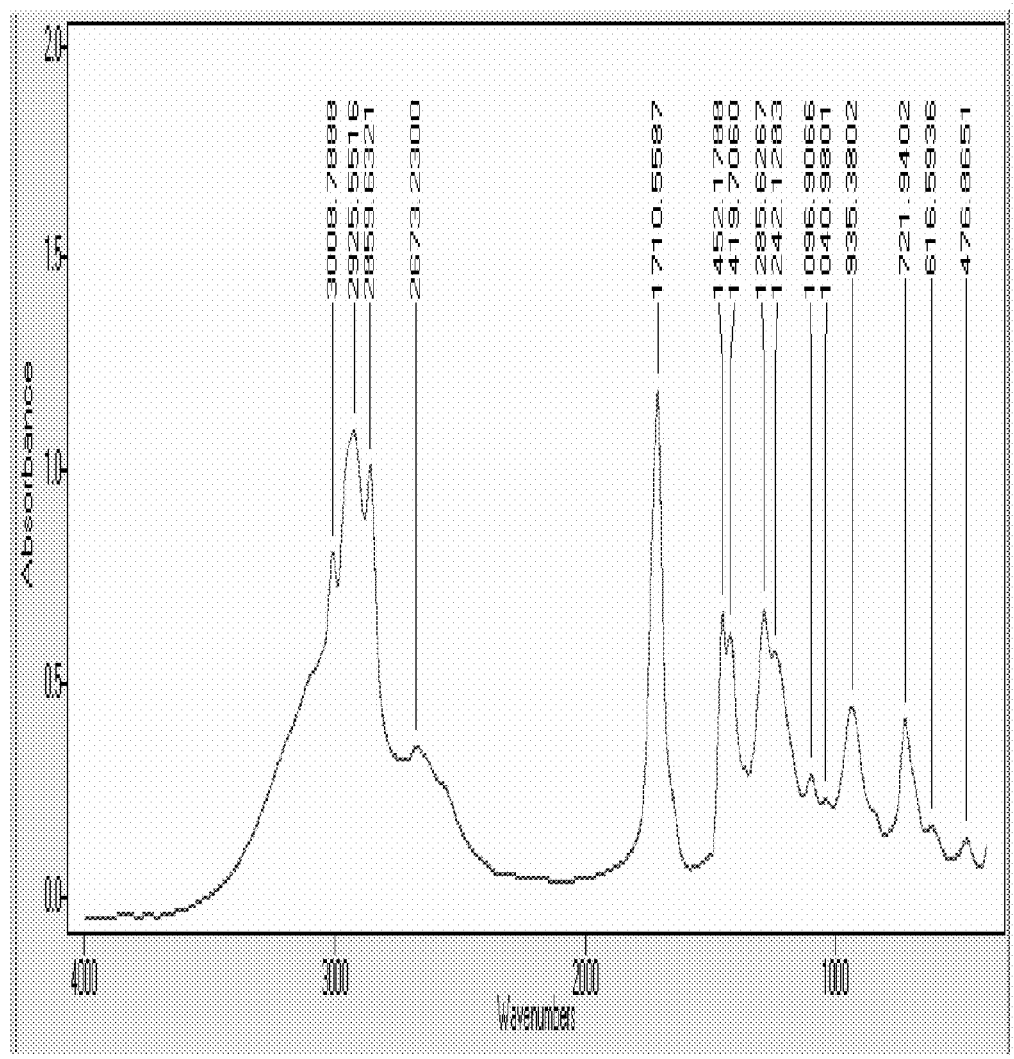
FIG. 27 shows an absorbance of FTIR spectra of the gold nano-antennas, gold nano-rods, gold nano-wires, gold nano-prolate spheroids and gold nano-oblate spheroids manufactured by palmitic acid.

FIG. 27 shows the absorbance of FTIR spectra of the gold nano-antennas, gold nano-rods, gold nano-wires, gold nano-prolate spheroids and gold nano-oblate spheroids manufactured by palmitic acid according to example 1-10 stated above.

Figure 28:
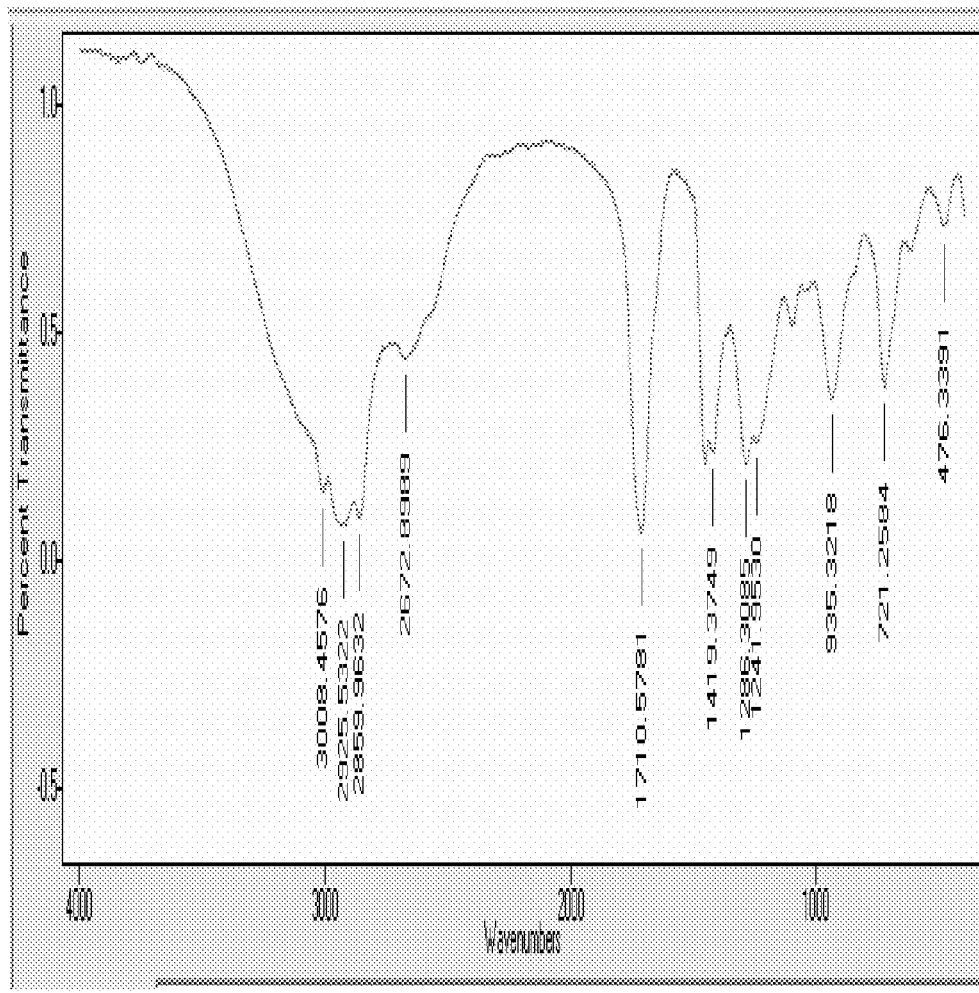
FIG. 28 shows a transmittance of FTIR spectra of the gold nano-antennas, gold nano-rods, gold nano-wires, gold nano-prolate spheroids and gold nano-oblate spheroids manufactured by palmitic acid.

FIG. 28 shows the transmittance of FTIR spectra of the gold nano-antennas, gold nano-rods, gold nano-wires, gold nano-prolate spheroids and gold nano-oblate spheroids manufactured by palmitic acid according to example 1-10 stated above.

Figure 29:
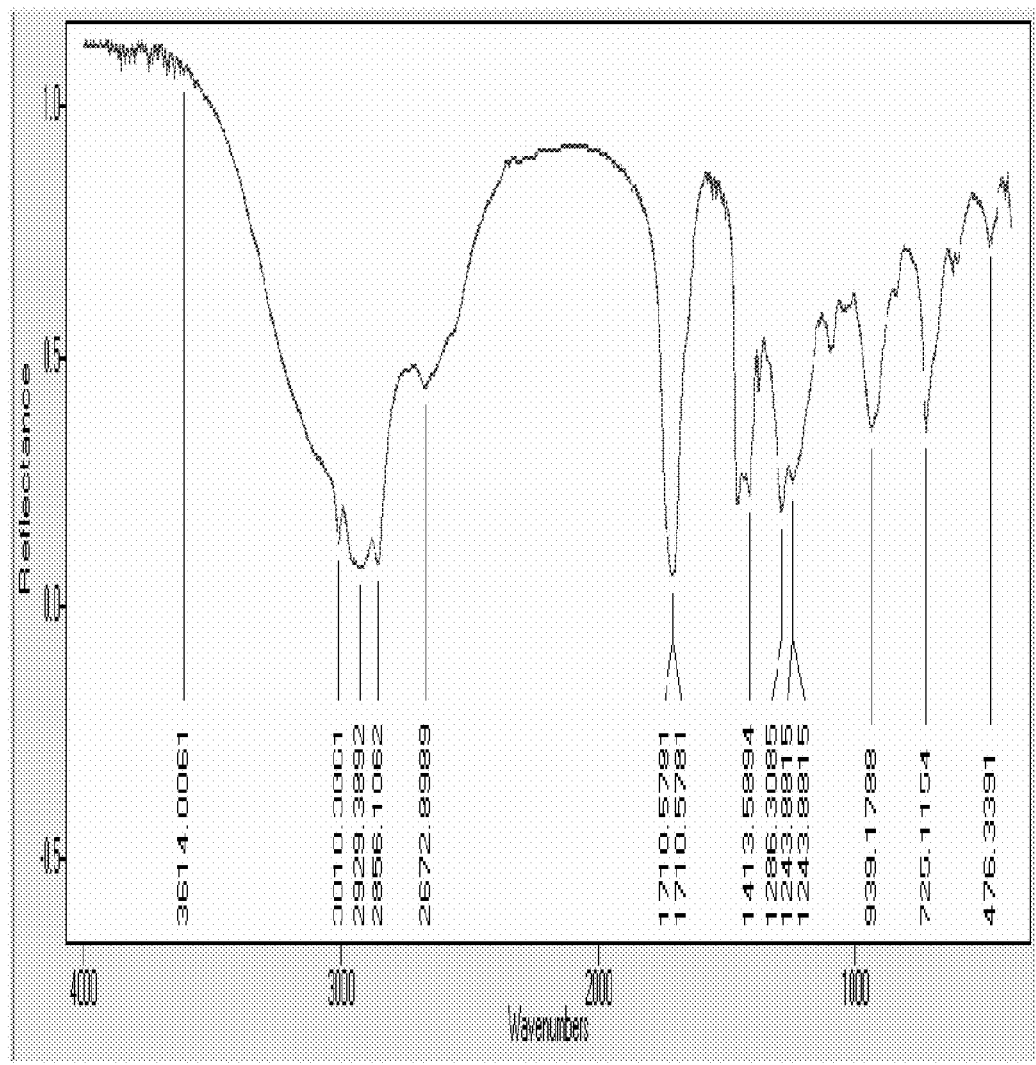
FIG. 29 shows a reflectance of FTIR spectra of the gold nano-antennas, gold nano-rods, gold nano-wires, gold nano-prolate spheroids and gold nano-oblate spheroids manufactured by palmitic acid.

FIG. 29 shows the reflectance of FTIR spectra of the gold nano-antennas, gold nano-rods, gold nano-wires, gold nano-prolate spheroids and gold nano-oblate spheroids manufactured by palmitic acid according to example 1-10 stated above.

Figure 30:
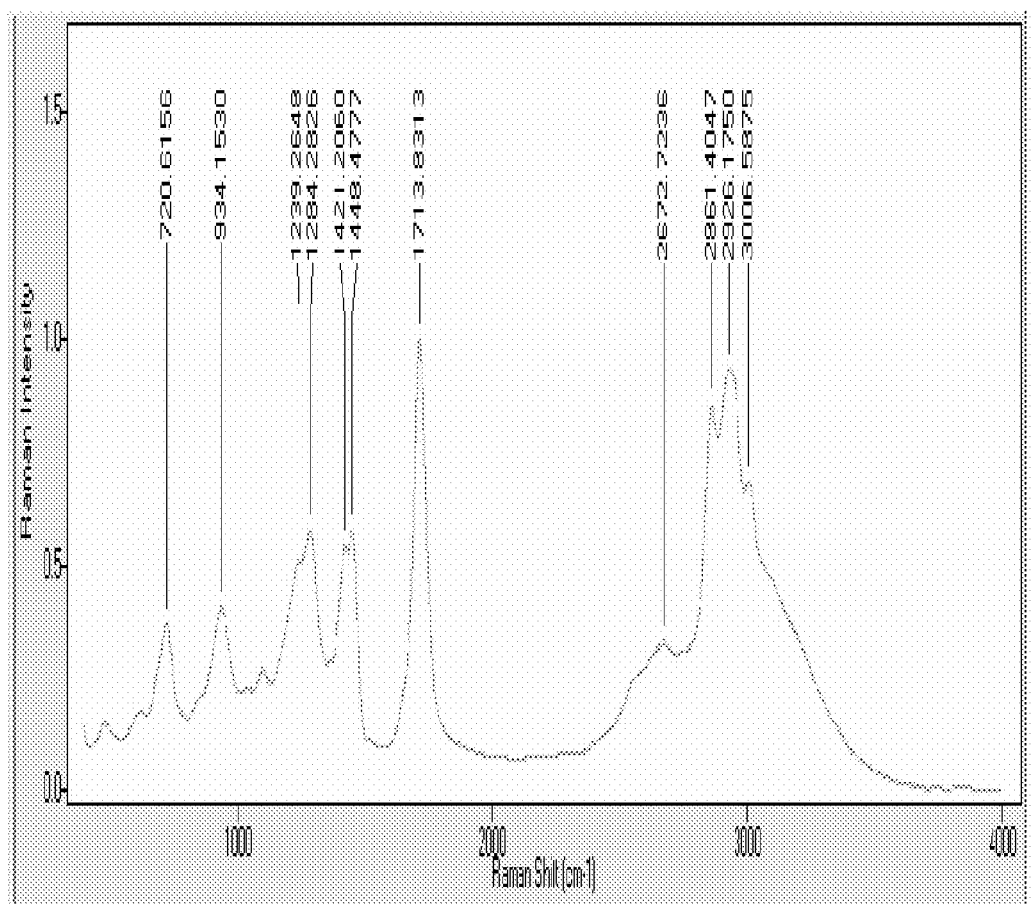
FIG. 30 shows Raman Intensity of FTIR spectra of the gold nano-antennas, gold nano-rods, gold nano-wires, gold nano-prolate spheroids and gold nano-oblate spheroids manufactured by palmitic acid.

FIG. 30 shows the Raman Intensity of FTIR spectra of the gold nano-antennas, gold nano-rods, gold nano-wires, gold nano-prolate spheroids and gold nano-oblate spheroids manufactured by palmitic acid according to example 1-10 stated above.

Figure 31:
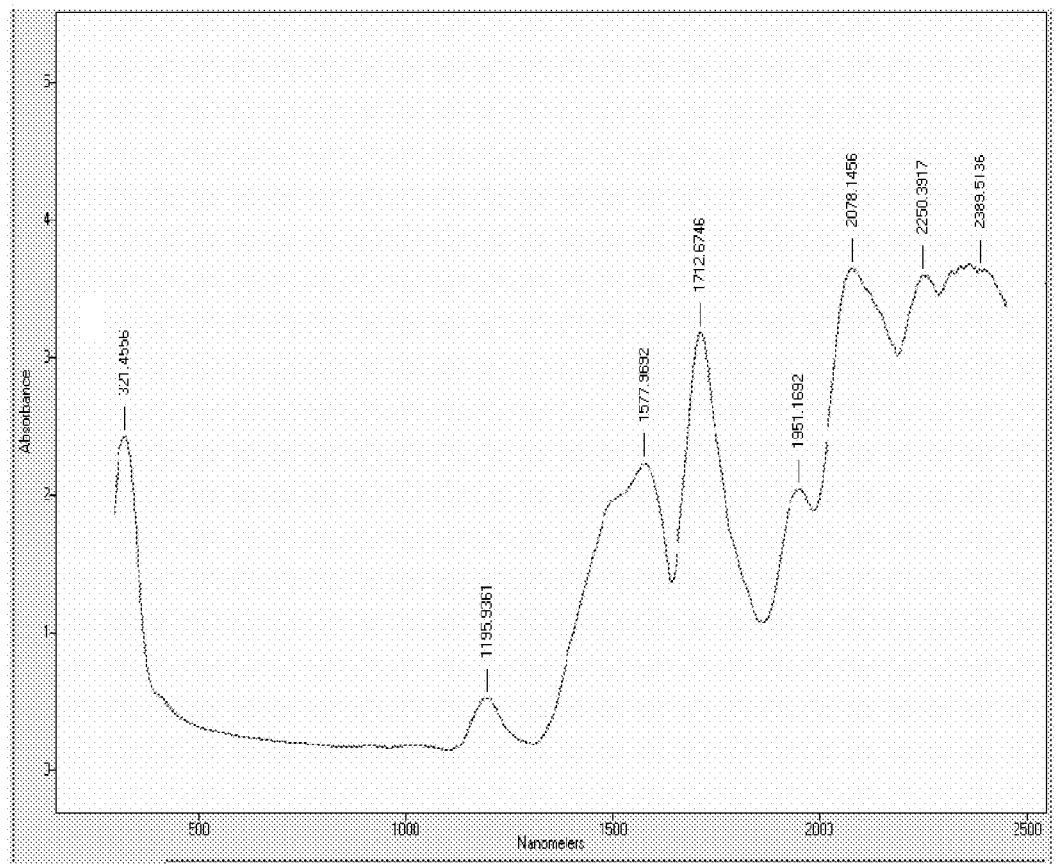
FIG. 31 shows an absorbance of UV-NIR spectra of the gold nano-antennas, gold nano-rods, gold nano-wires, gold nano-prolate spheroids and gold nano-oblate spheroids manufactured by palmitic acid.

FIG. 31 shows the absorbance of UV-NIR spectra of the gold nano-antennas, gold nano-rods, gold nano-wires, gold nano-prolate spheroids and gold nano-oblate spheroids manufactured by palmitic acid according to example 1-10 stated above.

Figure 32A:
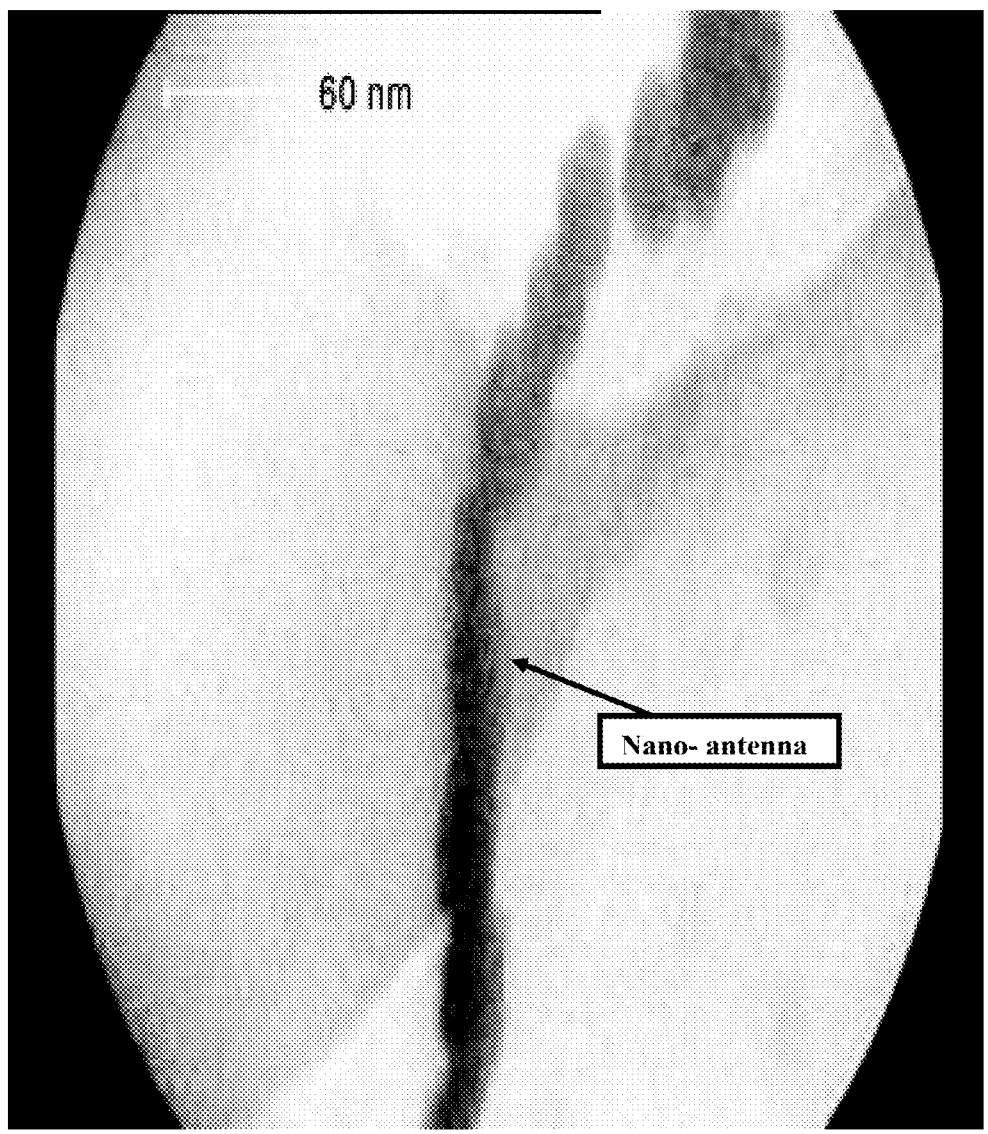
FIG. 32A shows TEM image of the gold nano-antenna and gold nano-prolate spheroid manufactured by palmitic acid.
Figure 32B:
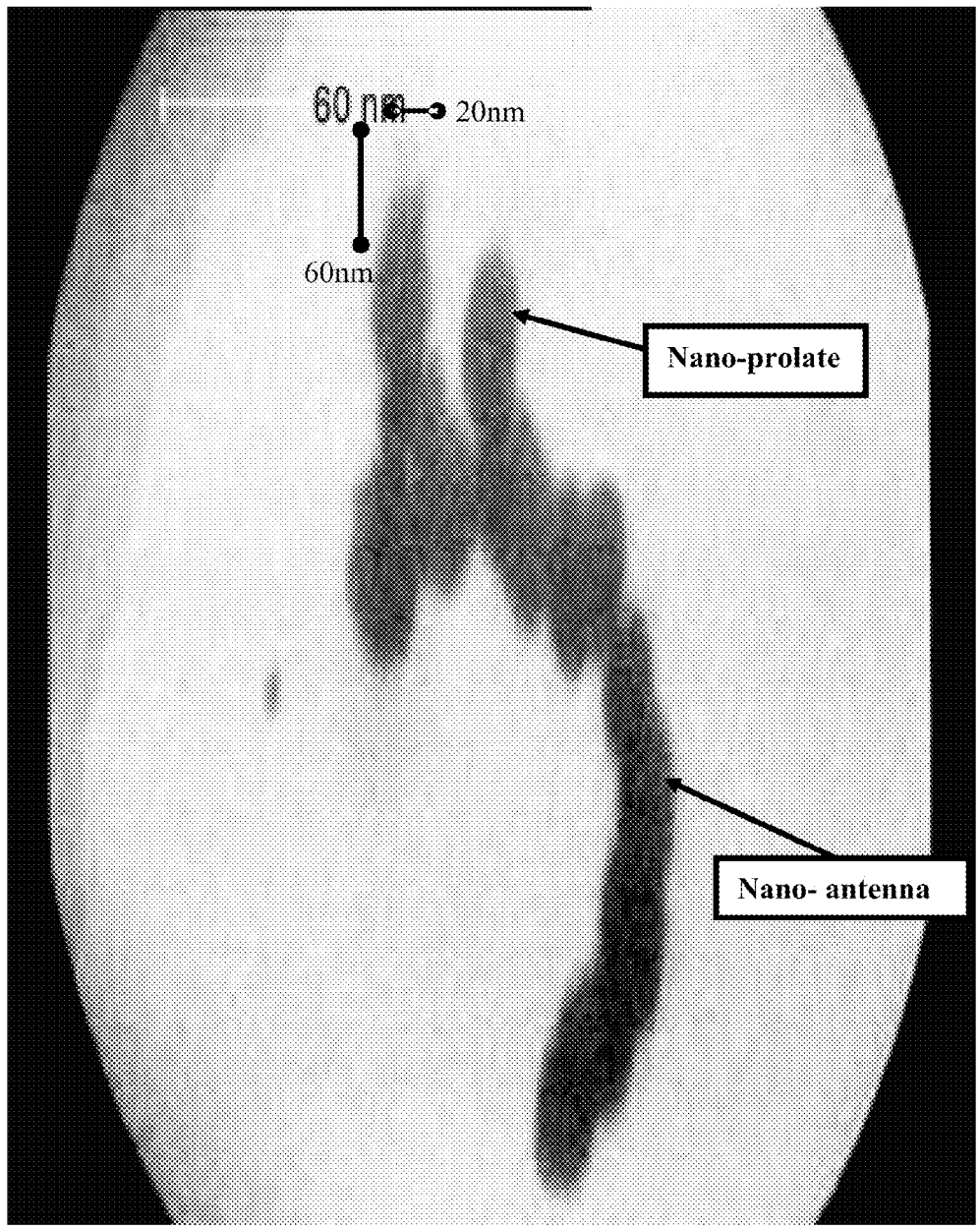
FIG. 32B shows TEM image of the gold nano-antenna and gold nano-prolate spheroid manufactured by palmitic acid.
Figure 32C:
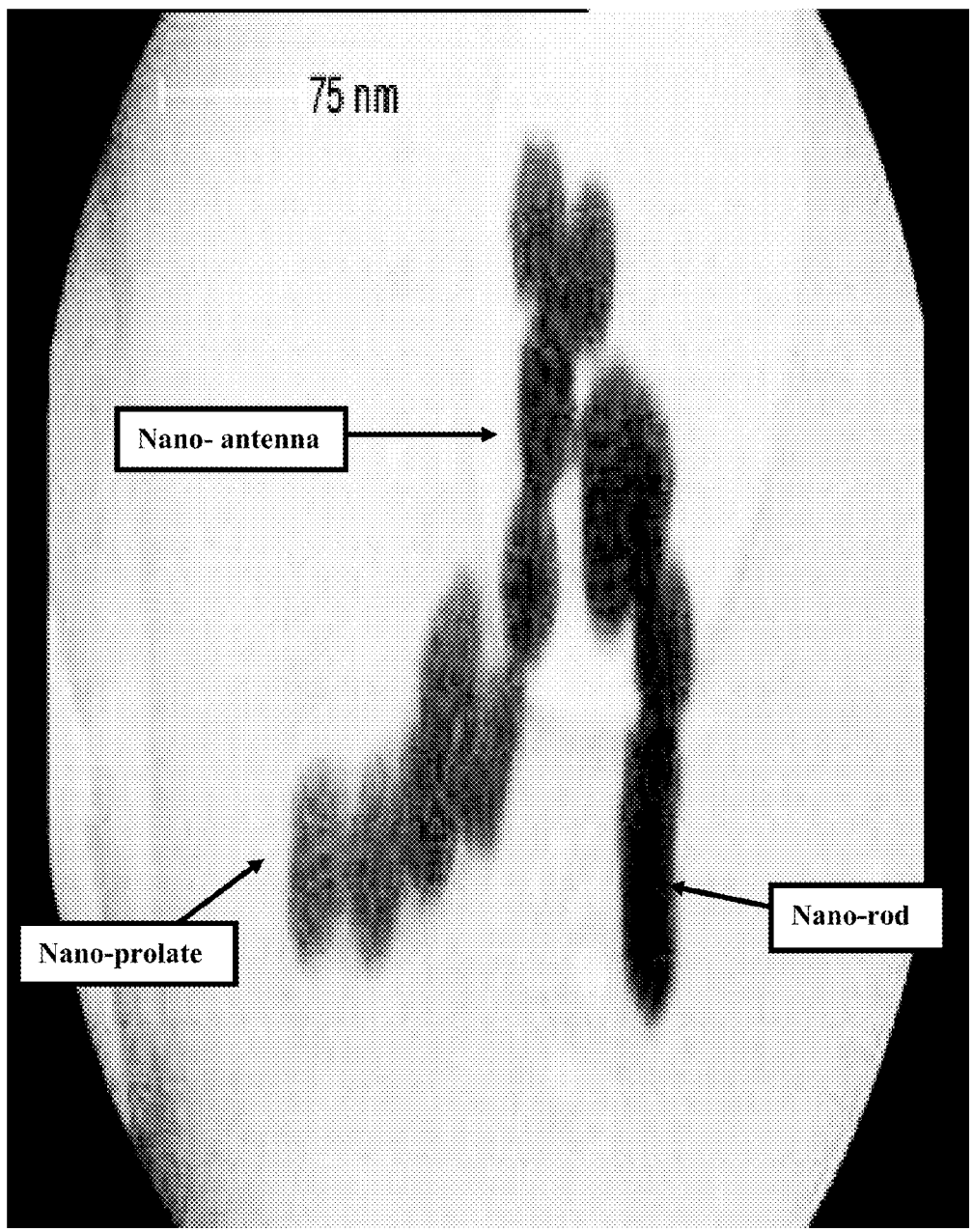
FIG. 32C shows TEM image of the gold nano-antenna, gold nano-rod and gold nano-prolate spheroid manufactured by palmitic acid.
Figure 32D:
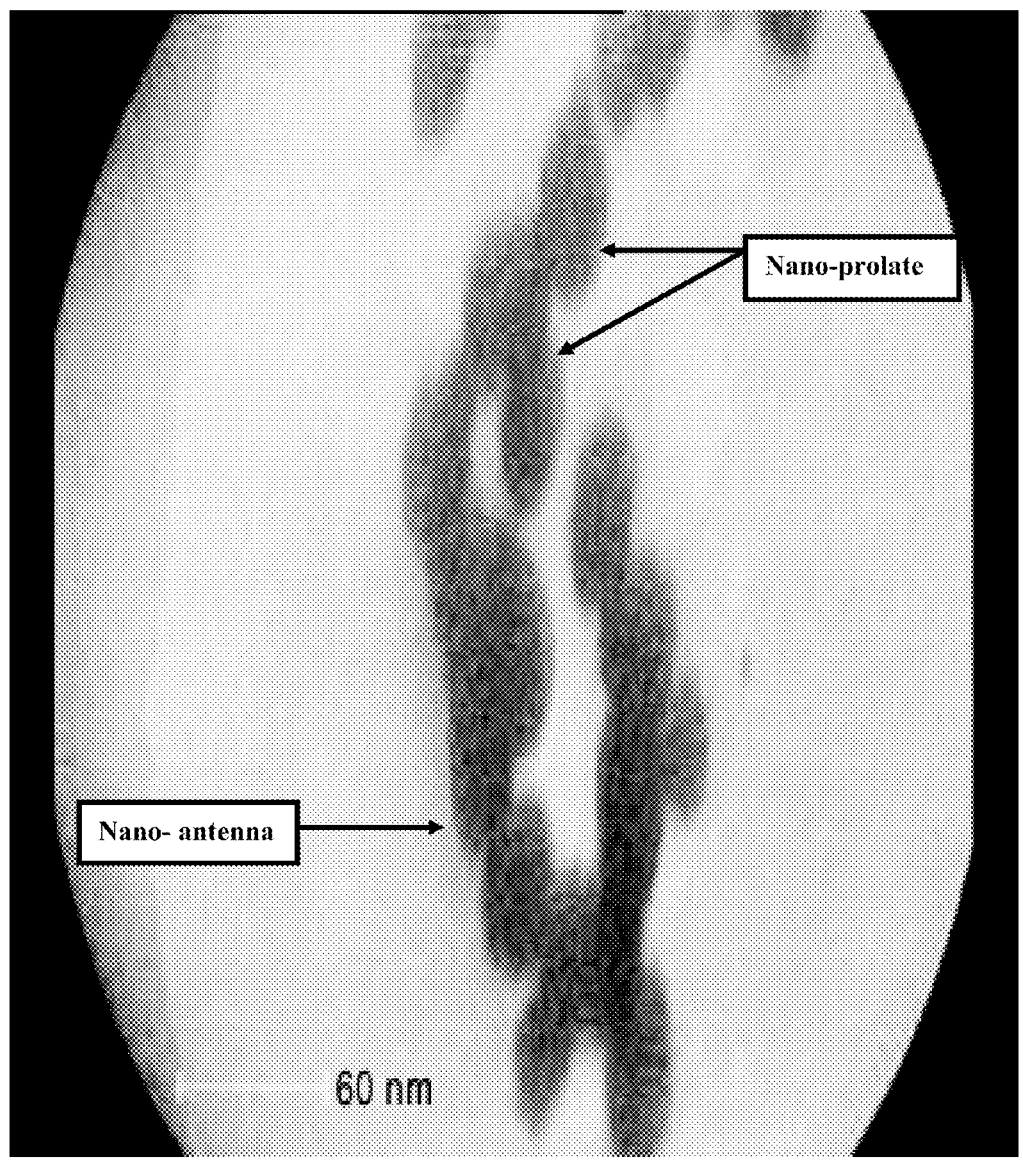
FIG. 32D shows TEM image of the gold nano-antenna and gold nano-prolate spheroid manufactured by palmitic acid.
Figure 32E:
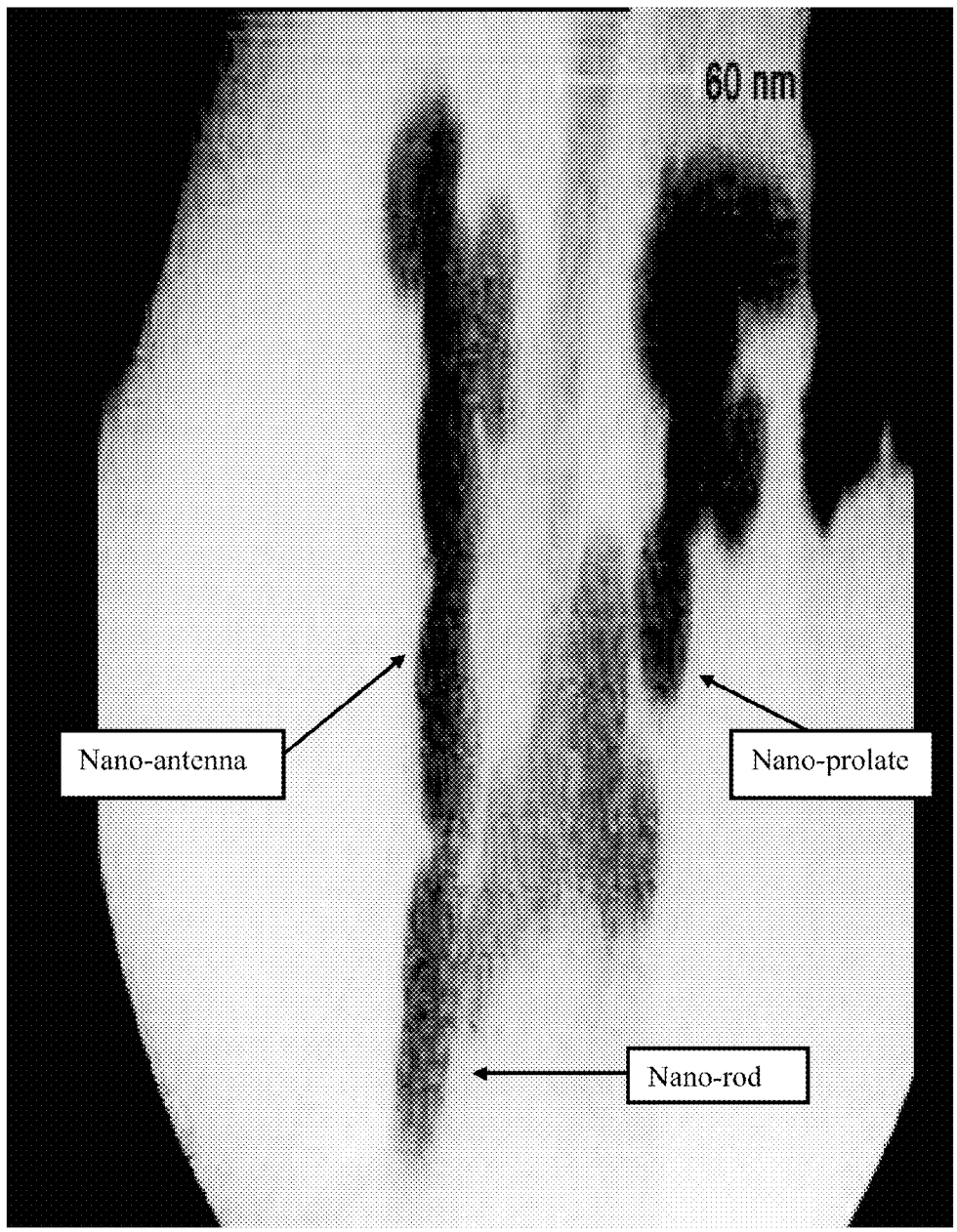
FIG. 32E shows TEM image of the gold nano-antenna, gold nano-rod and gold nano-prolate spheroid manufactured by palmitic acid.

FIG. 32A shows the TEM image of the gold nano-antenna and gold nano-prolate spheroid manufactured by palmitic acid according to example 1-10 stated above. FIG. 32B shows the TEM image of the gold nano-antenna and gold nano-prolate spheroid manufactured by palmitic acid according to example 1-10 stated above. FIG. 32C shows the TEM image of the gold nano-antenna, gold nano-rod and gold nano-prolate spheroid manufactured by palmitic acid according to example 1-10 stated above. FIG. 32D shows the TEM image of the gold nano-antenna and gold nano-prolate spheroid manufactured by palmitic acid according to example 1-10 stated above. FIG. 32E shows the TEM image of the gold nano-antenna, gold nano-rod and gold nano-prolate spheroid manufactured by palmitic acid according to example 1-10 stated above.

Figure 33:
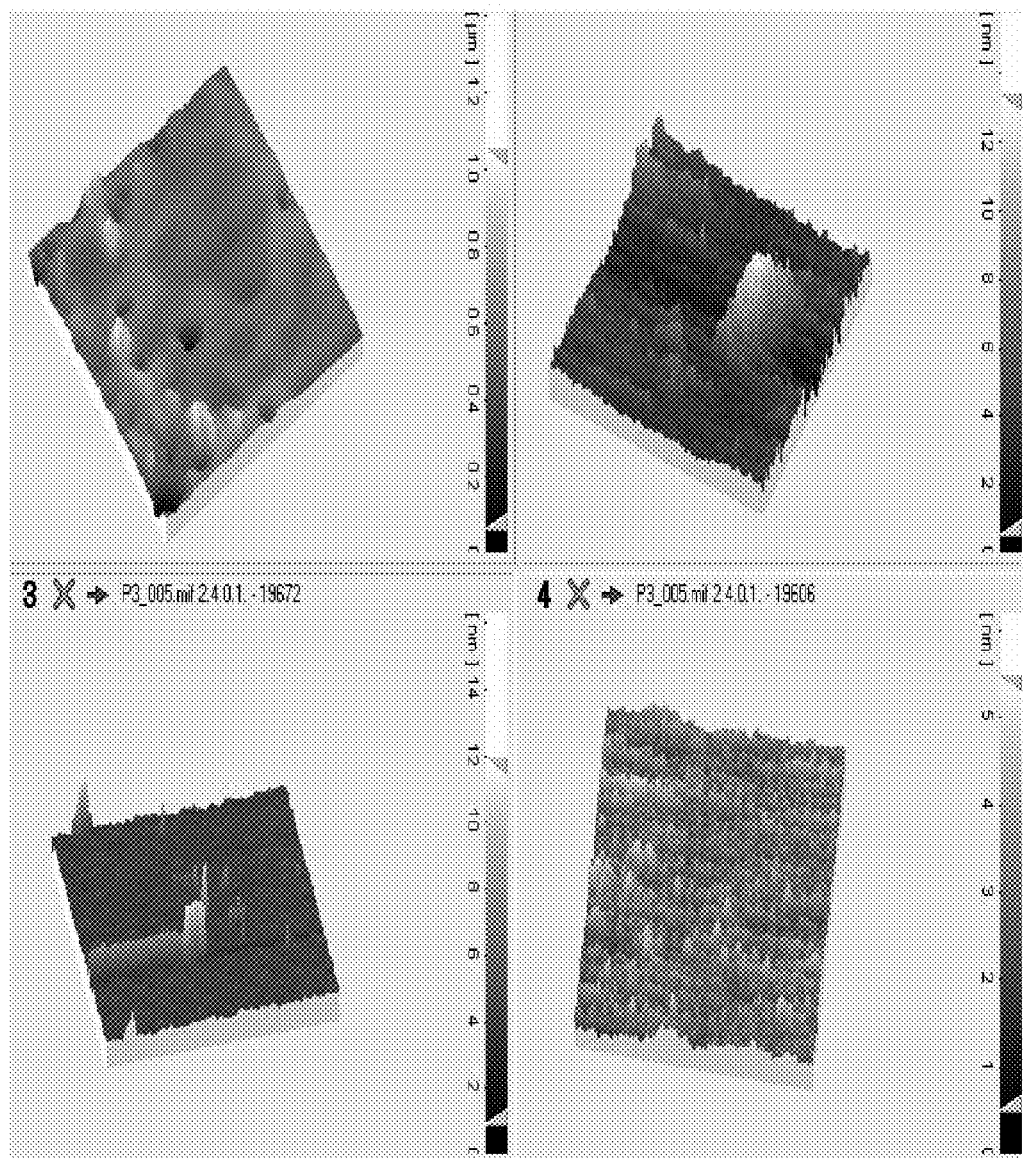
FIG. 33 shows AFM image of the gold nano-antenna, gold nano-rod, gold nano-wire, gold nano-prolate spheroid and gold nano-oblate spheroid manufactured by palmitic acid.

FIG. 33 shows the AFM image of the gold nano-antenna, gold nano-rod, gold nano-wire, gold nano-prolate spheroid and gold nano-oblate spheroid manufactured by palmitic acid according to example 1-10 stated above.

Figure 34:
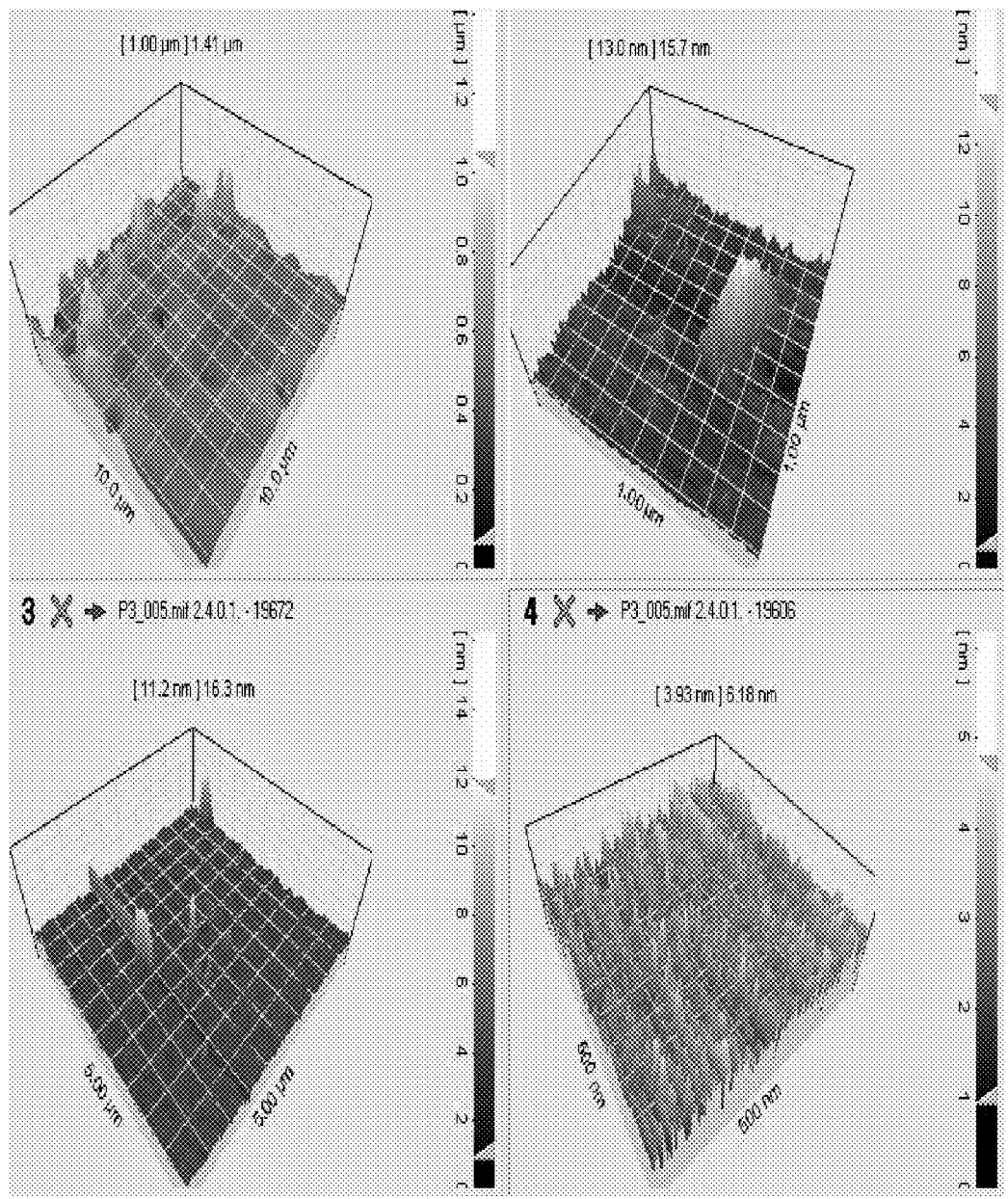
FIG. 34 shows AFM image of the gold nano-antenna, gold nano-rod, gold nano-wire, gold nano-prolate spheroid and gold nano-oblate spheroid manufactured by palmitic acid, in which a, b, c and d show AFM image of the gold nano-antenna, gold nano-rod, gold nano-wire, gold nano-prolate spheroid and gold nano-oblate spheroid manufactured by palmitic acid.

FIG. 34 shows the AFM image of the gold nano-antenna, gold nano-rod, gold nano-wire, gold nano-prolate spheroid and gold nano-oblate spheroid manufactured by palmitic acid according to example 1-10 stated above. With respect to FIG. 34, b shows the AFM image of the nano-prolate spheroid.

Figure 35:
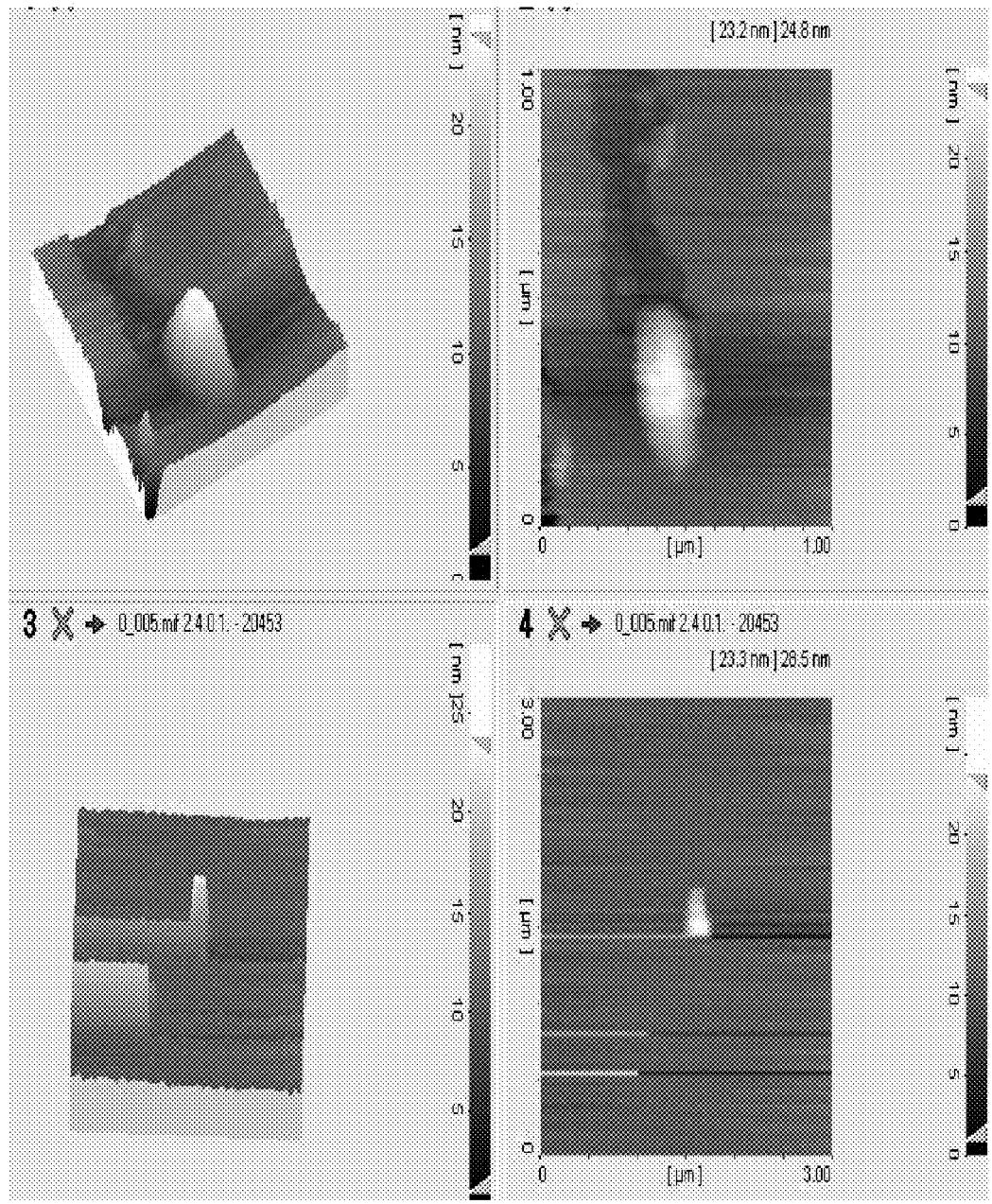
FIG. 35 shows an AFM image of the gold nano-antenna, gold nano-rod, gold nano-wire, gold nano-prolate spheroid and gold nano-oblate spheroid manufactured by palmitic acid.

FIG. 35 shows the AFM image of the gold nano-antenna, gold nano-rod, gold nano-wire, gold nano-prolate spheroid and gold nano-oblate spheroid manufactured by palmitic acid according to example 1-10 stated above.

Figure 36:
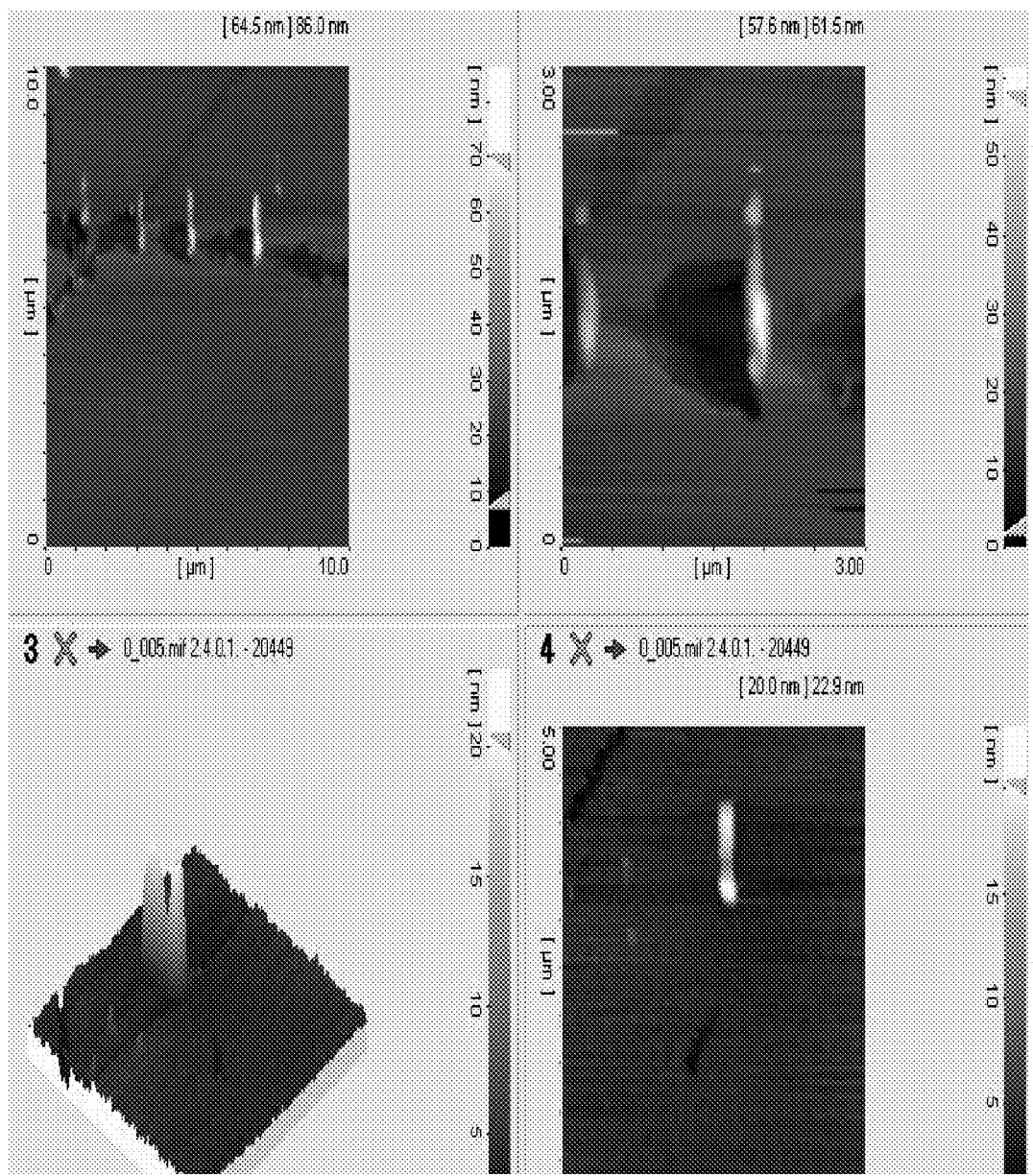
FIG. 36 shows an AFM image of the gold nano-antenna, gold nano-rod, gold nano-wire, gold nano-prolate spheroid and gold nano-oblate spheroid manufactured by palmitic acid, in which a, b, c and d show AFM image of the gold nano-antenna, gold nano-rod, gold nano-wire, gold nano-prolate spheroid and gold nano-oblate spheroid manufactured by palmitic acid.

FIG. 36 shows an AFM image of the gold nano-antenna, gold nano-rod, gold nano-wire, gold nano-prolate spheroid and gold nano-oblate spheroid manufactured by palmitic acid according to example 1-10 stated above. With respect to FIG. 36, b and d shows the AFM images of the gold nano-rods.

Figure 37A:
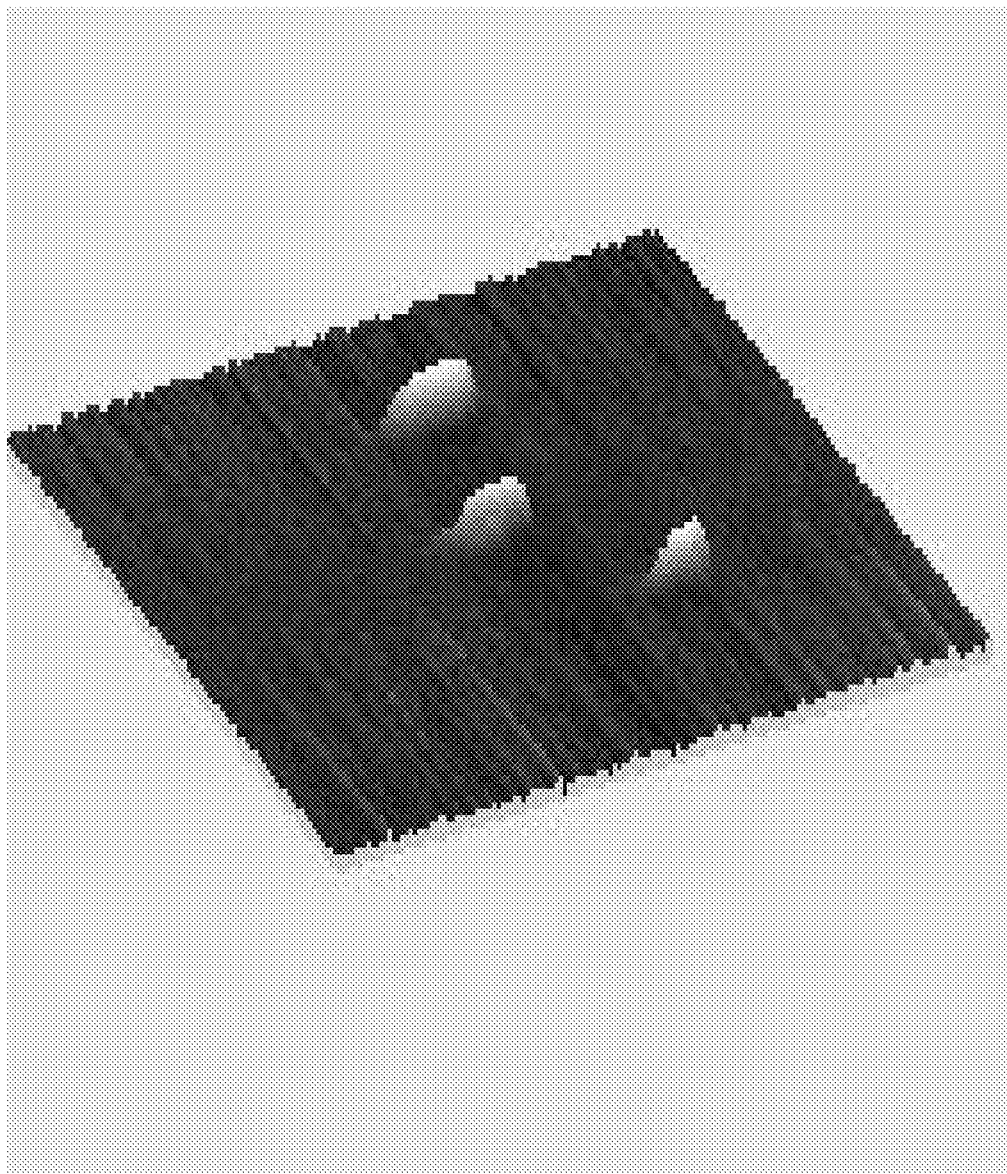
FIG. 37A shows an AFM image of the gold nano-antenna, gold nano-rod, gold nano-wire, gold nano-prolate spheroid and gold nano-oblate spheroid manufactured by palmitic acid.
Figure 37B:
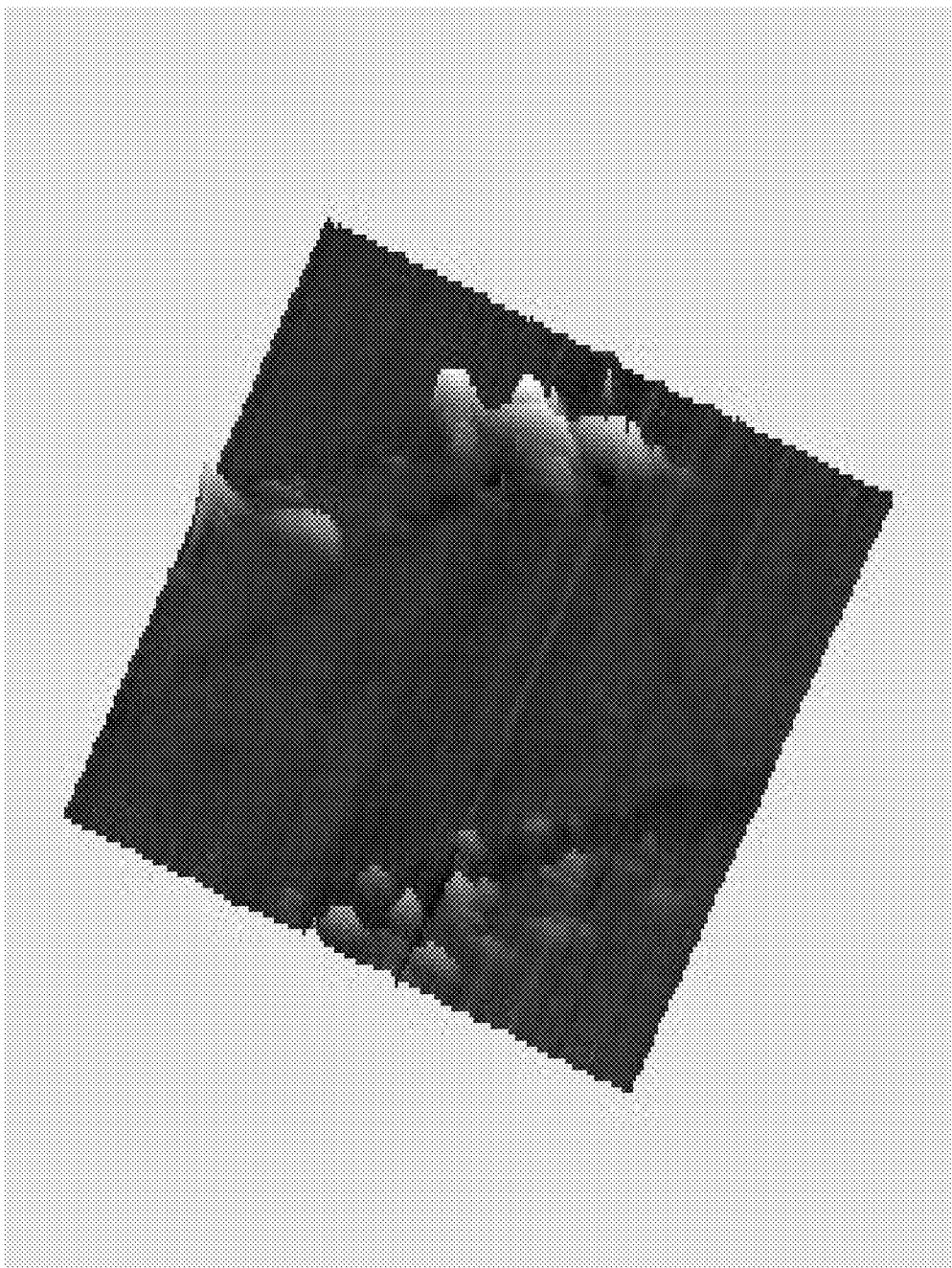
FIG. 37B shows AFM image of the gold nano-antenna, gold nano-rod, gold nano-wire, gold nano-prolate spheroid and gold nano-oblate spheroid manufactured by palmitic acid.
Figure 37C:
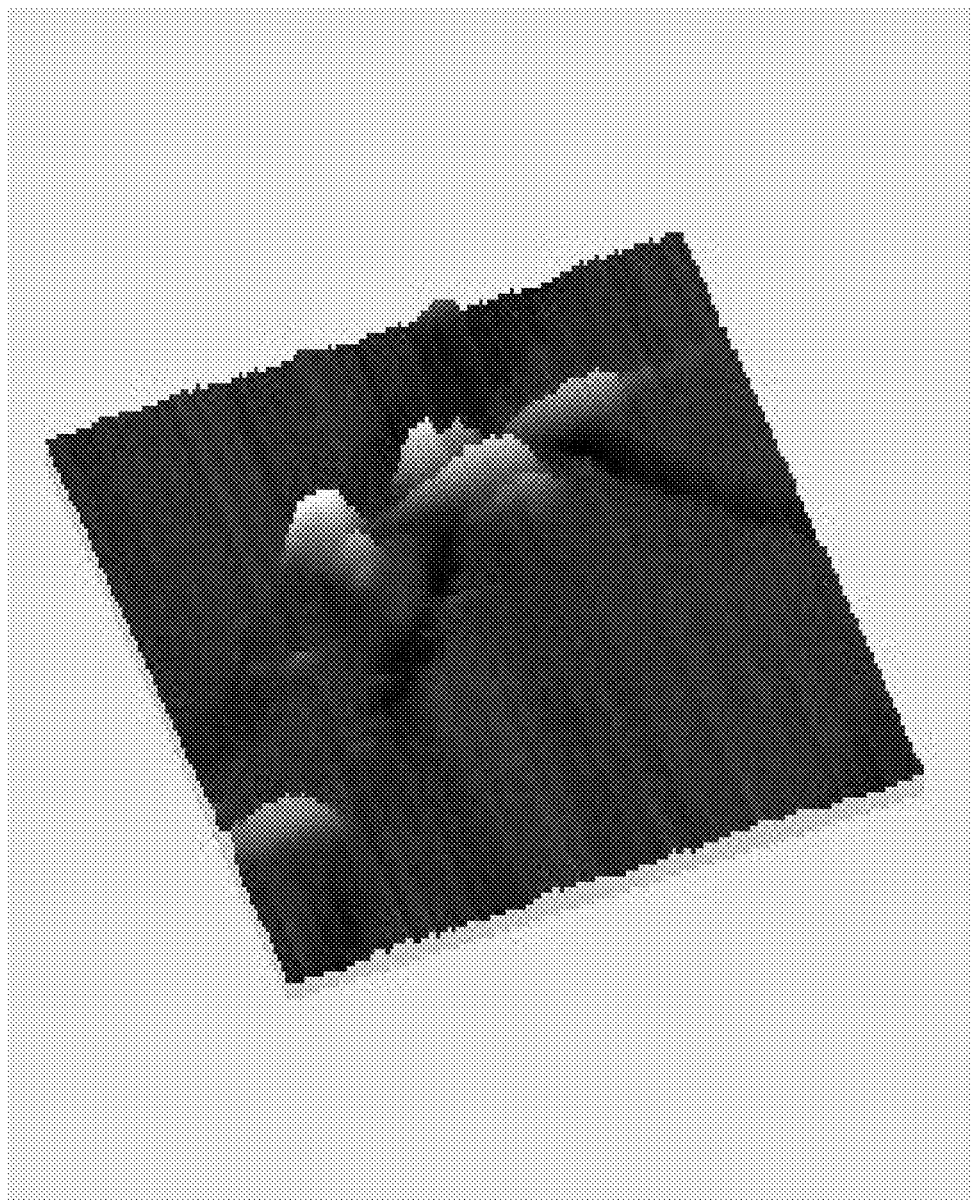
FIG. 37C shows AFM image of the gold nano-antenna, gold nano-rod, gold nano-wire, gold nano-prolate spheroid and gold nano-oblate spheroid manufactured by palmitic acid.
Figure 37D:
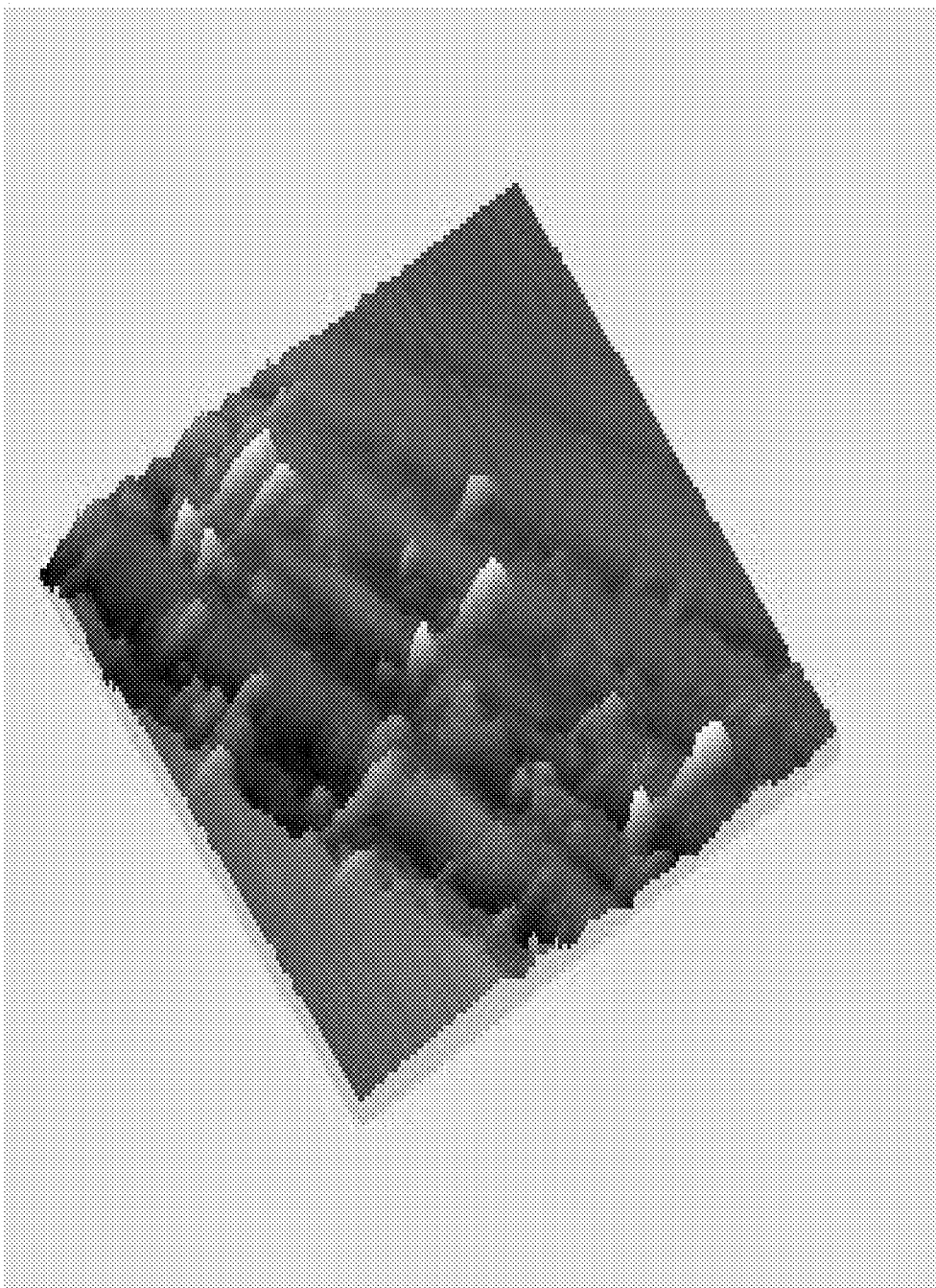
FIG. 37D shows AFM image of the gold nano-antenna, gold nano-rod, gold nano-wire, gold nano-prolate spheroid and gold nano-oblate spheroid manufactured by palmitic acid.

FIG. 37A shows the AFM image of the gold nano-antenna, gold nano-rod, gold nano-wire, gold nano-prolate spheroid and gold nano-oblate spheroid manufactured by palmitic acid according to example 1-10 stated above. FIG. 37B shows the AFM image of the gold nano-antenna, gold nano-rod, gold nano-wire, gold nano-prolate spheroid and gold nano-oblate spheroid manufactured by palmitic acid according to example 1-10 stated above. FIG. 37C shows the AFM image of the gold nano-antenna, gold nano-rod, gold nano-wire, gold nano-prolate spheroid and gold nano-oblate spheroid manufactured by palmitic acid according to example 1-10 stated above. FIG. 37D shows the AFM image of the gold nano-antenna, gold nano-rod, gold nano-wire, gold nano-prolate spheroid and gold nano-oblate spheroid manufactured by palmitic acid according to example 1-10 stated above.

Figure 38:
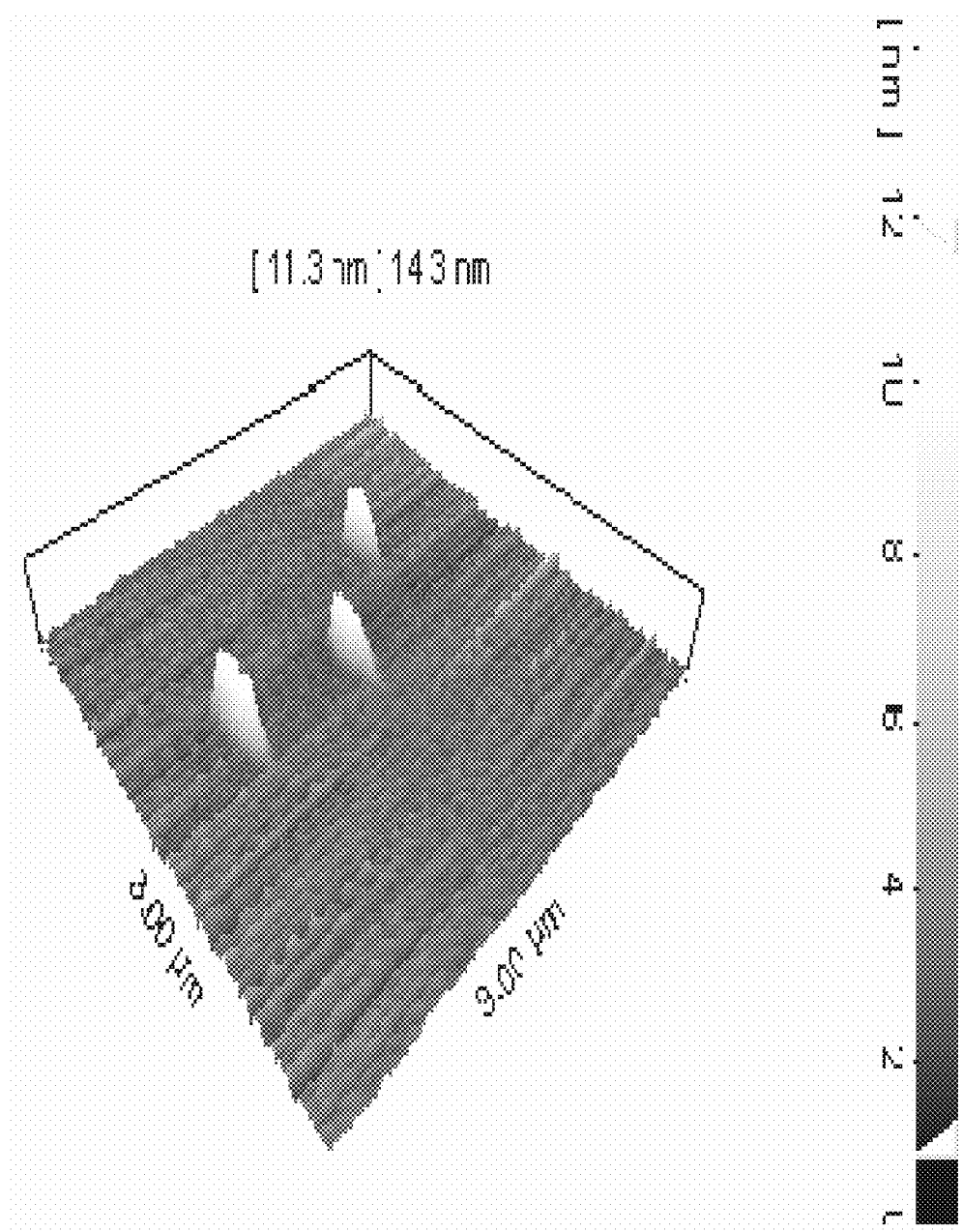
FIG. 38 shows a 3-dimentional AFM image of the gold nano-prolate spheroid manufactured by palmitic acid.

FIG. 38 shows the 3-dimentional AFM image of the gold nano-prolate spheroid manufactured by palmitic acid according to example 1-10 stated above.

Figure 39:
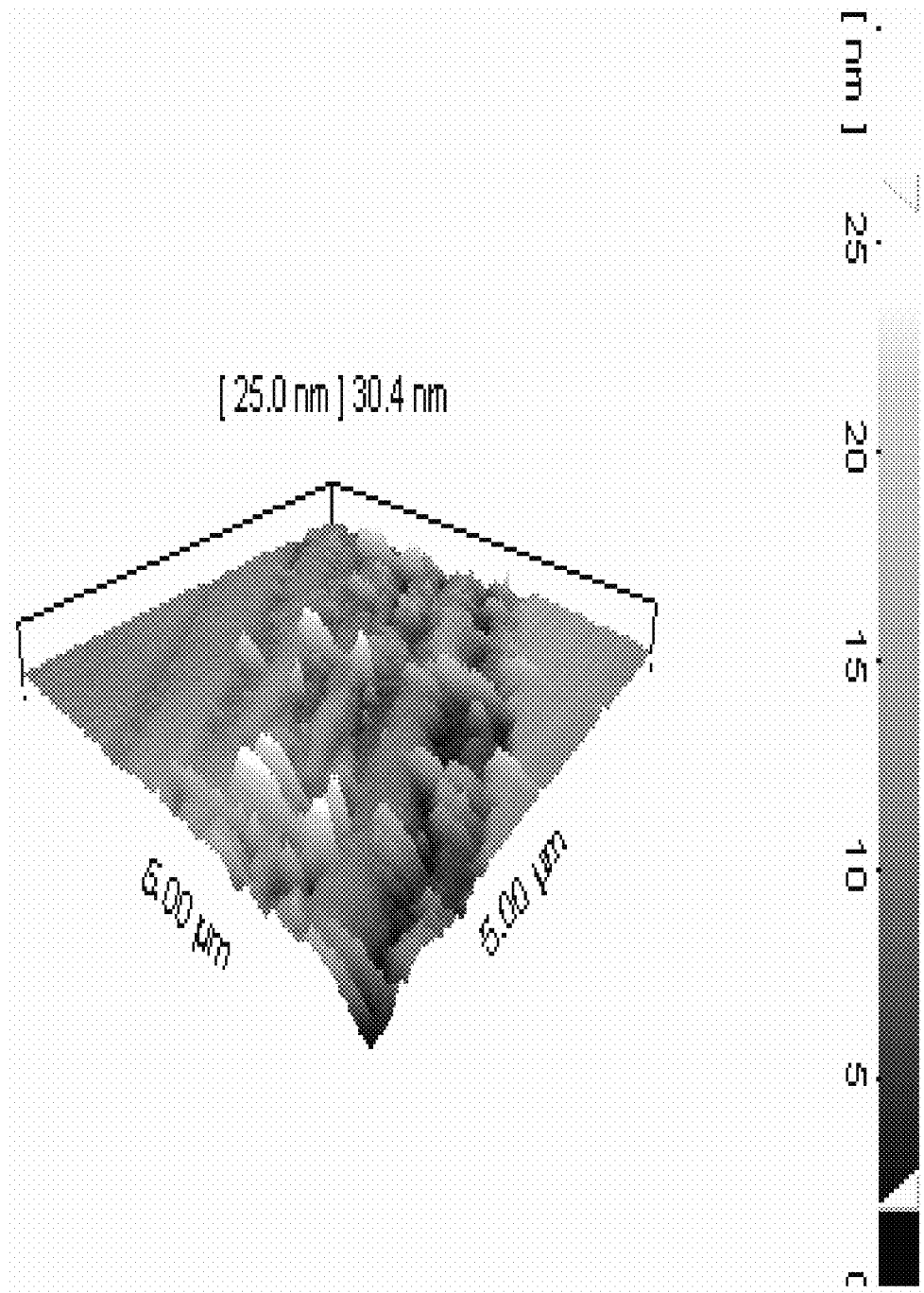
FIG. 39 shows a 3-dimentional AFM image of the gold nano-antenna and gold nano-rod manufactured by palmitic acid.

FIG. 39 shows the 3-dimentional AFM image of the gold nano-antenna and gold nano-rod manufactured by palmitic acid according to example 1-10 stated above.

Figure 40:
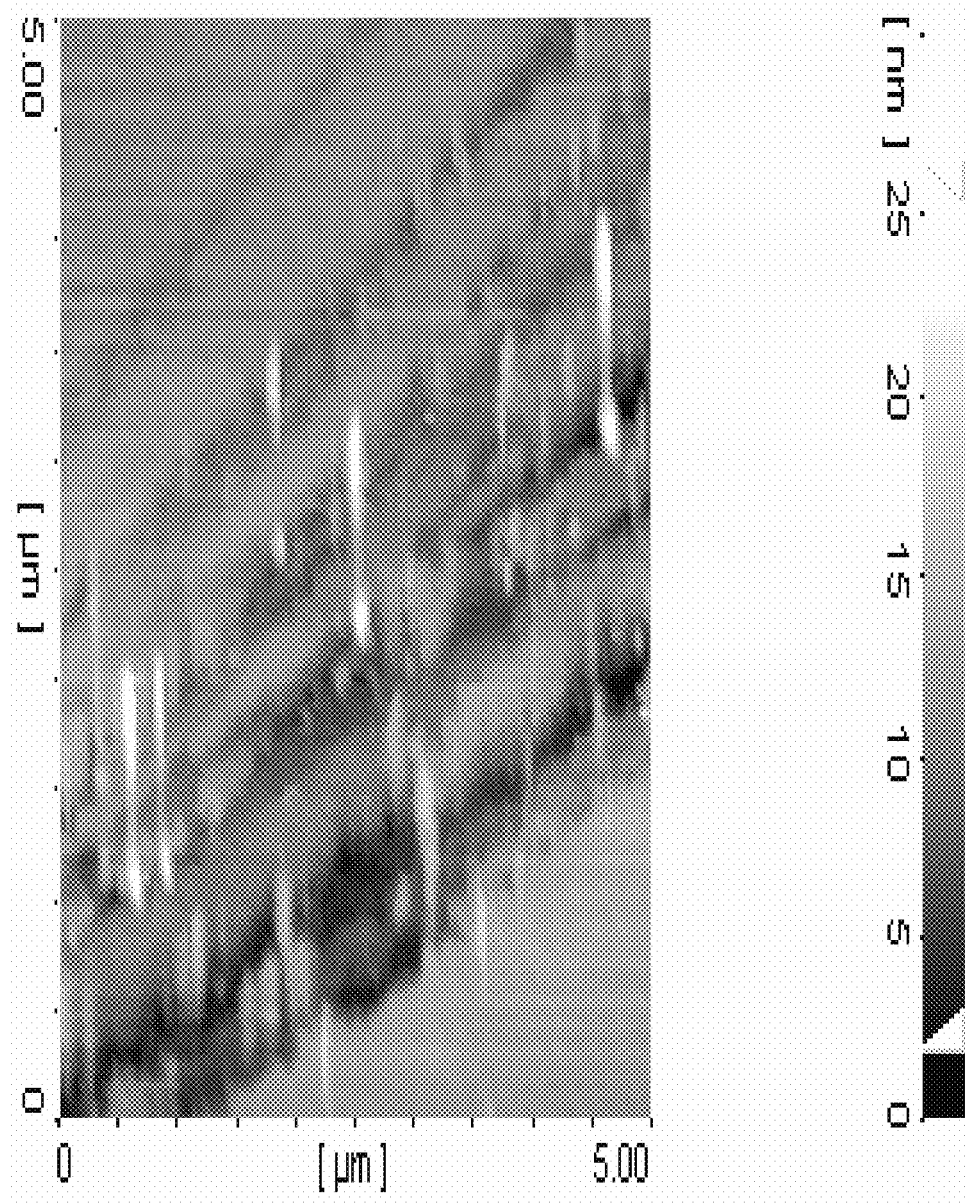
FIG. 40 shows a 2-dimentional AFM image of the gold nano-antenna, gold nano-rod, gold nano-wire, gold nano-prolate spheroid and gold nano-oblate spheroid manufactured by palmitic acid.

FIG. 40 shows the 2-dimentional AFM image of the gold nano-antenna, gold nano-rod, gold nano-wire, gold nano-prolate spheroid and gold nano-oblate spheroid manufactured by palmitic acid according to example 1-10 stated above.

Figure 41:
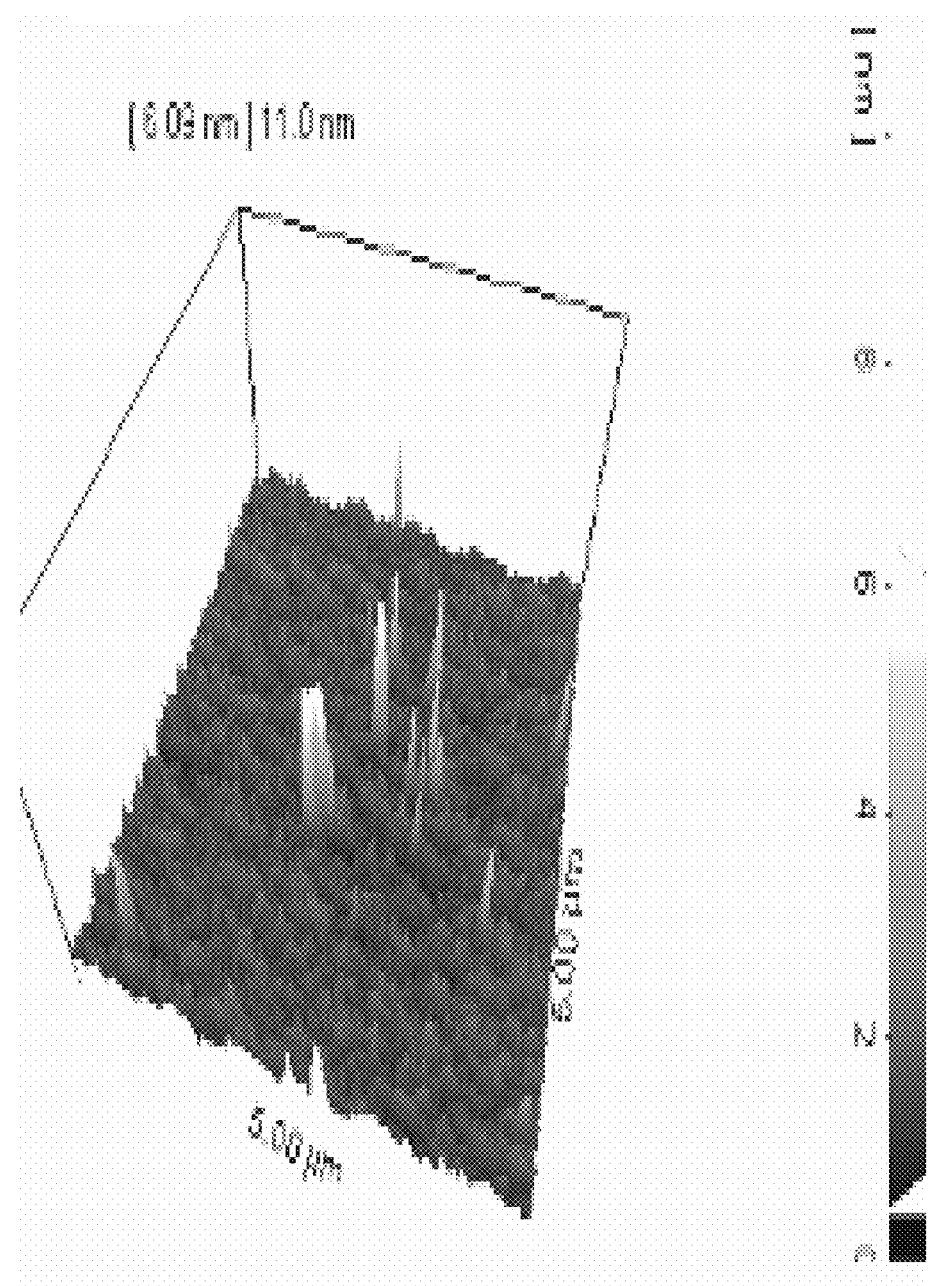
FIG. 41 shows a 3-dimentional AFM image of the gold nano-antenna and gold nano-rod manufactured by palmitic acid.

FIG. 41 shows the 3-dimentional AFM image of the gold nano-antenna and gold nano-rod manufactured by palmitic acid according to example 1-10 stated above.

Figure 42:
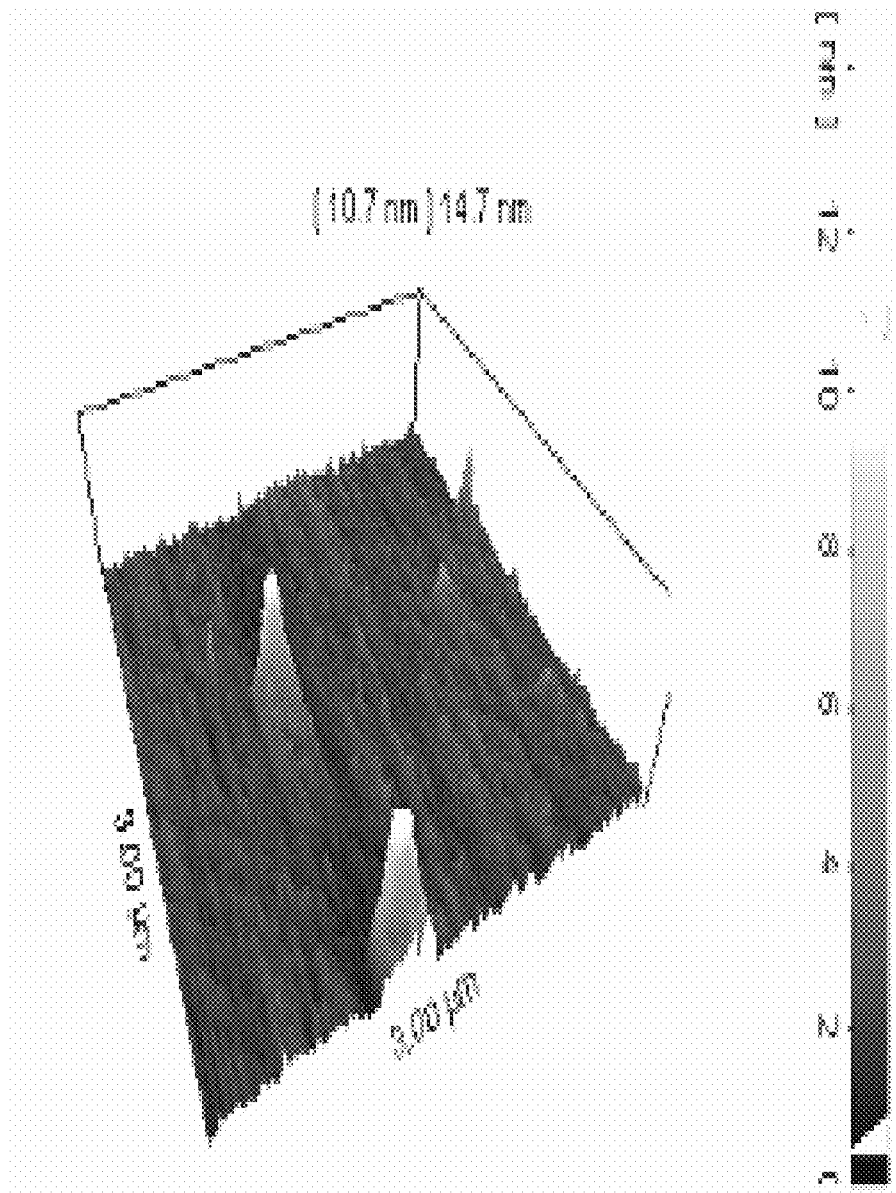
FIG. 42 shows a 3-dimentional AFM image of the gold nano-rod manufactured by palmitic acid.

FIG. 42 shows the 3-dimentional AFM image of the gold nano-rod manufactured by palmitic acid according to example 1-10 stated above.

Figure 43:
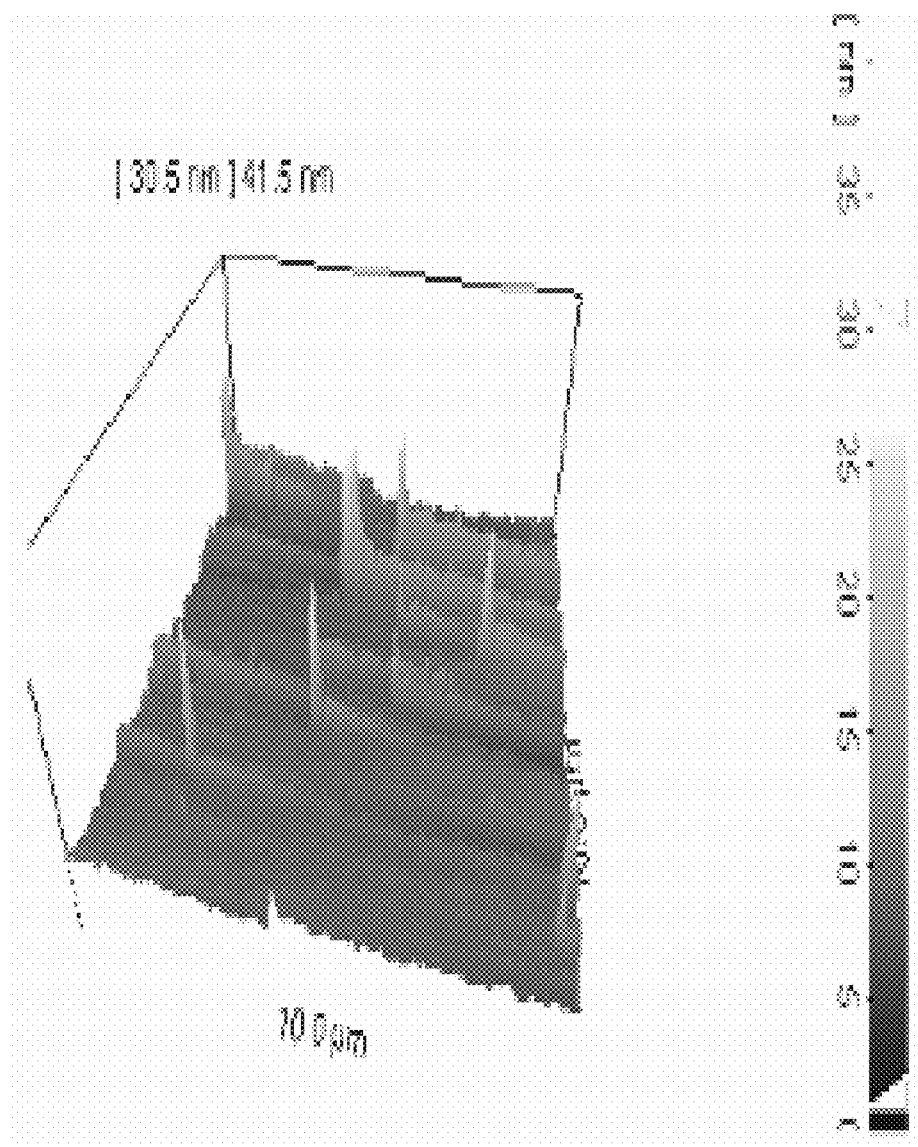
FIG. 43 shows a 3-dimentional AFM image of the gold nano-antenna and gold nano-rod manufactured by palmitic acid.

FIG. 43 shows the 3-dimentional AFM image of the gold nano-antenna and gold nano-rod manufactured by palmitic acid according to example 1-10 stated above.

Figure 44:
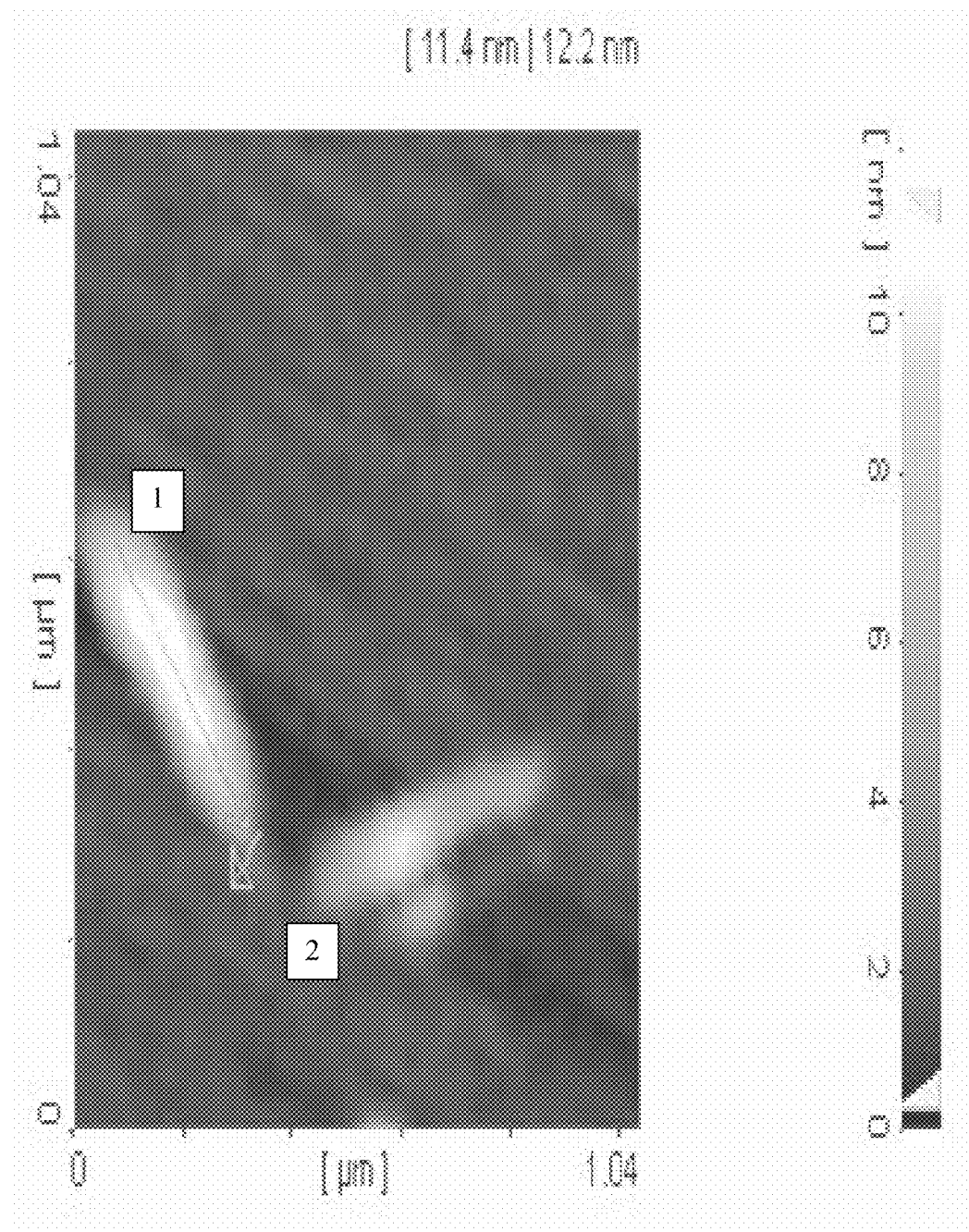
FIG. 44 shows a 2-Dimentional AFM image of the gold nano-rod manufactured by palmitic acid.

FIG. 44 shows the 2-Dimentional AFM image of the gold nano-rod manufactured by palmitic acid according to example 1-10 stated above.

Figure 45:
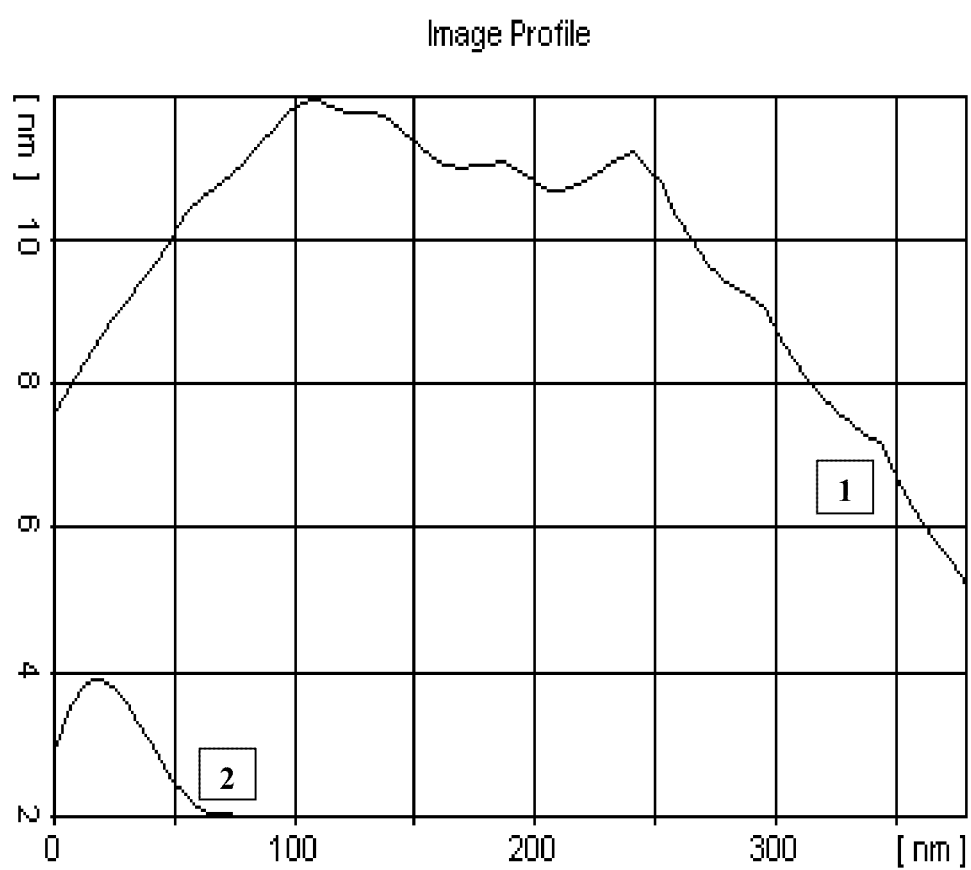
FIG. 45 shows an AFM profile image showing the size distribution of the gold nano-rod manufactured by palmitic acid.

FIG. 45 shows the AFM profile image showing the size distribution of the gold nano-rod manufactured by palmitic acid according to example 1-10 stated above.

Figure 46:
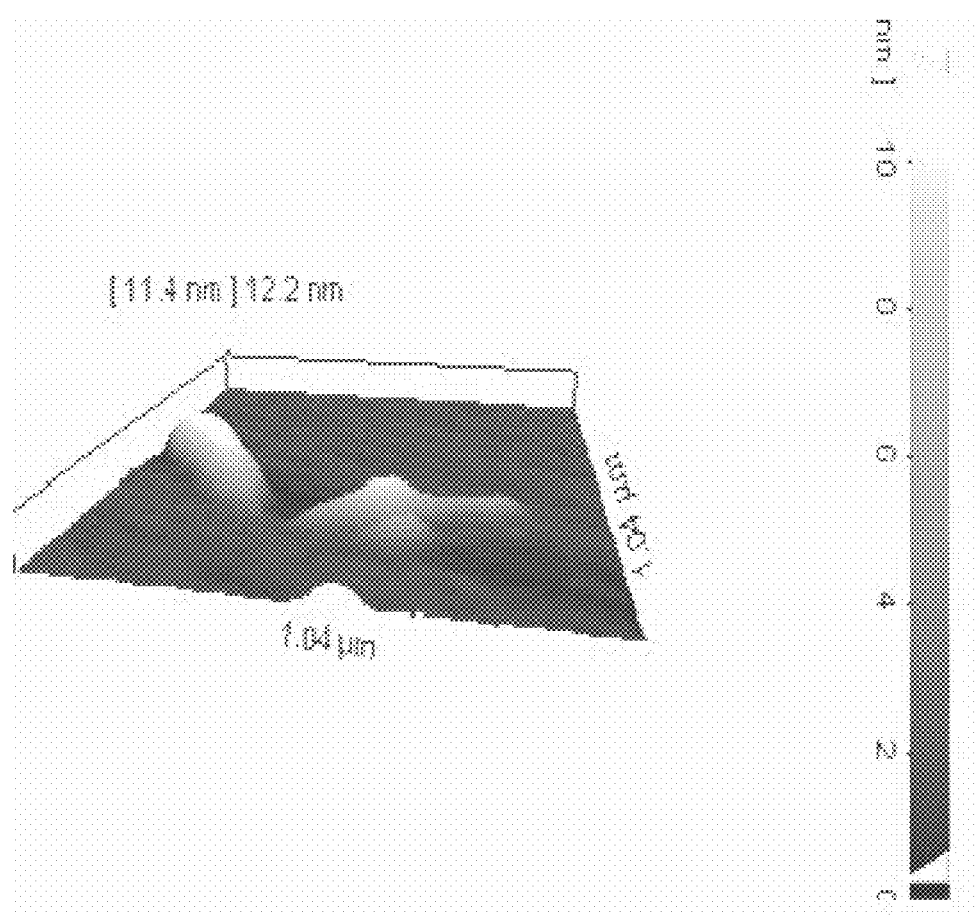
FIG. 46 shows a 3-Dimentional AFM image of the gold nano-rod manufactured by palmitic acid.

FIG. 46 shows the 3-Dimentional AFM image of the gold nano-rod manufactured by palmitic acid according to example 1-10 stated above.

EXAMPLES USING STEARIC ACID

Example#1

1 ml from 1 mM to 5 mM HAuCl$_4$.3H$_2$O and 10 mL to 50 mL stearic acid were dissolved and mixed in 40 mL to 90 mL diethyl ether and heated to 80° C.-110° C. The color of the reaction solution was changed to green color. In a separate flask, 50 mL to 100 mL stearic acid was dissolved in 10 mL to 30 mL diethylether and heated to 70° C.-90° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#2

1 ml from 1 mM to 10 mM HAuCl$_4$.3H$_2$O and 10 mL to 50 mL stearic acid were dissolved and mixed in 50 mL to 100 mL Methanol and heated to 100° C.-150° C. The color of the reaction solution was changed to green color. In a separate flask, 5 mL to 10 mL stearic acid was dissolved in 10 mL to 50 mL Methanol and 10 mL to 50 mL Acetic acid and heated to 80° C.-100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#3

1 ml from 1 mM to 10 mM HAuCl$_4$.3H$_2$O and 30 mL to 80 mL stearic acid were dissolved and mixed in 40 mL to 100 mL Chloroform and heated to 80° C.-100° C. The color of the reaction solution was changed to green color. In a separate flask, 10 mL to 30 mL stearic acid was dissolved in 10 mL to 50 mL Chloroform and heated to 80° C. for 10 min to be used as a reducing solvent. Subsequently, the reducing solvent was injected into the mixture. The mixture was held at 120° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#4

1 ml from 1 mM to 10 mM HAuCl$_4$.3H$_2$O and 10 mL to 50 mL stearic acid were dissolved and mixed in 40 mL to 90 mL Chloroform and heated to 100° C.-180° C. The color of the reaction solution was changed to green color. In a separate flask, 100 mL to 200 mL stearic acid was dissolved in 500 mL to 1000 mL Propylene glycol 300 and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#5

1 ml from 1 mM to 10 mM HAuCl$_4$.3H$_2$O and 10 mL to 50 mL stearic acid were dissolved and mixed in 40 mL to 90 mL Methanol and heated to 80° C.-100° C. The color of the reaction solution was changed to green color. In a separate flask, 100 mL to 200 mL stearic acid was dissolved in 500 mL to 1000 mL Propylene glycol 300 and heated to 150° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#6

1 ml from 1 mM to 10 mM HAuCl$_4$.3H$_2$O and 20 mL to 50 mL stearic acid were dissolved and mixed in 40 mL to 90 mL Methanol and heated to 110° C. The color of the reaction solution was changed to green color. In a separate flask, 50 mL to 100 mL stearic acid was dissolved in 500 mL to 1000 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#7

1 ml from 1 mM to 10 mM $HAuCl_4.3H_2O$ and 10 mL to 30 mL stearic acid were dissolved and mixed in 40 mL to 90 mL diethyl ether and heated to 100° C. The color of the reaction solution was changed to green color. In a separate flask, 50 mL stearic acid was dissolved in 100 mL to 500 mL Ethylene Glycol 600 and heated to 120° C. for 10 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#8

1 ml from 1 mM to 10 mM $HAuCl_4.3H_2O$ and 20 mL to 50 mL stearic acid were dissolved and mixed in 40 mL to 80 mL diethylether and heated to 100° C. The color of the reaction solution was changed to green color. In a separate flask, 50 mL to 100 mL stearic acid was dissolved in 100 mL to 500 mL polyethylene Glycol 2000 and heated to 120° C. for 30 min to be used as a reducing solvent. Subsequently, the reducing solvent was injected into the mixture. The mixture was held at 180° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#9

1 mL from 1 mM to 10 mM $HAuCl_4.3H_2O$ and 20 mL to 50 mL stearic acid were dissolved and mixed in 40 mL to 80 mL diethylether and heated to 100° C. The color of the reaction solution was changed to green color. In a separate flask, 50 mL to 80 mL stearic acid was dissolved in 50 mL to 100 mL Propylene glycol 300 and 10 mL to 50 mL Acetic acid and heated to 80° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Example#10

1 ml from 1 mM to 10 mM $HAuCl_4.3H_2O$ and 10 mL to 30 mL stearic acid were dissolved and mixed in 40 mL to 80 mL Chloroform and heated to 80° C. The color of the reaction solution was changed to green color. In a separate flask, 40 mL to 80 mL stearic acid was dissolved in 50 mL to 100 mL Polyethylene glycol 1000 and 1 mL to 10 mL Ascorbic acid and heated to 100° C. for 10 min to be used as a reducing solvent. Subsequently, the reducing solvent was injected into the mixture. The mixture was held at 150° C. for 30 min until the reduction was complete (visually, the color of the solution was changed to brown). After the reaction, the solution containing gold nanoparticles was cooled to room temperature. Ethanol was then added to precipitate gold nanoparticles. After washing several times with ethanol, the precipitated gold nanoparticles were collected for analysis. After 2 hours of the reaction, re-precipitation was performed using a polar solvent a mixture of acetone and methanol. (The reaction temperature of the mixture in the heat-reacting is 50 to 300° C.).

Figure 47:
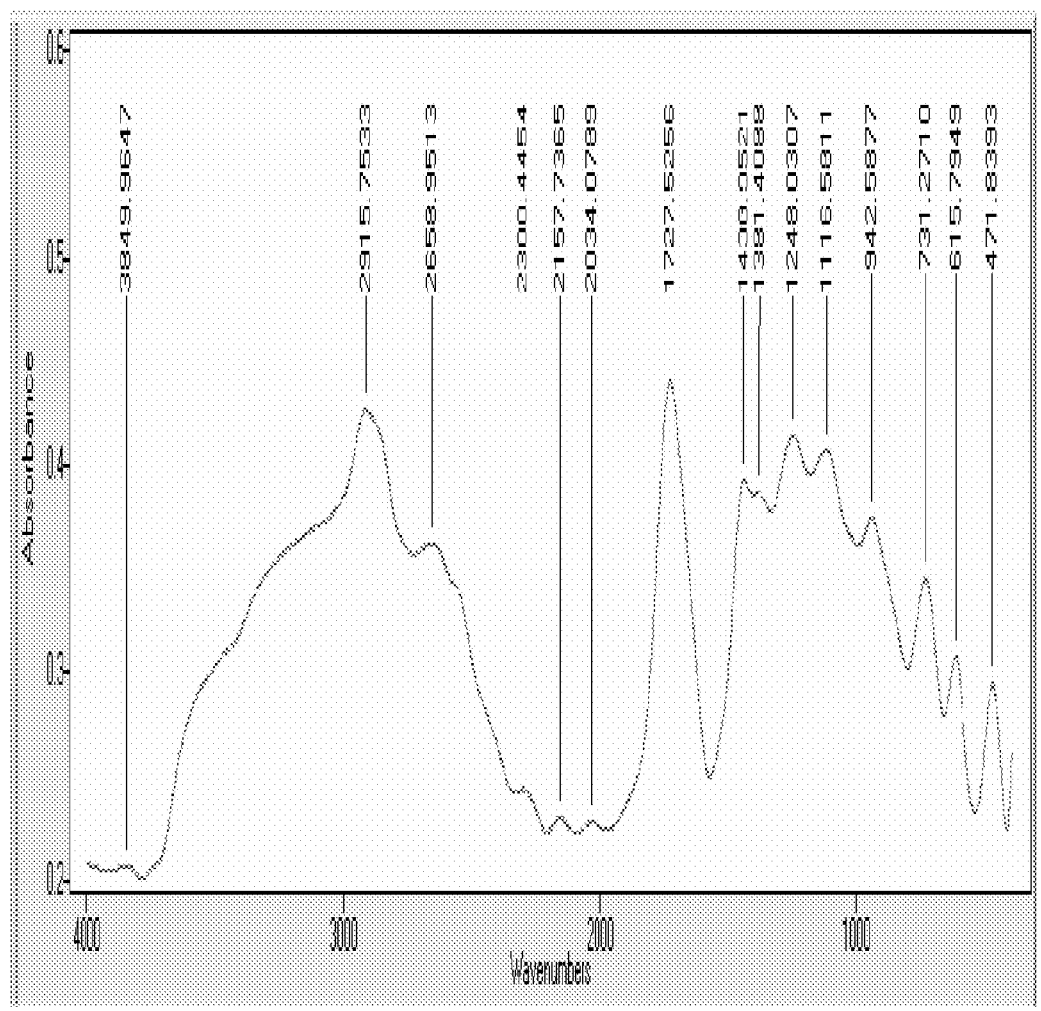
FIG. 47 shows an absorbance of FTIR spectra of the gold nano-antennas, gold nano-rods, gold nano-wires, gold nano-prolate spheroids and gold nano-oblate spheroids manufactured by stearic acid.

FIG. 47 shows the absorbance of FTIR spectra of the gold nano-antennas, gold nano-rods, gold nano-wires, gold nano-prolate spheroids and gold nano-oblate spheroids manufactured by stearic acid according to example 1-10 stated above.

Figure 48:
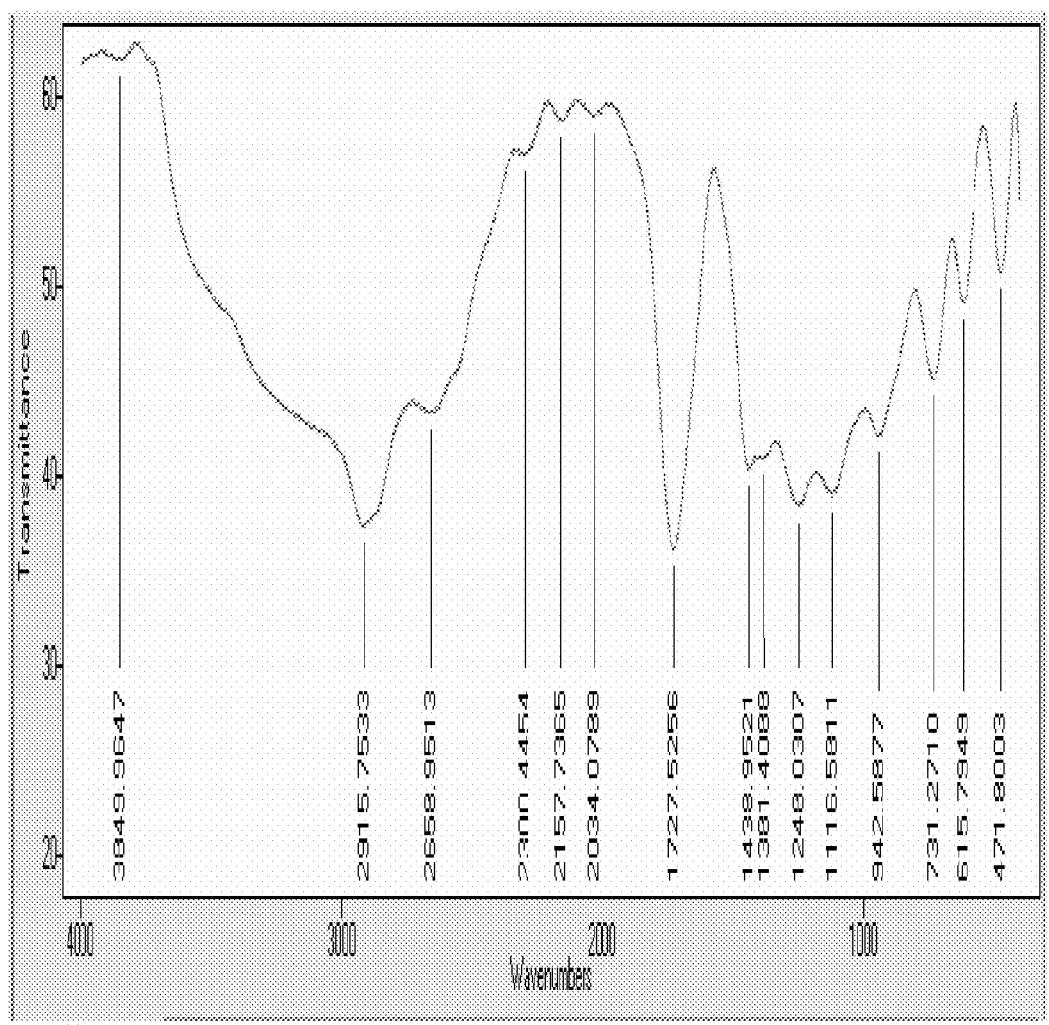
FIG. 48 shows a transmittance of FTIR spectra of the gold nano-antennas, gold nano-rods, gold nano-wires, gold nano-prolate spheroids and gold nano-oblate spheroids manufactured by stearic acid.

FIG. 48 shows the transmittance of FTIR spectra of the gold nano-antennas, gold nano-rods, gold nano-wires, gold nano-prolate spheroids and gold nano-oblate spheroids manufactured by stearic acid according to example 1-10 stated above.

Figure 49:
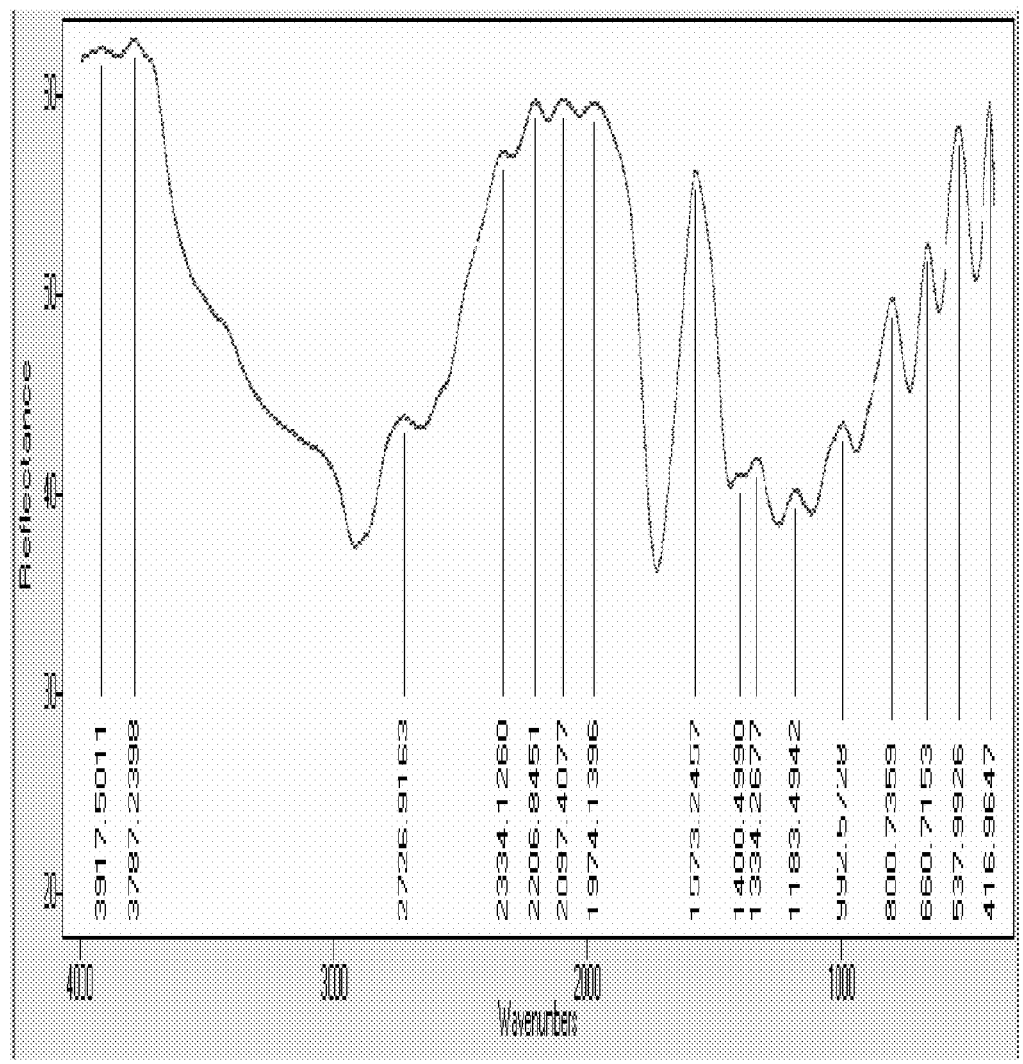
FIG. 49 shows a reflectance of FTIR spectra of the gold nano-antennas, gold nano-rods, gold nano-wires, gold nano-prolate spheroids and gold nano-oblate spheroids manufactured by stearic acid.

FIG. 49 shows the reflectance of FTIR spectra of the gold nano-antennas, gold nano-rods, gold nano-wires, gold nano-prolate spheroids and gold nano-oblate spheroids manufactured by stearic acid according to example 1-10 stated above.

Figure 50:
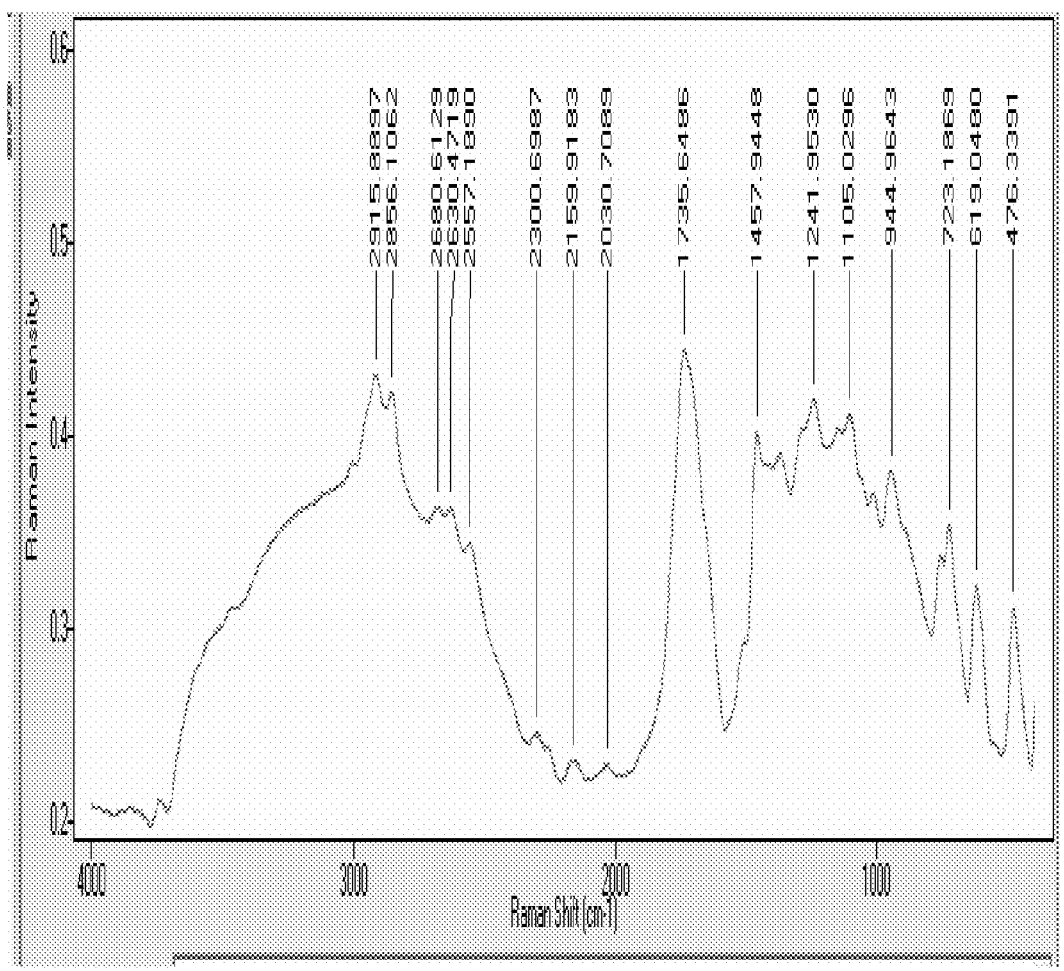
FIG. 50 shows Raman Intensity of FTIR spectra of the gold nano-antennas, gold nano-rods, gold nano-wires, gold nano-prolate spheroids and gold nano-oblate spheroids manufactured by stearic acid.

FIG. 50 shows the Raman Intensity of FTIR spectra of the gold nano-antennas, gold nano-rods, gold nano-wires, gold nano-prolate spheroids and gold nano-oblate spheroids manufactured by stearic acid according to example 1-10 stated above.

Figure 51:
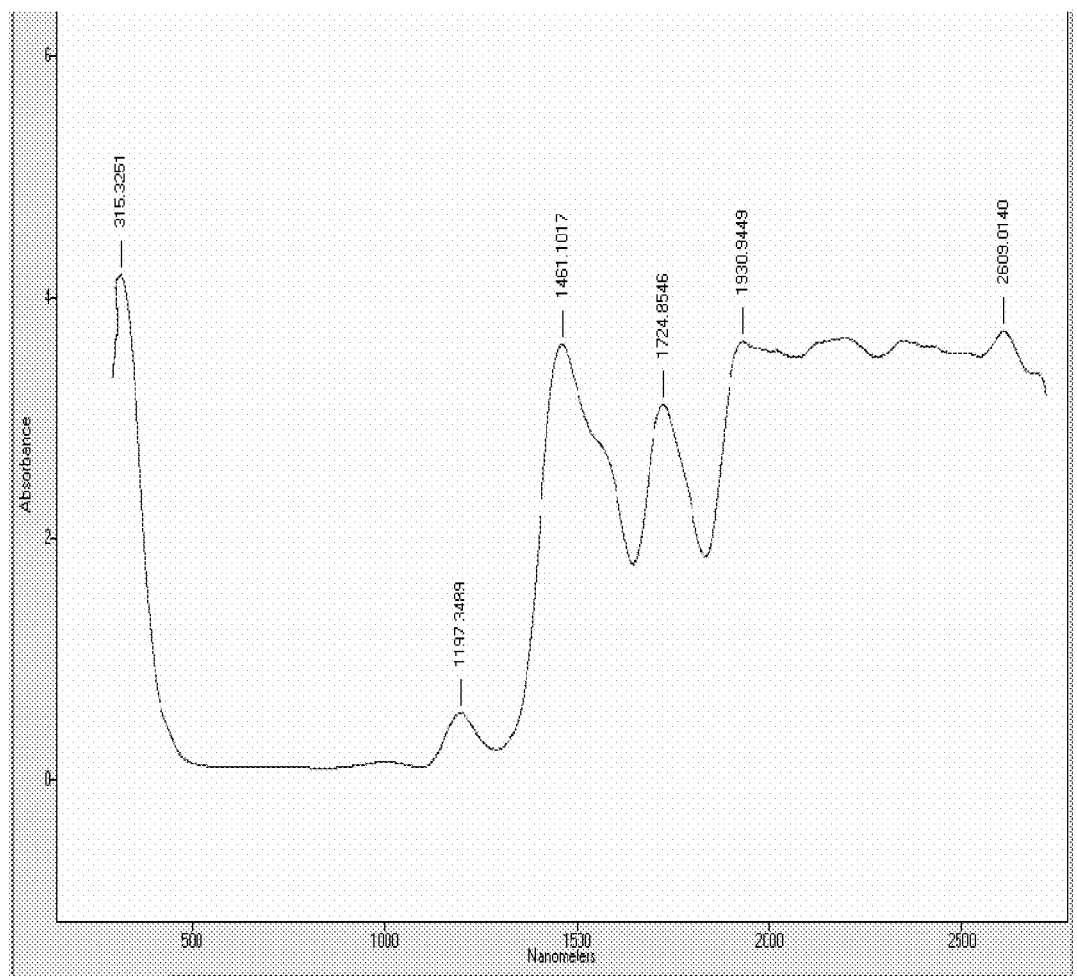
FIG. 51 shows an absorbance of UV-NIR spectra of the gold nano-antennas, gold nano-rods, gold nano-wires, gold nano-prolate spheroids and gold nano-oblate spheroids manufactured by stearic acid.

FIG. 51 shows the absorbance of UV-NIR spectra of the gold nano-antennas, gold nano-rods, gold nano-wires, gold nano-prolate spheroids and gold nano-oblate spheroids manufactured by stearic acid according to example 1-10 stated above.

Figure 52A:
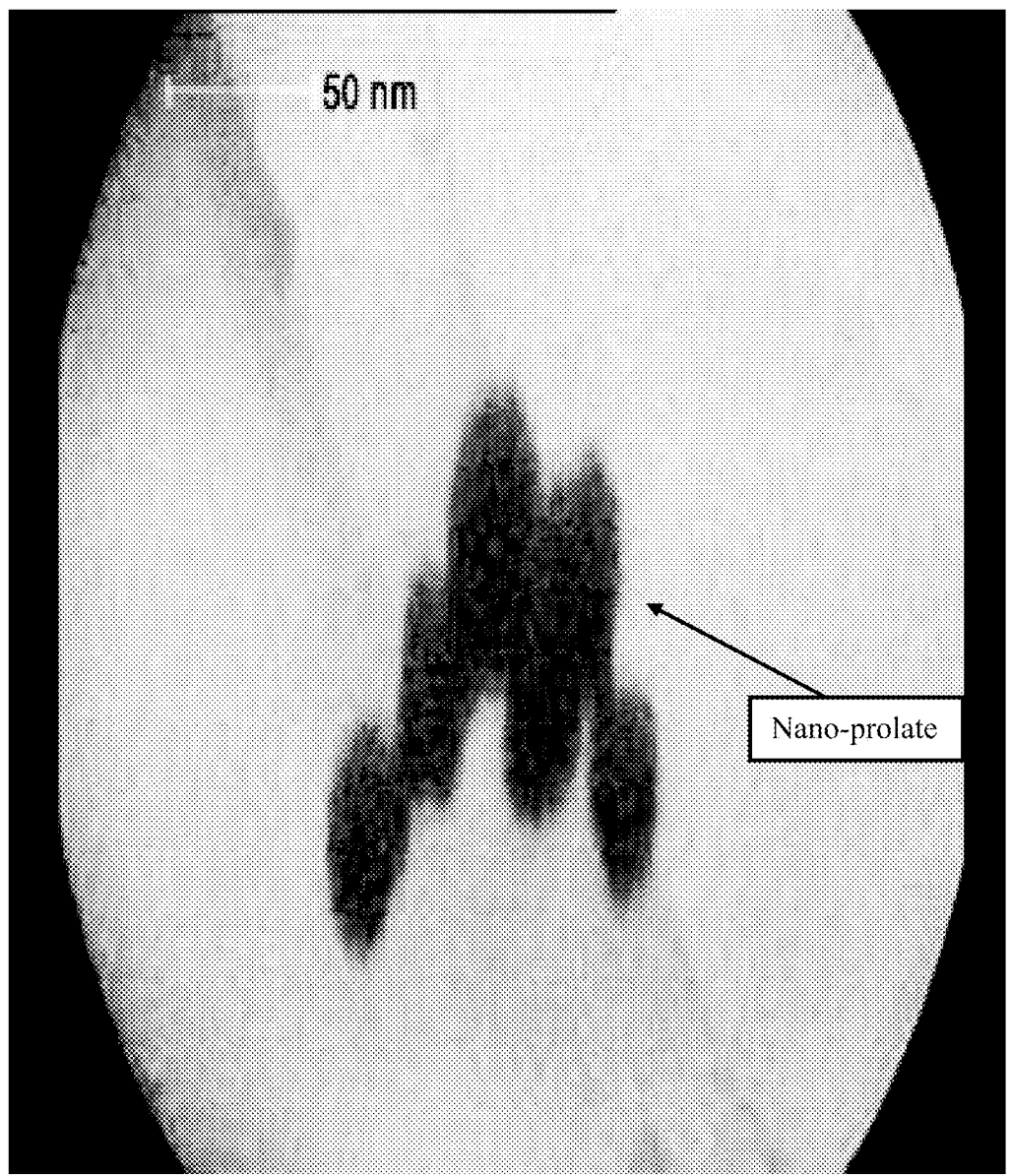
FIG. 52A shows a TEM image of the gold nano-prolate spheroid manufactured by stearic acid.
Figure 52B:
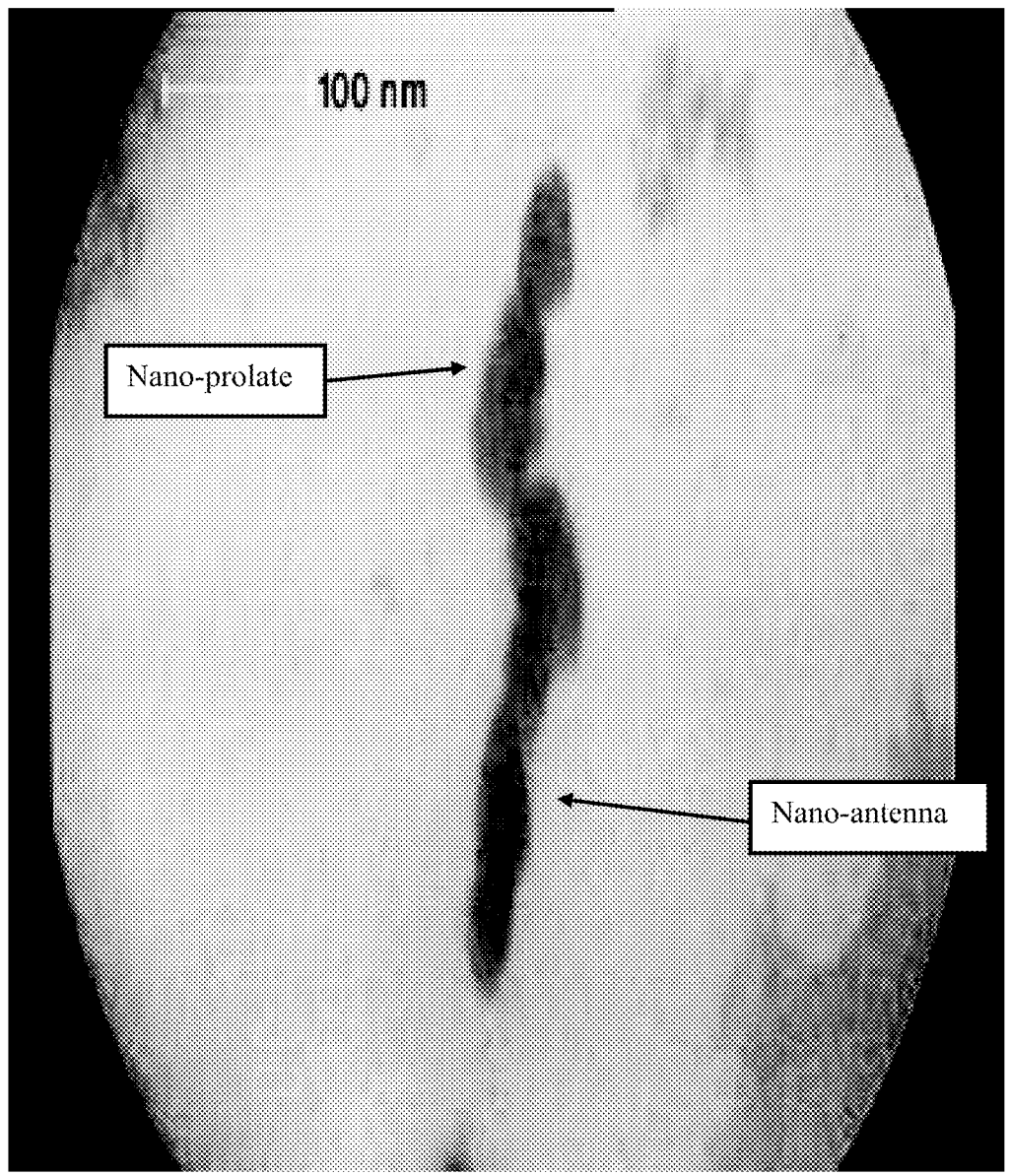
FIG. 52B shows a TEM image of the gold nano-antenna and gold nano-prolate spheroid manufactured by stearic acid.
Figure 52C:
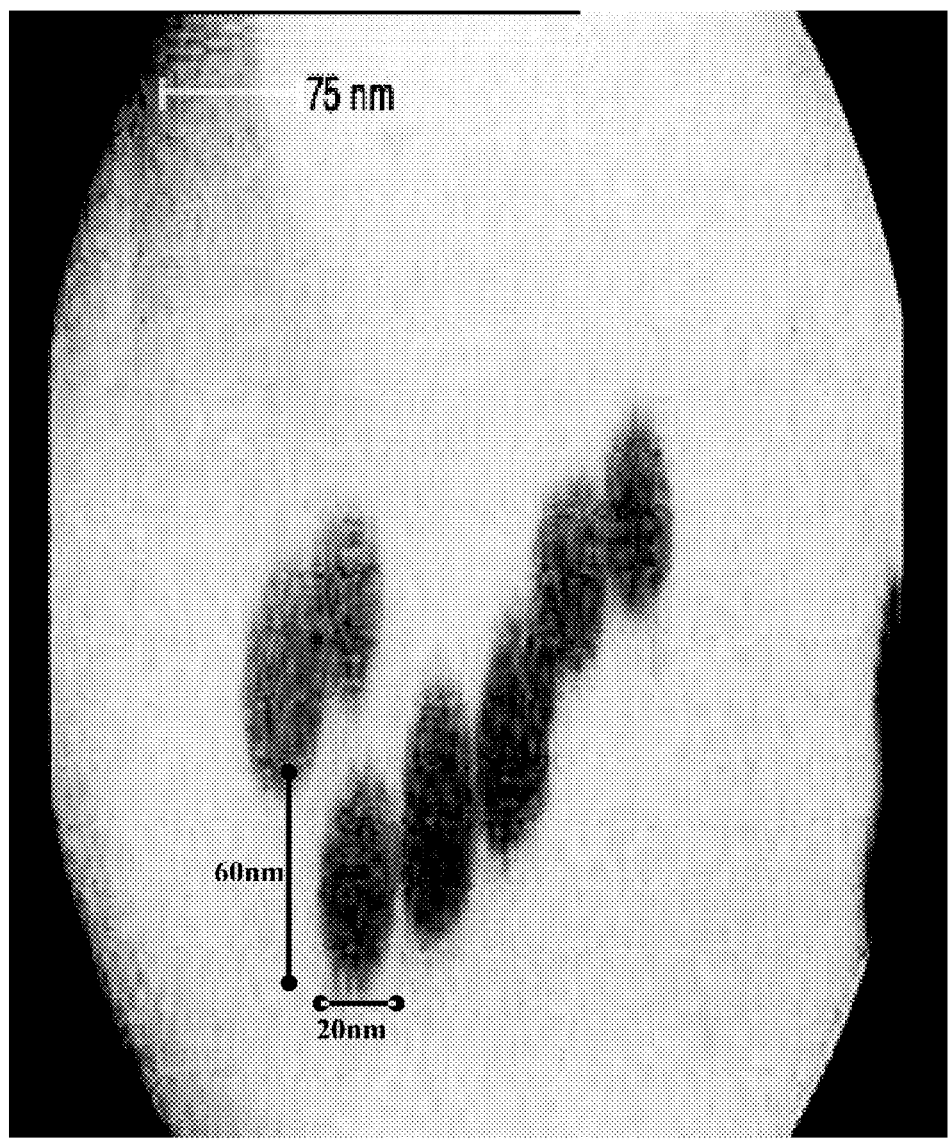
FIG. 52C shows a TEM image of the gold nano-antenna and gold nano-prolate spheroid manufactured by stearic acid.
Figure 52D:
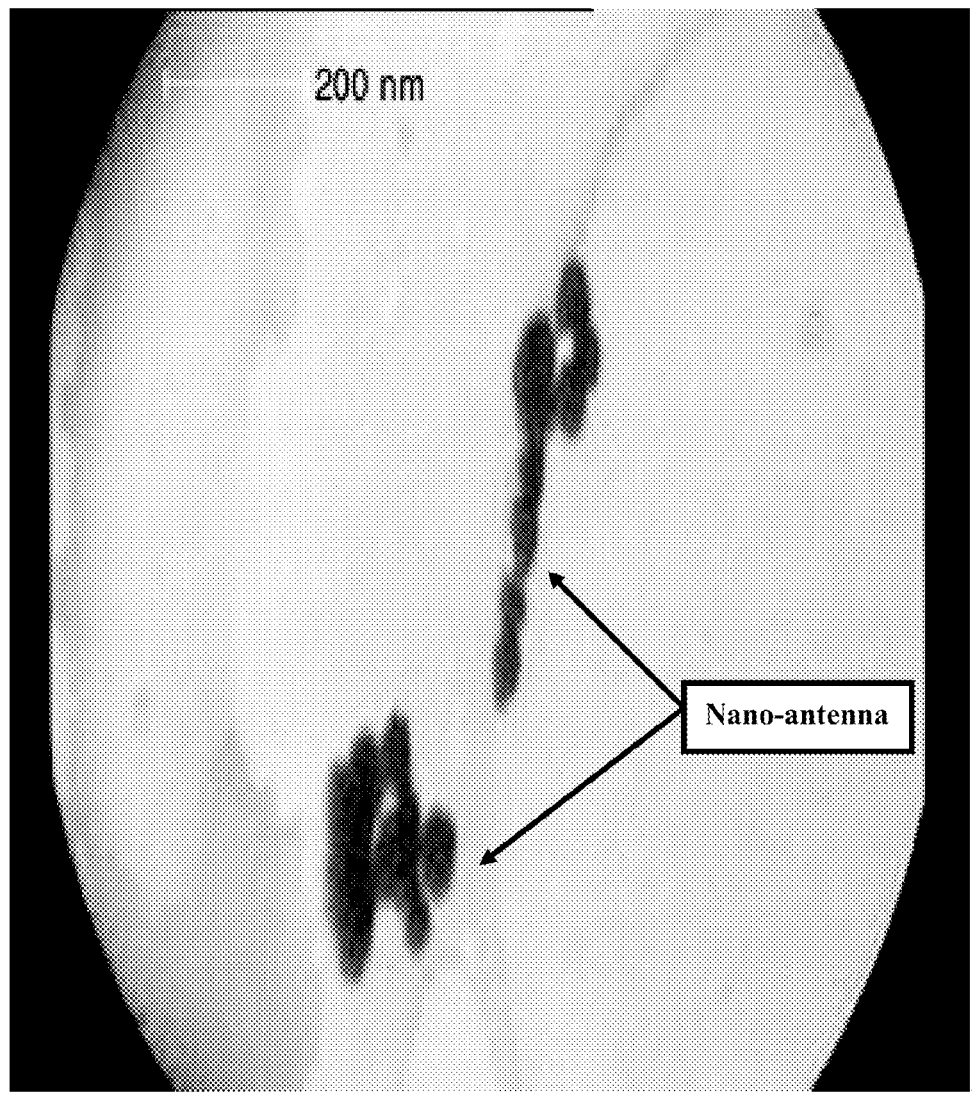
FIG. 52D shows a TEM image of the gold nano-antenna manufactured by stearic acid.
Figure 52E:
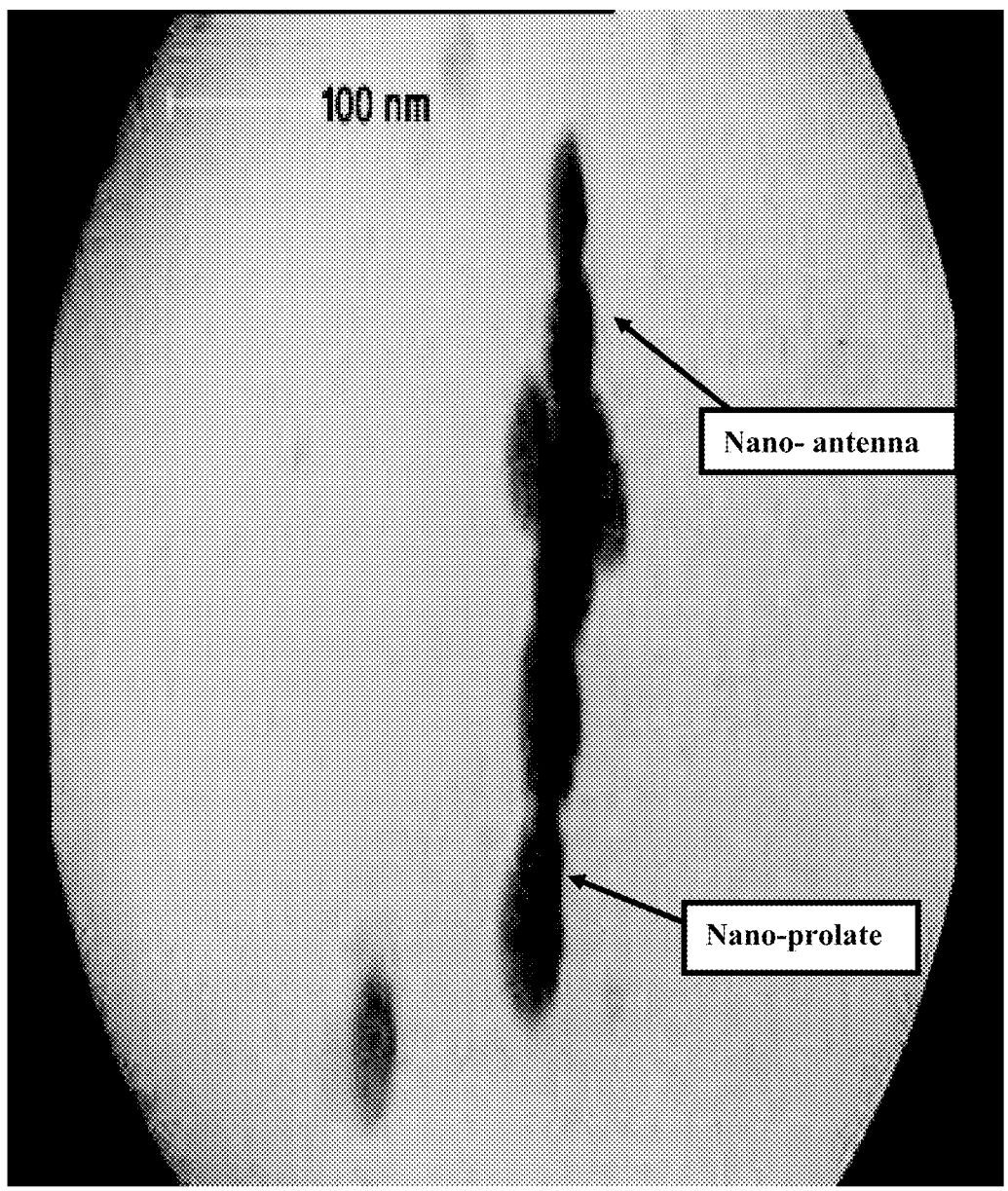
FIG. 52E shows a TEM image of the gold nano-antenna and gold nano-prolate spheroid manufactured by stearic acid.

FIG. 52A shows the TEM image of the gold nano-prolate spheroid manufactured by stearic acid according to example 1-10 stated above. FIG. 52B shows the TEM image of the gold nano-antenna and gold nano-prolate spheroid manufactured by stearic acid according to example 1-10 stated above. FIG. 52C shows the TEM image of the gold nano-antenna and gold nano-prolate spheroid manufactured by stearic acid according to example 1-10 stated above. FIG. 52D shows the TEM image of the gold nano-antenna manufactured by stearic acid according to example 1-10 stated above. FIG. 52E shows the TEM image of the gold nano-antenna and gold nano-prolate spheroid manufactured by stearic acid according to example 1-10 stated above.

Figure 53A:
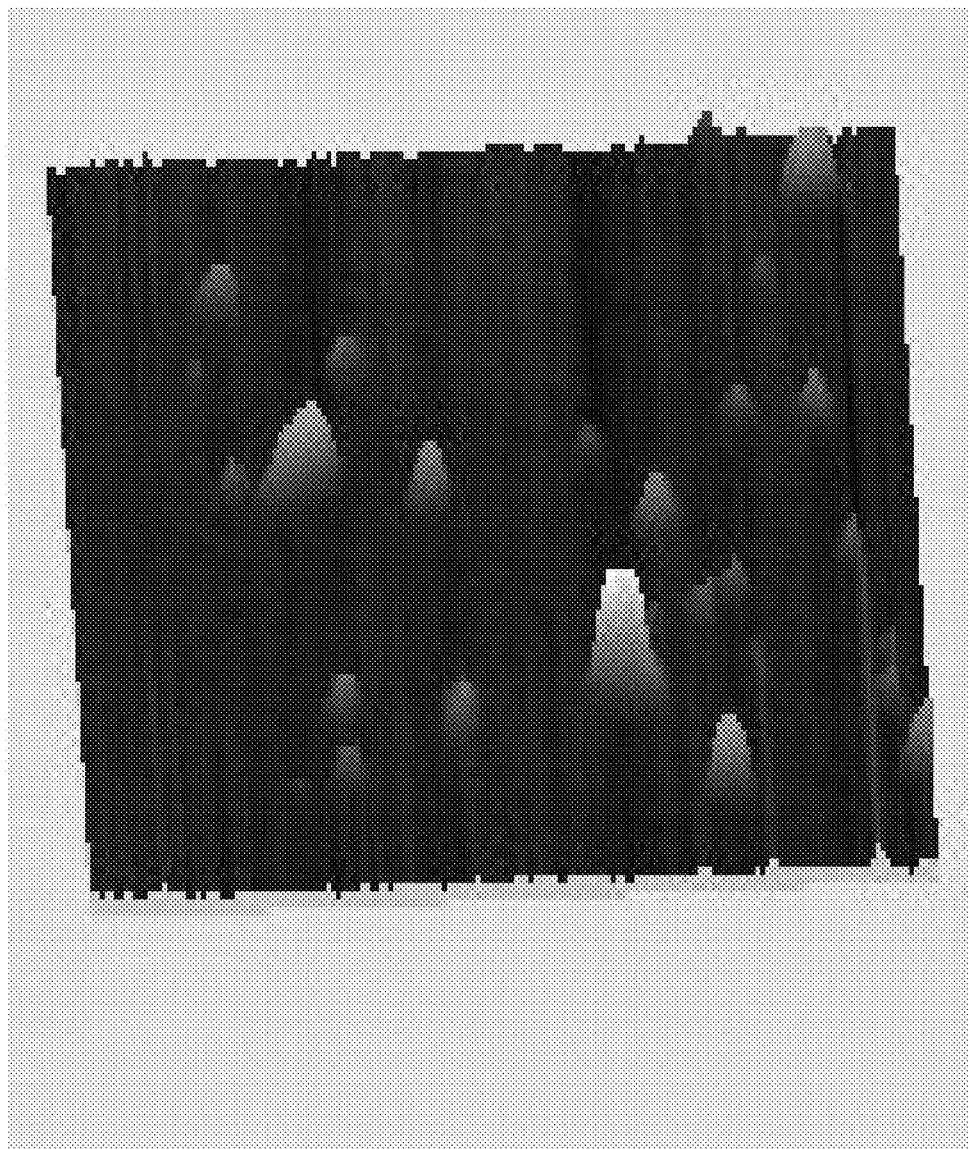
FIG. 53A shows an AFM image of the gold nano-antenna, gold nano-rod, gold nano-wire, gold nano-prolate spheroid and gold nano-oblate spheroid manufactured by stearic acid.
Figure 53B:
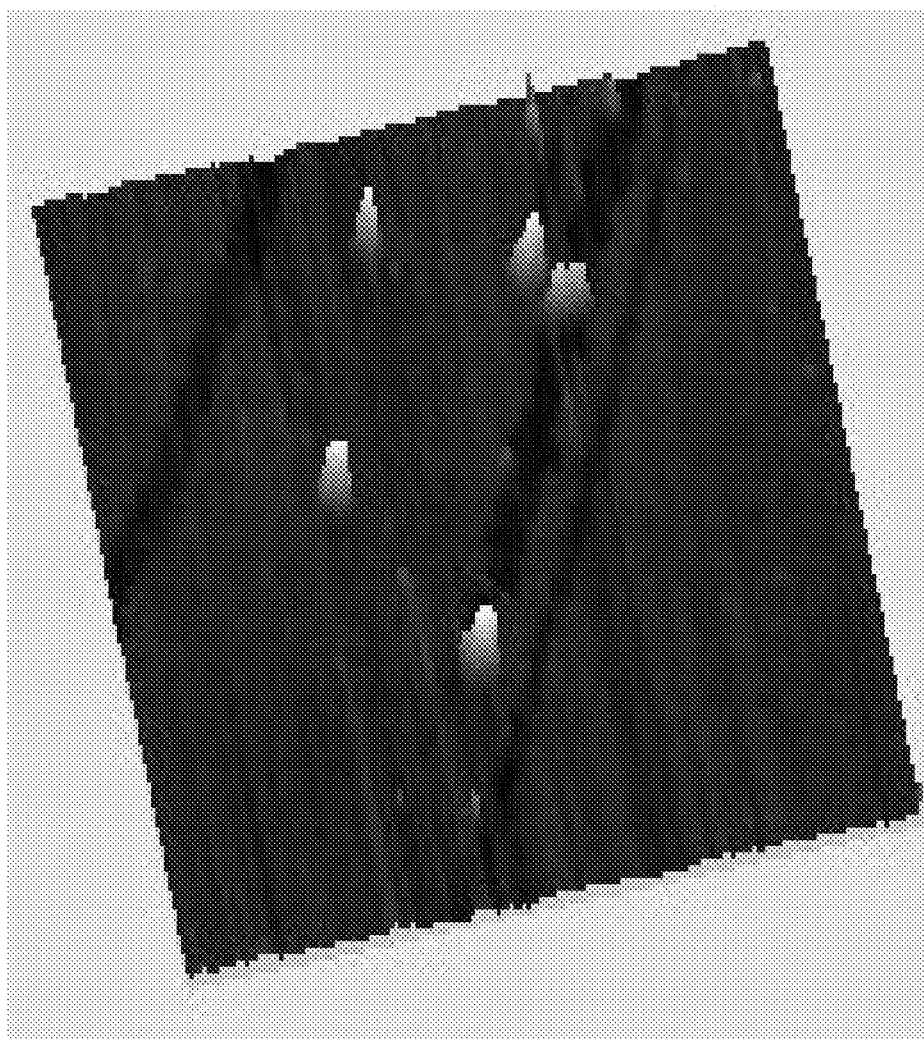
FIG. 53B shows an AFM image of the gold nano-antenna, gold nano-rod, gold nano-wire, gold nano-prolate spheroid and gold nano-oblate spheroid manufactured by stearic acid.

FIG. 53A shows the AFM image of the gold nano-antenna, gold nano-rod, gold nano-wire, gold nano-prolate spheroid and gold nano-oblate spheroid manufactured by stearic acid according to example 1-10 stated above. FIG. 53B shows the AFM image of the gold nano-antenna, gold nano-rod, gold nano-wire, gold nano-prolate spheroid and gold nano-oblate spheroid manufactured by stearic acid according to example 1-10 stated above.

Figure 54:
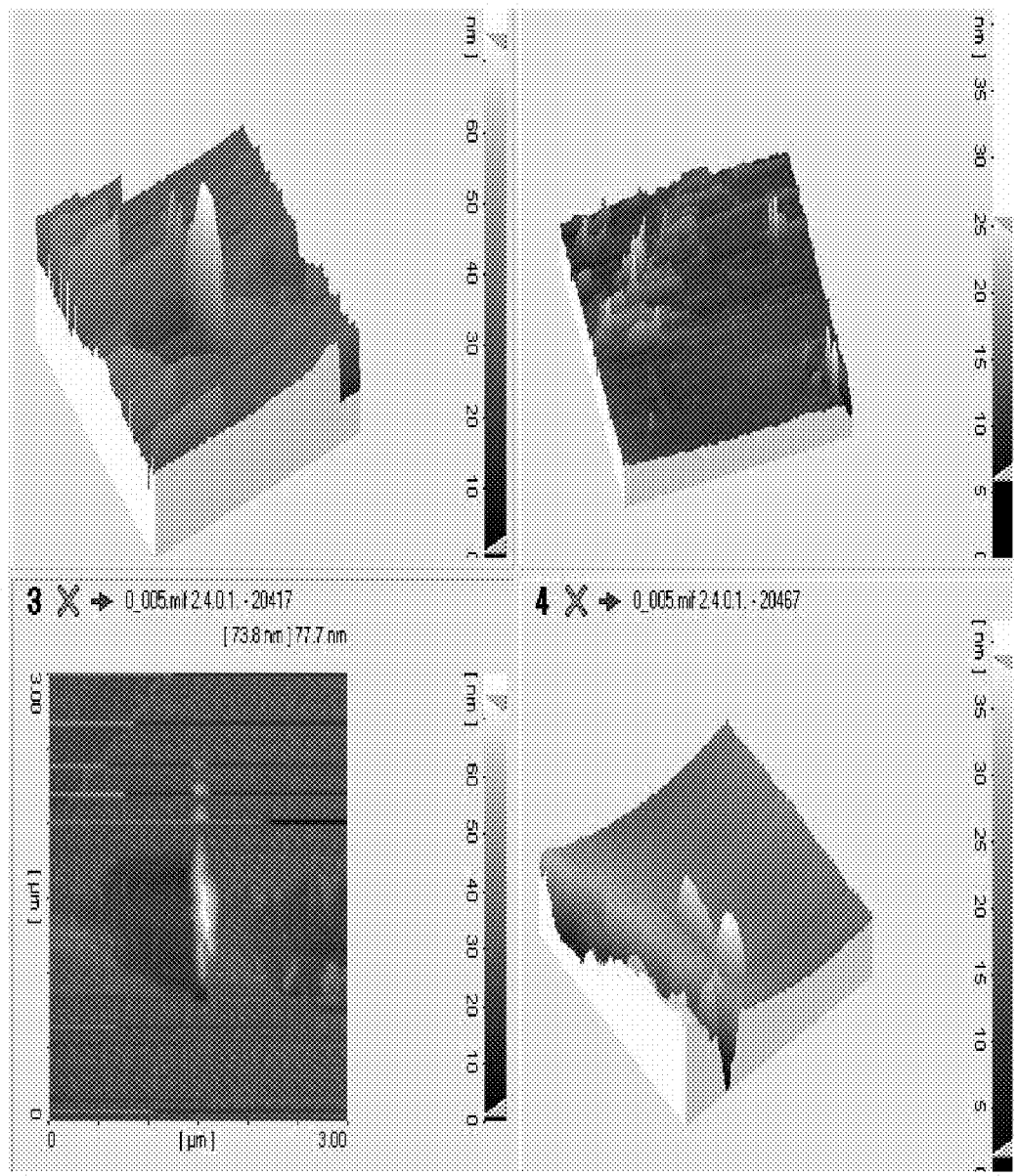
FIG. 54 shows a AFM image of the gold nano-antenna, gold nano-rod, gold nano-wire, gold nano-prolate spheroid and gold nano-oblate spheroid manufactured by stearic acid, in which a, b, c and d show AFM image of the gold nano-antenna, gold nano-rod, gold nano-wire, gold nano-prolate spheroid and gold nano-oblate spheroid manufactured by stearic acid.

FIG. 54 shows the AFM image of the gold nano-antenna, gold nano-rod, gold nano-wire, gold nano-prolate spheroid and gold nano-oblate spheroid manufactured by stearic acid according to example stated above. With respect to FIG. 54, c shows the AFM image of gold nano-antenna and gold nano-rod.

Figure 55:
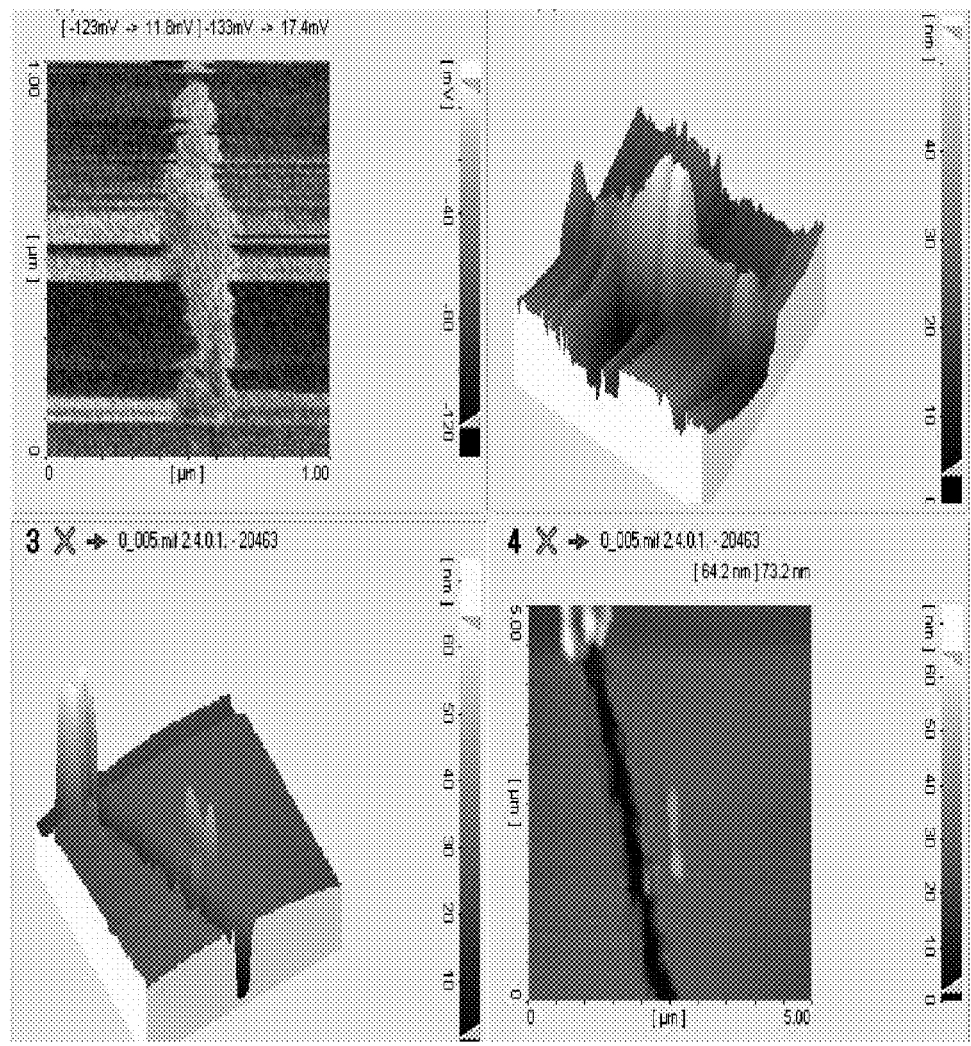
FIG. 55 shows an AFM image of the gold nano-antenna, gold nano-rod, gold nano-wire, gold nano-prolate spheroid and gold nano-oblate spheroid manufactured by stearic acid, in which a, b, c and d show AFM image of the gold nano-antenna, gold nano-rod, gold nano-wire, gold nano-prolate spheroid and gold nano-oblate spheroid manufactured by stearic acid.

FIG. 55 shows the AFM image of the gold nano-antenna, gold nano-rod, gold nano-wire, gold nano-prolate spheroid and gold nano-oblate spheroid manufactured by stearic acid according to example 1-10 stated above. With respect to FIG. 55, b shows the AFM image of gold nano-antenna, d shows the AFM image of gold nano-antenna and gold nano-rod.

Figure 56A:
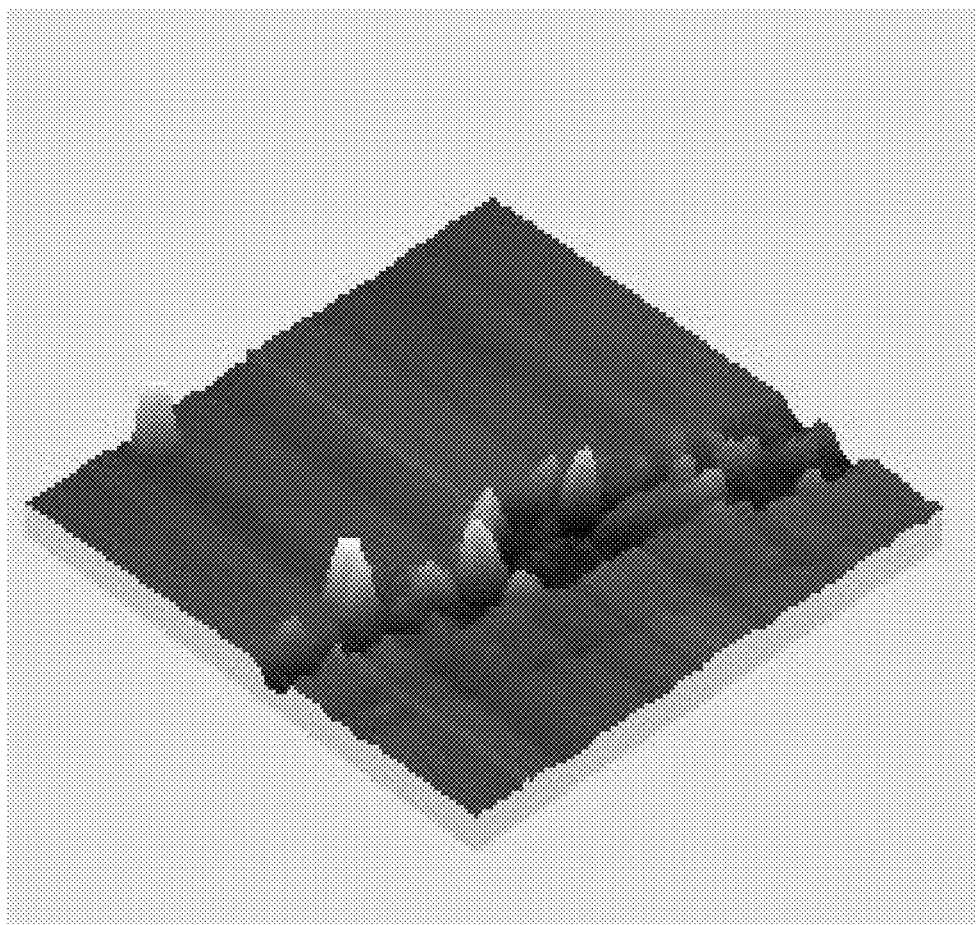
FIG. 56A shows an AFM image of the gold nano-antenna, gold nano-rod, gold nano-wire, gold nano-prolate spheroid and gold nano-oblate spheroid manufactured by stearic acid.
Figure 56B:
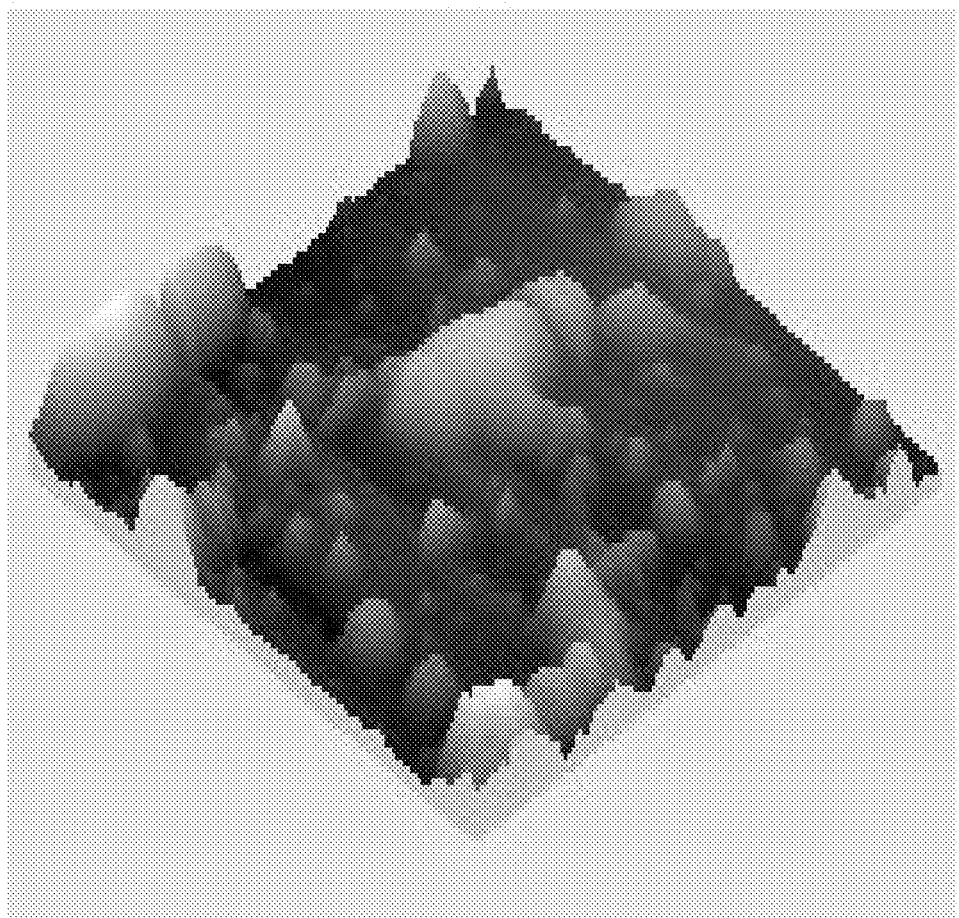
FIG. 56B shows AFM image of the gold nano-antenna, gold nano-rod, gold nano-wire, gold nano-prolate spheroid and gold nano-oblate spheroid manufactured by stearic acid.
Figure 56C:
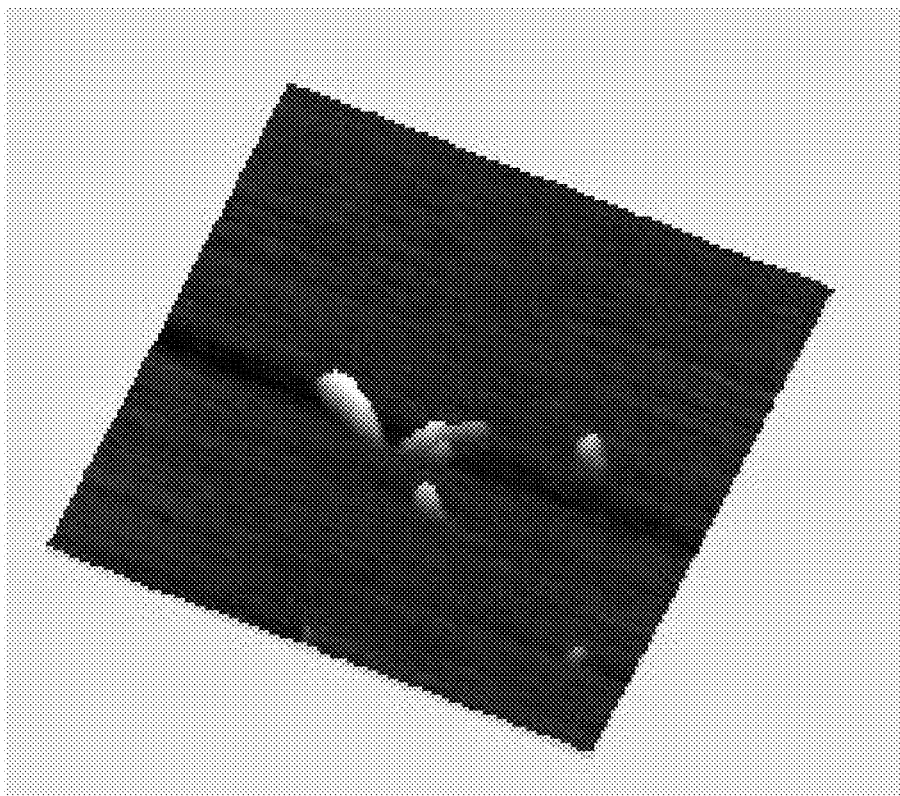
FIG. 56C shows AFM image of the gold nano-antenna, gold nano-rod, gold nano-wire, gold nano-prolate spheroid and gold nano-oblate spheroid manufactured by stearic acid.
Figure 56D:
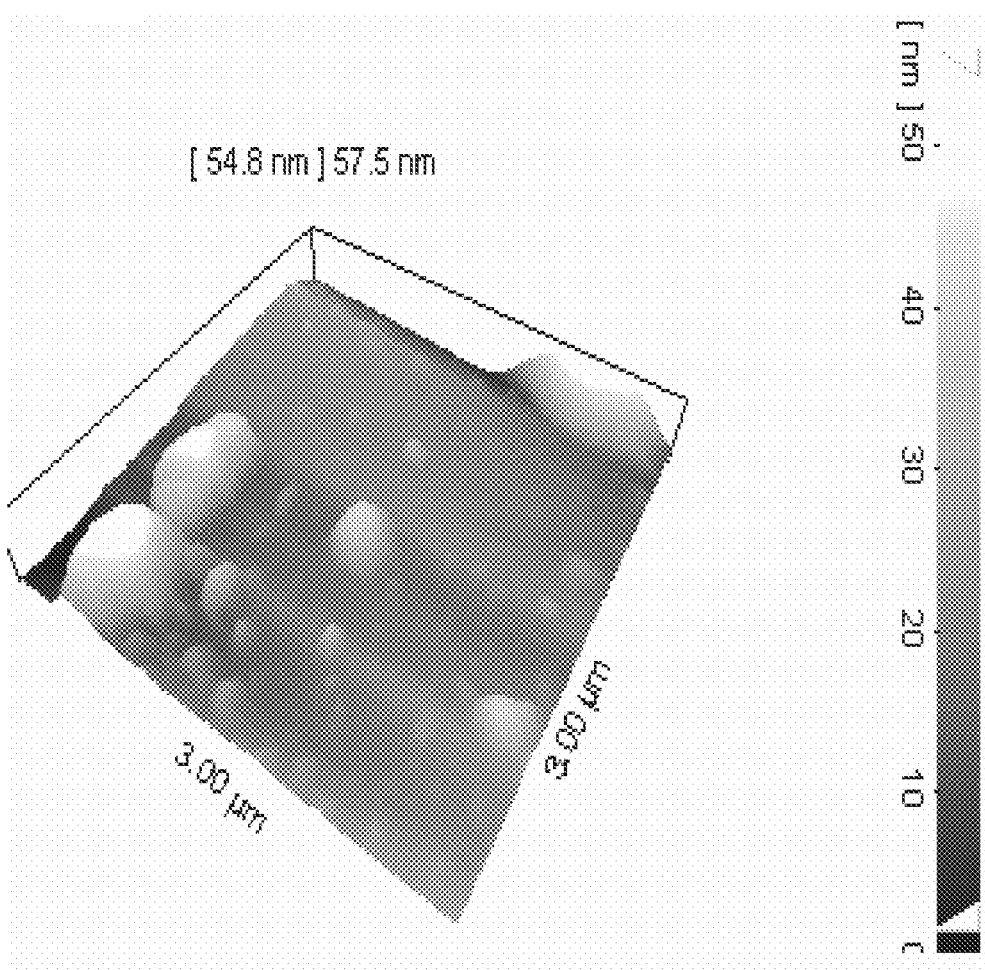
FIG. 56D shows AFM image of the gold nano-antenna, gold nano-rod, gold nano-wire, gold nano-prolate spheroid and gold nano-oblate spheroid manufactured by stearic acid.

FIG. 56A shows the AFM image of the gold nano-antenna, gold nano-rod, gold nano-wire, gold nano-prolate spheroid and gold nano-oblate spheroid manufactured by stearic acid according to example 1-10 stated above. FIG. 56B shows the AFM image of the gold nano-antenna, gold nano-rod, gold nano-wire, gold nano-prolate spheroid and gold nano-oblate spheroid manufactured by stearic acid according to example 1-10 stated above. FIG. 56C shows the AFM image of the gold nano-antenna, gold nano-rod, gold nano-wire, gold nano-prolate spheroid and gold nano-oblate spheroid manufactured by stearic acid according to example 1-10 stated above. FIG. 56D shows the AFM image of the gold nano-antenna, gold nano-rod, gold nano-wire, gold nano-prolate spheroid and gold nano-oblate spheroid manufactured by stearic acid according to example 1-10 stated above.

Figure 57:
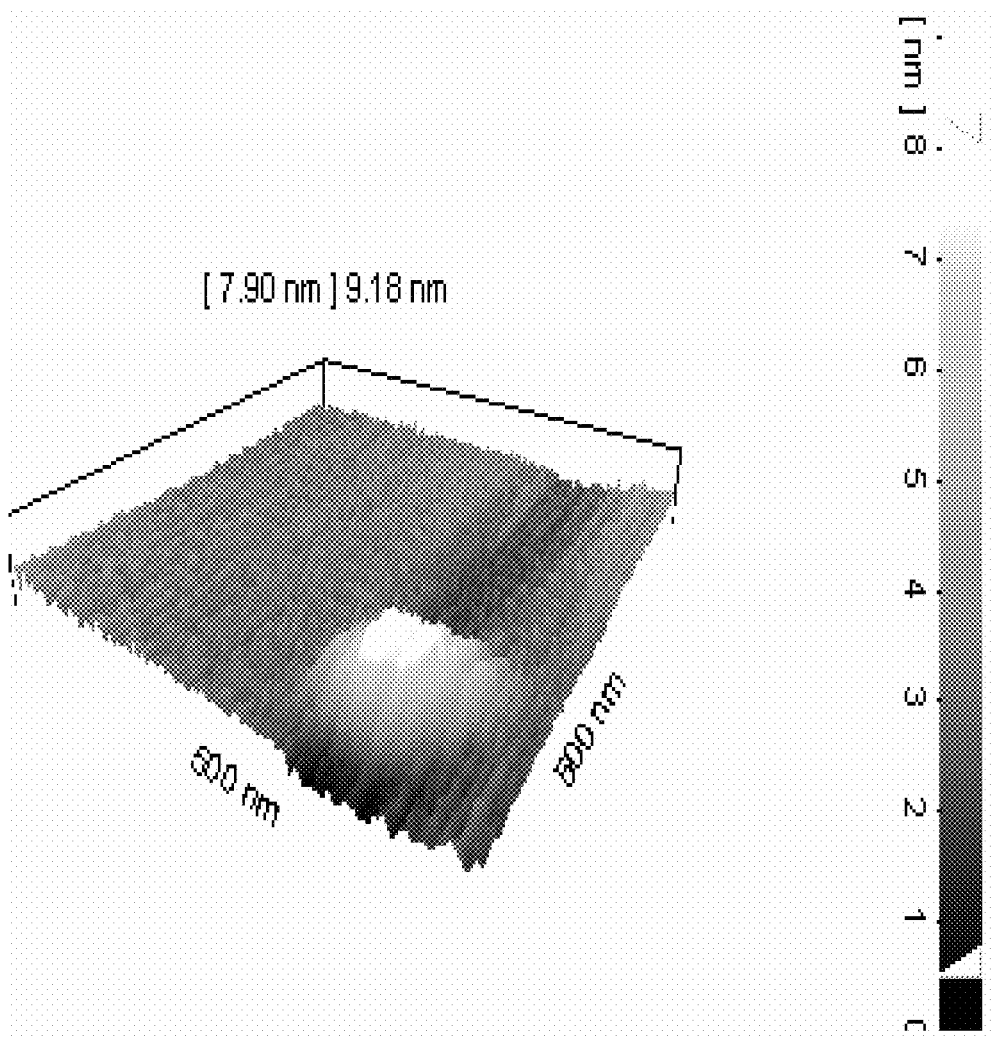
FIG. 57 shows a 3-Dimentional AFM image of the gold nano-antenna and gold nano-rod manufactured by stearic acid.

FIG. 57 shows the 3-Dimentional AFM image of the gold nano-antenna and gold nano-rod manufactured by stearic acid according to example 1-10 stated above.

Figure 58:
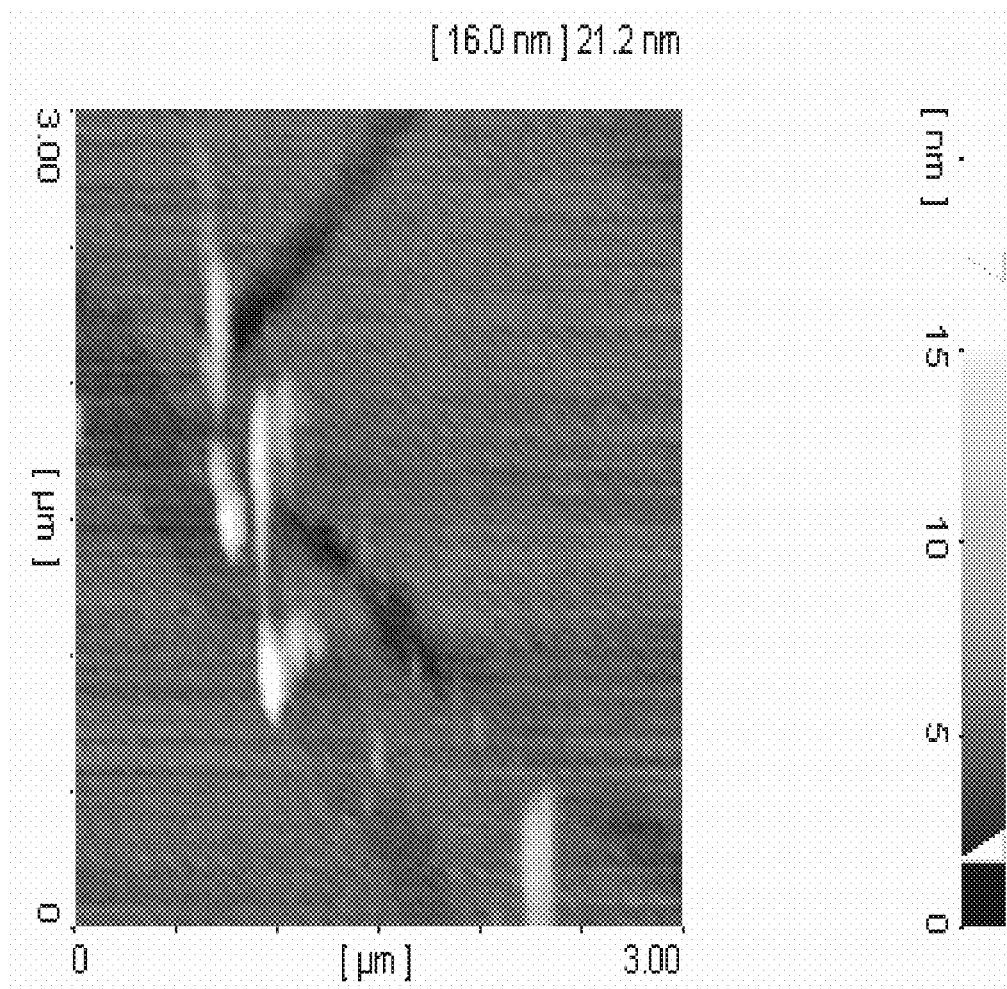
FIG. 58 shows a 2-Dimentional AFM image of the gold nano-rod manufactured by stearic acid.

FIG. 58 shows the 2-Dimentional AFM image of the gold nano-rod manufactured by stearic acid according to example 1-10 stated above.

Figure 59:
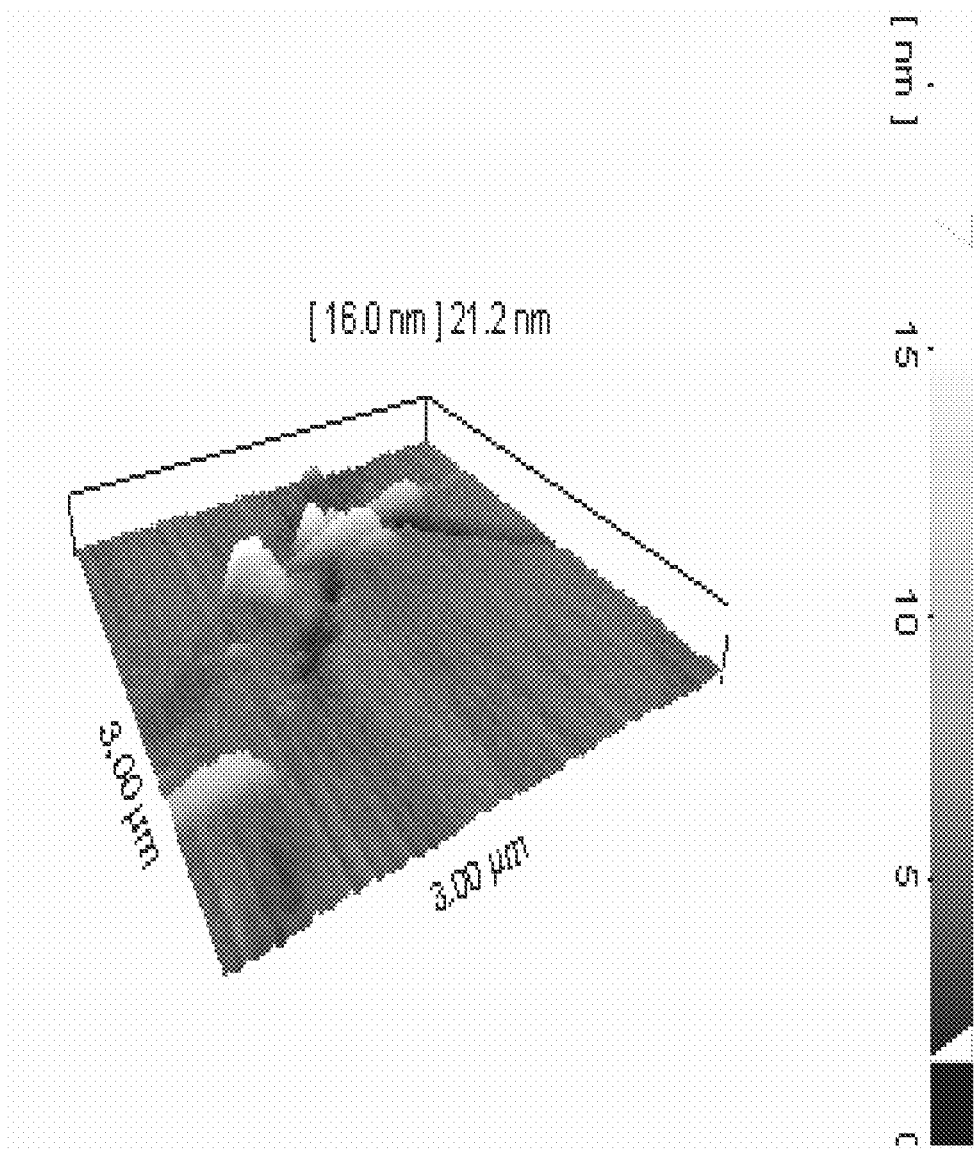
FIG. 59 shows a 3-Dimentional AFM image of the gold nano-antenna and gold nano-rod manufactured by stearic acid.

FIG. 59 shows the 3-Dimentional AFM image of the gold nano-antenna and gold nano-rod manufactured by stearic acid according to example 1-10 stated above.

Figure 60:
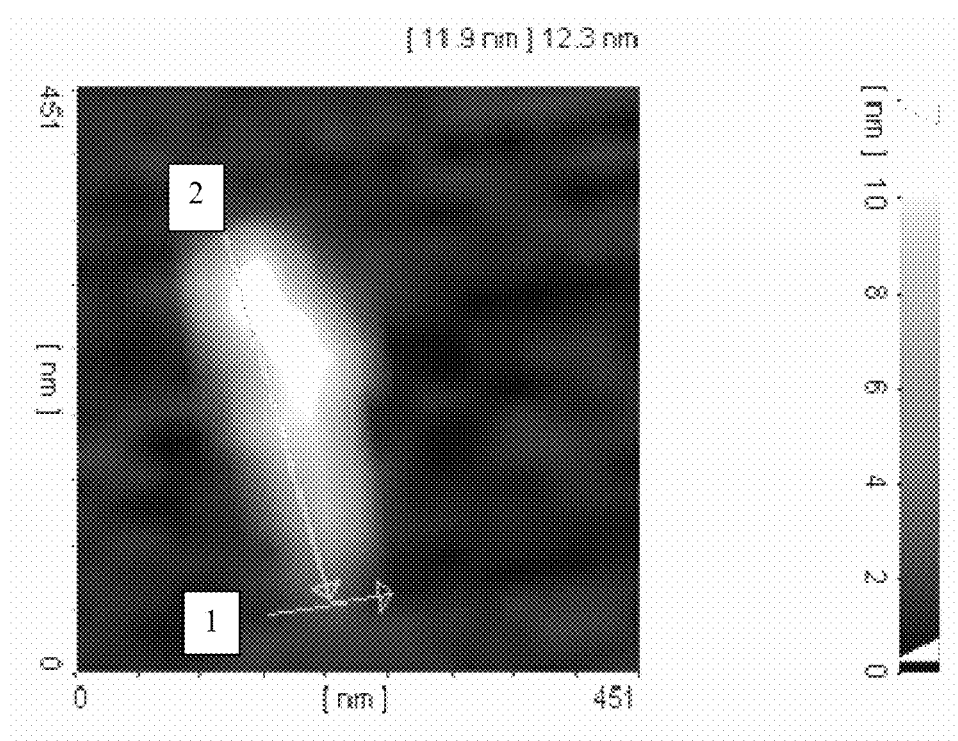
FIG. 60 shows a 2-Dimentional AFM image of the gold nano-rod manufactured by stearic acid.

FIG. 60 shows the 2-dimentional AFM image of the gold nano-rod manufactured by stearic acid according to example 1-10 stated above.

Figure 61:
FIG. 61 shows an AFM profile image of the gold nano-rod manufactured by stearic acid.

FIG. 61 shows the AFM profile image of the gold nano-rod showing the size distribution of the manufactured by stearic acid according to example 1-10 stated above.

Figure 62:
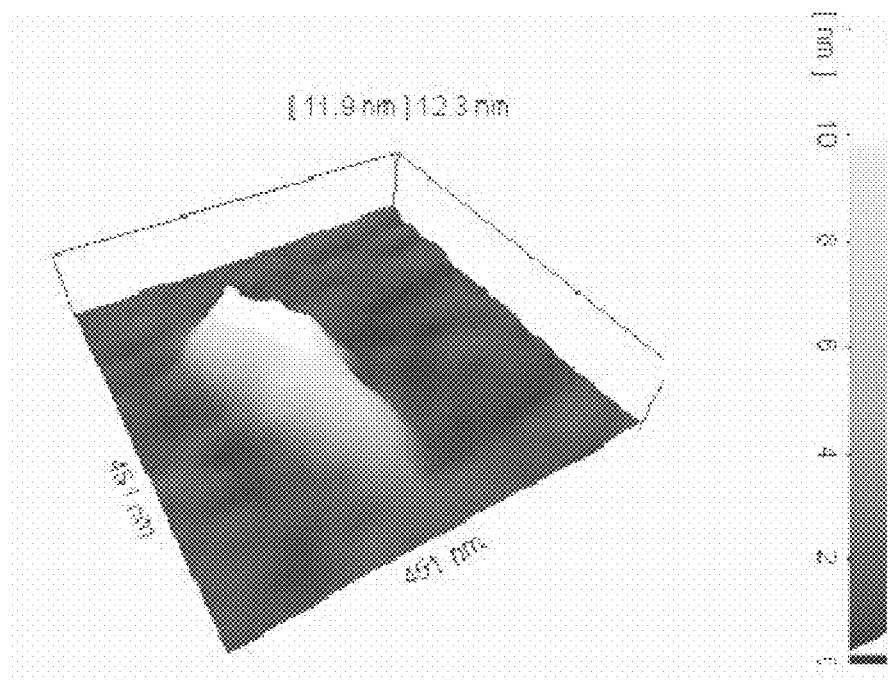
FIG. 62 shows a 3-Dimentional AFM image of the gold nano-rod manufactured by stearic acid.

FIG. 62 shows the 3-Dimentional AFM image of the gold nano-rod manufactured by stearic acid according to example 1-10 stated above.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method of synthesizing metallic nano-products comprising the steps of:
   a) preparing a reaction mixture by mixing a polar protic solvent, a polar aprotic solvent or a non-polar solvent, a saturated fatty acid or an unsaturated fatty acid and a metallic salt, wherein the metallic salt is a gold salt;
   b) preparing a mixture of reducing agents by mixing a polar protic solvent, a polar aprotic solvent or a non-polar solvent and a saturated fatty acid or an unsaturated fatty acid;
   c) combining the reaction mixture and the mixture of reducing agents, wherein a pH is within a range of 3.7 to 5; and
   d) heating the combined reaction mixture and the mixture of reducing agents for a pre-determined period of time at a pre-determined temperature, and wherein heating is done solvothermally, and wherein the saturated fatty acid or the unsaturated fatty acid is used to adjust a size of a metallic nano-product, and wherein the saturated fatty acid or the unsaturated fatty acid accelerates a major axis growth of the metallic nanoproduct, and wherein the metallic nano-product exhibits localized plasmon-polariton resonance having a first wavelength within a wavelength range of an infrared spectrum and a second wavelength within a wavelength range of a visible light spectrum, and wherein the metallic nano-product is selected from a group consisting of metallic nano-antennas, metallic nano rods, metallic nano-wires, metallic nano-prolate spheroids and metallic nano-oblate spheroids, wherein the metallic nano-products have a dipole or multipole conformation geometrically, and wherein the saturated fatty acid or the unsaturated fatty acid is an surfactant, a reducing agent, a dispersant agent and a capping agent, and wherein the predetermined temperature is within a range of 90° C. to 110° C., and wherein the predetermined period of time is within a range of 10 min to 35 min, and wherein the gold salt is a gold acetylacetonate.

2. The method according to claim 1, wherein the polar protic solvent, the polar aprotic solvent or the non-polar solvent of step a and step b is selected from a group consisting of polyol, aliphatic alcohols, cycloaliphatic alcohols, aromatic alcohols, ether alcohols, amino alcohols, amides, 2-pyrrolidone, N-methylpyrrolidone, esters, sulfoxides, and ethers, and wherein aromatic alcohols are selected from a group consisting of ethanol, propanol, butanol, pentanol, cyclopentanol, hexanol, cyclohexanol, octanol, decanol, isodecanol, undecanol, dodecanol, benzyl alcohol, butyl carbitol and the terpineols, and wherein ether alcohols are selected from a group consisting of mono alkyl ethers of diols, and wherein mono alkyl ethers of diols are selected from a group consisting ofC1-C6 alkanediols and polyetherdiols derived from the C1-C6 alkanediols, and wherein alkanediols are selected from a group consisting of monomethyl, monoethyl, mono propyl and monobutyl ethers of ethylene glycol, diethylene glycol, triethylene glycol, propylene glycol, dipropylene glycol, 1,3-propanediol and 1,4-butanediol, 2-methoxyethano 1,2-ethoxyethanol, 2-propoxyethanol and 2-butoxyethanol, and wherein amino alcohols are selected from a group consisting of ethanolamine, and wherein esters are selected from a group consisting of ethylacetate and ethyl formate, and wherein amides are selected from a group consisting of dimethyl formamide, dimethyl acetamide, and wherein sulfoxides are selected from a group consisting of dimethyl sulfoxide, and wherein ethers are selected from a group consisting of tetrahydrofuran and tetrahydropyran.

3. The method according to claim 1, wherein the polar protic solvent of step a and step b is selected from a group consisting of formic acid, n-butanol, isopropanol, n-propanol, ethanol, methanol, acetic acid and water.

4. The method according to claim 1, wherein the polar aprotic solvent in step a and step b is selected from a group consisting of dichloromethane, tetrahydrofuran, ethyl acetate, acetone, dimethylformamide, acetonitrile and dimethyl sulfoxide.

5. The method according to claim 1, wherein the non polar solvent in step a and step b is selected from a group consisting of pentane, cyclopentane, hexane, cyclohexane, benzene, toluene, 1,4-dioxane, chloroform and diethyl ether.

6. The method according to claim 1, wherein the saturated fatty acid in the mixture of reducing agent includes acids having formula $(C_nH_{2n}O_2)$, where n is an integer of 10-18, and wherein the unsaturated fatty acid in the mixture of reducing agent includes a low unsaturated fatty acid and a high unsaturated fatty acid, and wherein the low unsaturated fatty acid includes acids having formula $(C_nH_{2n-2}O_2)$, $(C_nH_{2n-4}O_2)$, $(C_nH_{2n-6}O_2)$, wherein n is an integer of 10-18, and wherein the high unsaturated fatty acid includes acids having formula $(C_nH_{2n-8}O_2, C_nH_{2n-10}O_2, C_nH_{2n-12}O_2)$, where n is an integer of 10-18.

7. The method according to claim 1, wherein the unsaturated fatty acid is selected from a group consisting of omega-3 unsaturated fatty acid, omega-6 unsaturated fatty acid and omega-9 unsaturated fatty acid, and wherein the omega-3 unsaturated fatty acid is selected from a group consisting of α-linolenic acid, stearidonic acid, eicosapentaenoic acid and docosahexaenoic acid and wherein the omega-6 unsaturated fatty acid is selected from a group consisting of linoleic acid, γ-linolenic acid, di-homo- γ-linolenic acid and arachidonic acid and wherein the omega-9 unsaturated fatty acid is selected from a group consisting of oleic acid, elaidic acid, eicosenoic acid, erucic acid and nervonic acid.

8. The method according to claim 7, wherein the unsaturated fatty acid is selected from a group consisting of oleic acid, linoleic acid and linolenic acid.

9. A method according to claim 1, wherein the saturated fatty acid is selected from a group consisting of acetic acid, propionic acid, butyric acid, valeric acid, hexanoic acid, heptanoic acid, caprylic acid, nonanoic acid, decanoic acid, lauric acid, myristic acid, palmitic acid, heptadecanoic acid, stearic acid, arachidic acid, behenic acid, lignoceric acid and tetratriacontanoic acid.

10. A method according to claim 9, wherein the saturated fatty acid is selected from a group consisting of stearic and palmitic acid.

* * * * *